US010221830B2

(12) United States Patent
Schneider

(10) Patent No.: US 10,221,830 B2
(45) Date of Patent: Mar. 5, 2019

(54) LINEAR PELTON TURBINE

(71) Applicant: Natel Energy, Inc., Alameda, CA (US)

(72) Inventor: Abraham D. Schneider, San Francisco, CA (US)

(73) Assignee: Natel Energy, Inc., Alameda, CA (US)

( * ) Notice: Subject to any disclaimer, the term of this patent is extended or adjusted under 35 U.S.C. 154(b) by 20 days.

(21) Appl. No.: 15/659,457

(22) Filed: Jul. 25, 2017

(65) Prior Publication Data

US 2018/0030948 A1 Feb. 1, 2018

Related U.S. Application Data

(60) Provisional application No. 62/367,003, filed on Jul. 26, 2016, provisional application No. 62/485,694, filed on Apr. 14, 2017.

(51) Int. Cl.
*F03B 9/00* (2006.01)
*F03B 17/06* (2006.01)
(Continued)

(52) U.S. Cl.
CPC .............. *F03B 17/068* (2013.01); *F03B 1/00* (2013.01); *F03B 1/02* (2013.01); *F03B 1/04* (2013.01);
(Continued)

(58) Field of Classification Search
CPC .... F03B 17/068; F03B 17/066; F03B 17/067; F03B 1/00; F03B 1/02
See application file for complete search history.

(56) References Cited

U.S. PATENT DOCUMENTS

| 849,311 A | 4/1907 | Rydz |
| 1,481,397 A * | 1/1924 | Tetetleni ................. F03B 17/06 |
| | | 415/125 |

(Continued)

FOREIGN PATENT DOCUMENTS

| CN | 201874722 U | 6/2011 |
| JP | H01280683 A | 11/1989 |

(Continued)

OTHER PUBLICATIONS

International Search Report for International Patent Application No. PCT/US2017/043803, European Patent Office, Rijswijk, Netherlands, dated Dec. 13, 2017.

(Continued)

*Primary Examiner* — Igor Kershteyn
*Assistant Examiner* — Jason Fountain
(74) *Attorney, Agent, or Firm* — Sterne, Kessler, Goldstein & Fox P.L.L.C.

(57) ABSTRACT

Systems and methods related to linear turbine systems are presented. Each embodiment described herein may be designed as a single-stage, linear, impulse turbine system. In an embodiment, a linear turbine includes a first shaft extending along a first axis; a second shaft extending along a second axis, the second axis being separated from and substantially parallel to the first axis; a first plurality of buckets to travel a first continuous path around the first shaft and the second shaft along a first plane, the first path including a first substantially linear path segment between the first axis and the second axis; and a nozzle configured to direct a first fluid jet to contact the first plurality of buckets in the first linear path segment.

21 Claims, 53 Drawing Sheets

(51) Int. Cl.
  *F03B 1/02* (2006.01)
  *F03B 1/04* (2006.01)
  *F03B 1/00* (2006.01)
  *F03B 11/00* (2006.01)
  *F03B 11/02* (2006.01)

(52) U.S. Cl.
  CPC .............. *F03B 9/00* (2013.01); *F03B 17/064* (2013.01); *F03B 11/004* (2013.01); *F03B 11/02* (2013.01); *F05B 2220/32* (2013.01); *F05B 2220/706* (2013.01); *F05B 2240/123* (2013.01); *F05B 2240/2411* (2013.01); *F05B 2260/504* (2013.01)

(56) References Cited

U.S. PATENT DOCUMENTS

| | | | |
|---|---|---|---|
| 4,494,008 A | 1/1985 | Patton | |
| 4,642,022 A | 2/1987 | Rydz | |
| 7,645,115 B2 | 1/2010 | Schneider | |
| 2007/0231129 A1* | 10/2007 | Schneider | F03B 3/00 415/183 |
| 2016/0327011 A1* | 11/2016 | Schneider | F03B 7/006 |
| 2017/0204830 A1* | 7/2017 | Schneider | F03B 7/006 |

FOREIGN PATENT DOCUMENTS

| | | |
|---|---|---|
| KR | 20120110072 A | 10/2012 |
| WO | WO 2013/013328 A1 | 1/2013 |

OTHER PUBLICATIONS

Written Opinion of the International Searching Authority for International Patent Application No. PCT/US2017/043803, European Patent Office, Munich, Germany, dated Dec. 13, 2017.

* cited by examiner

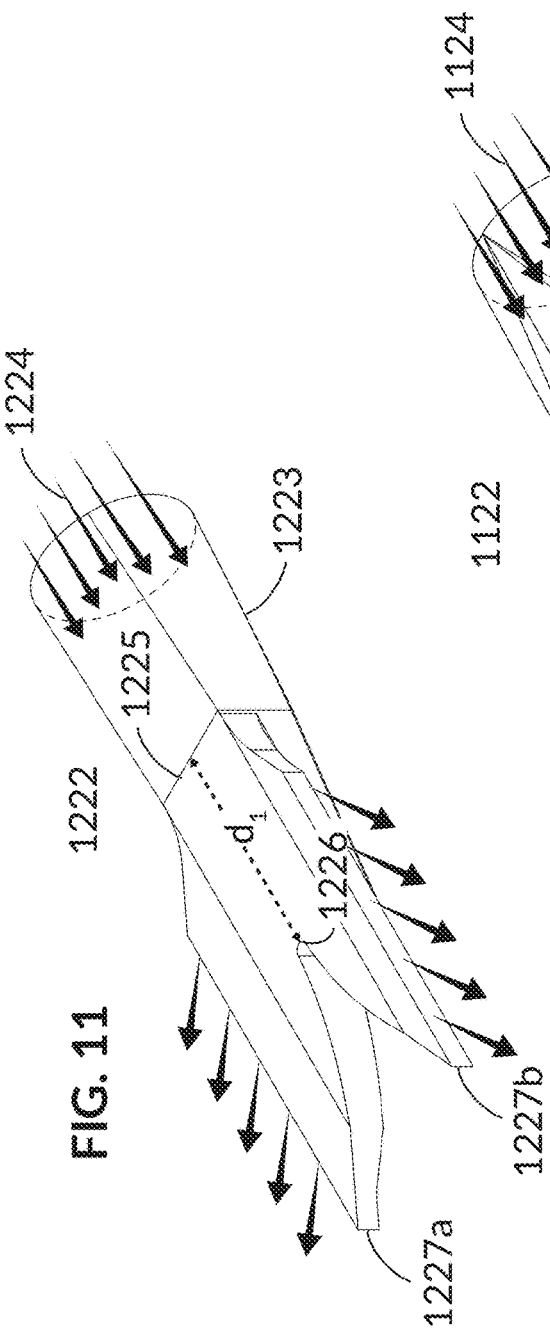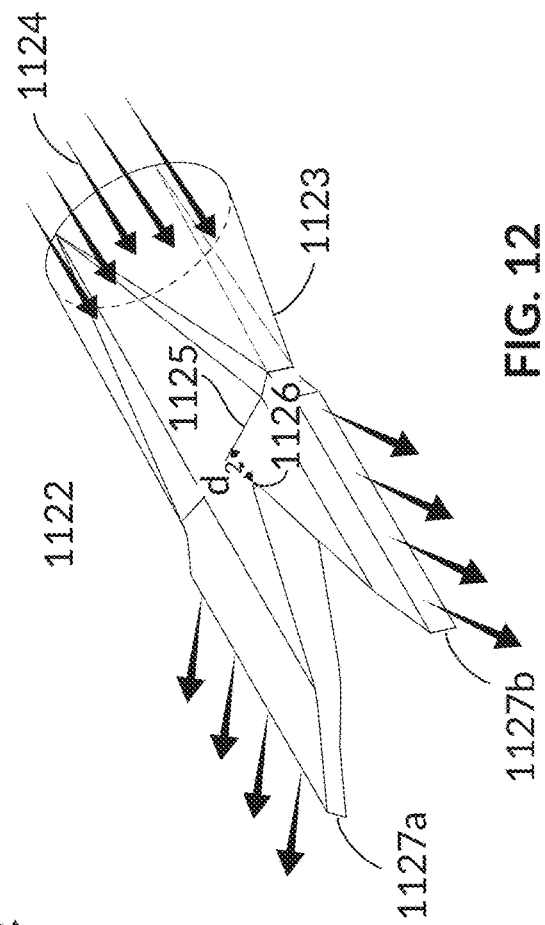

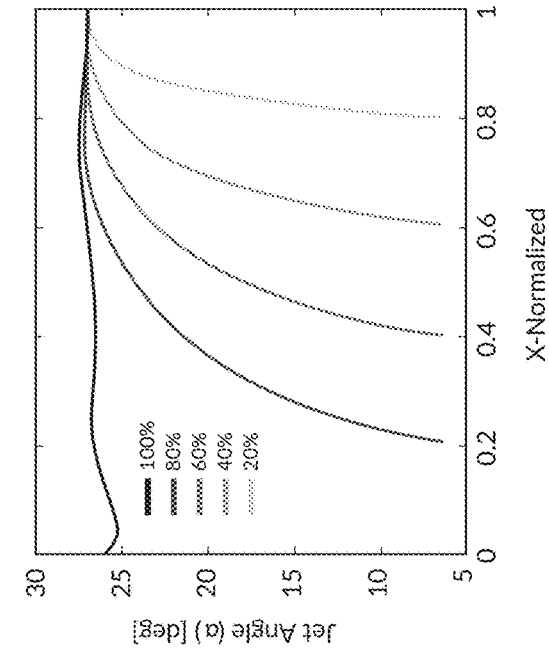
FIG. 30
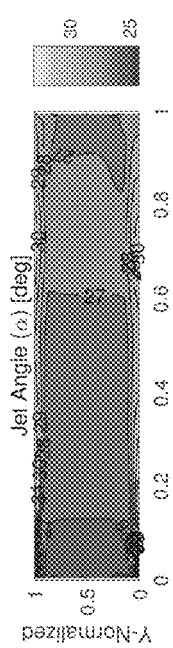
FIG. 25
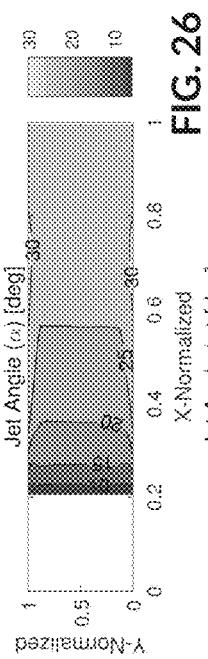
FIG. 26
FIG. 27
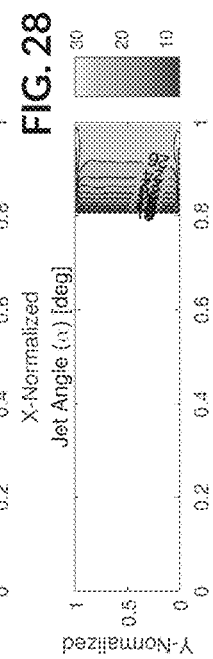
FIG. 28
FIG. 29

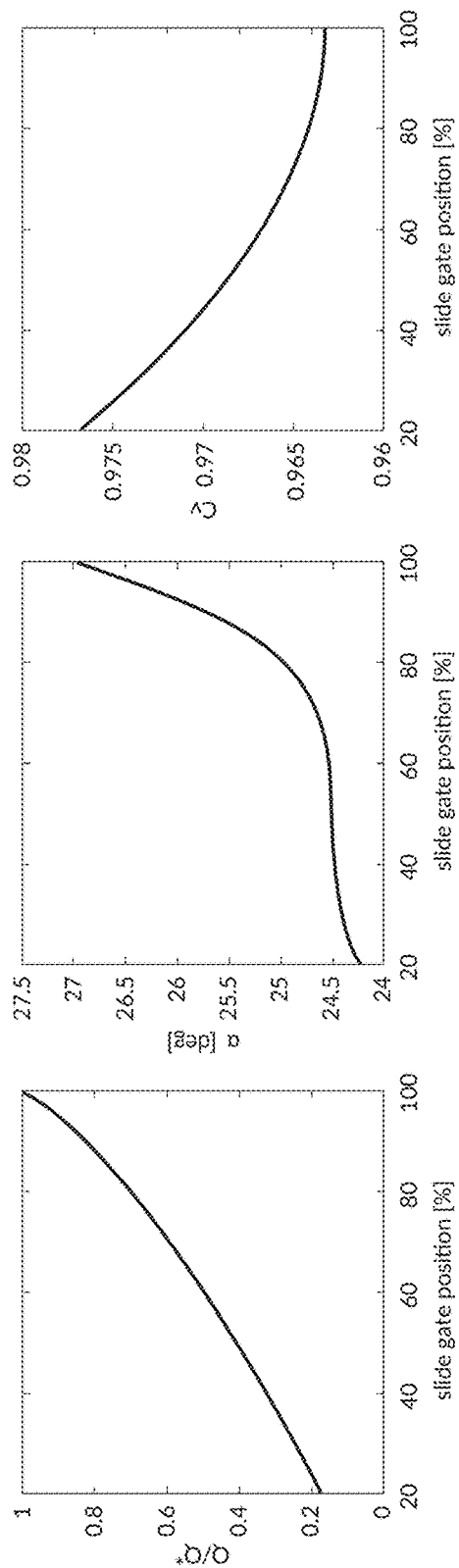

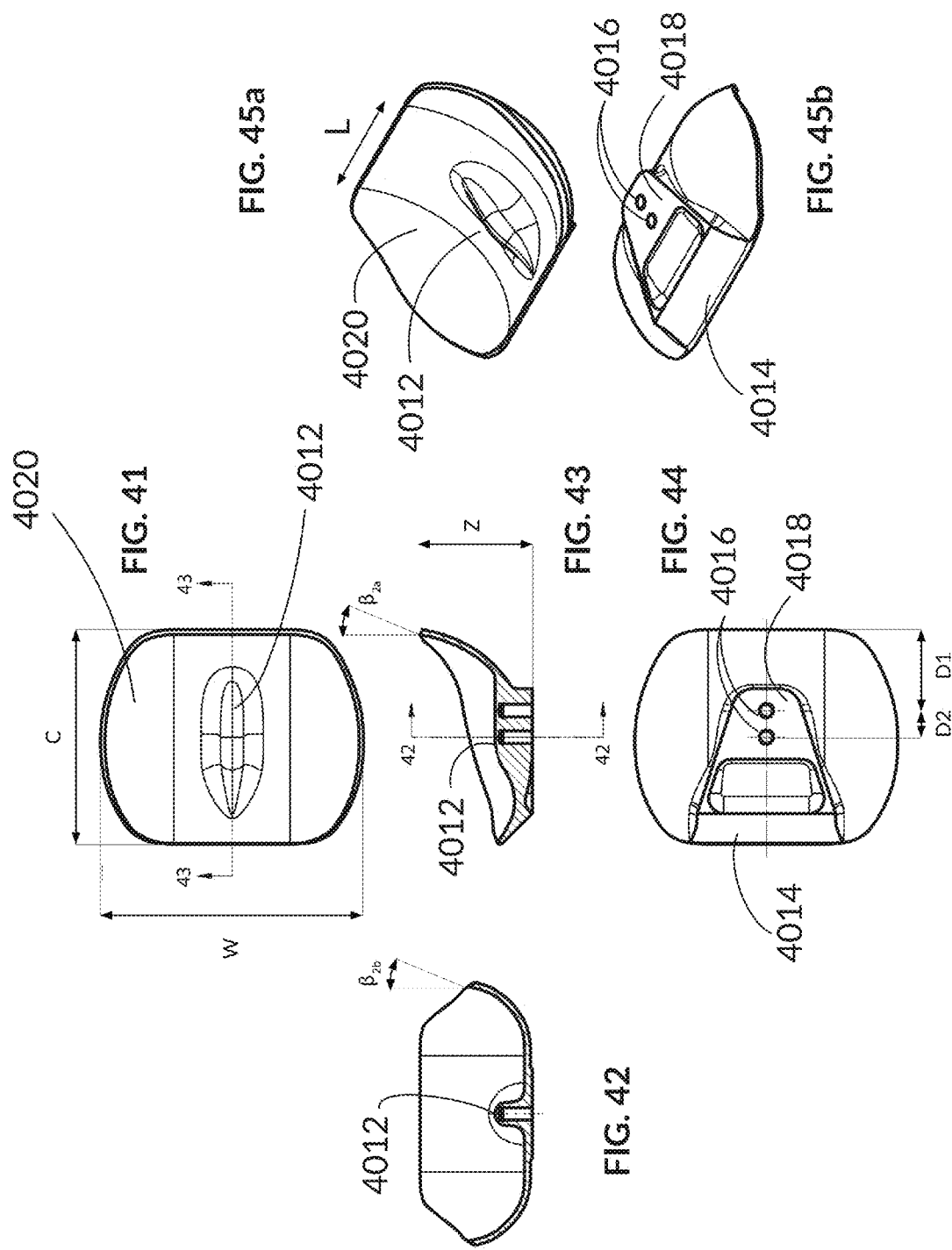

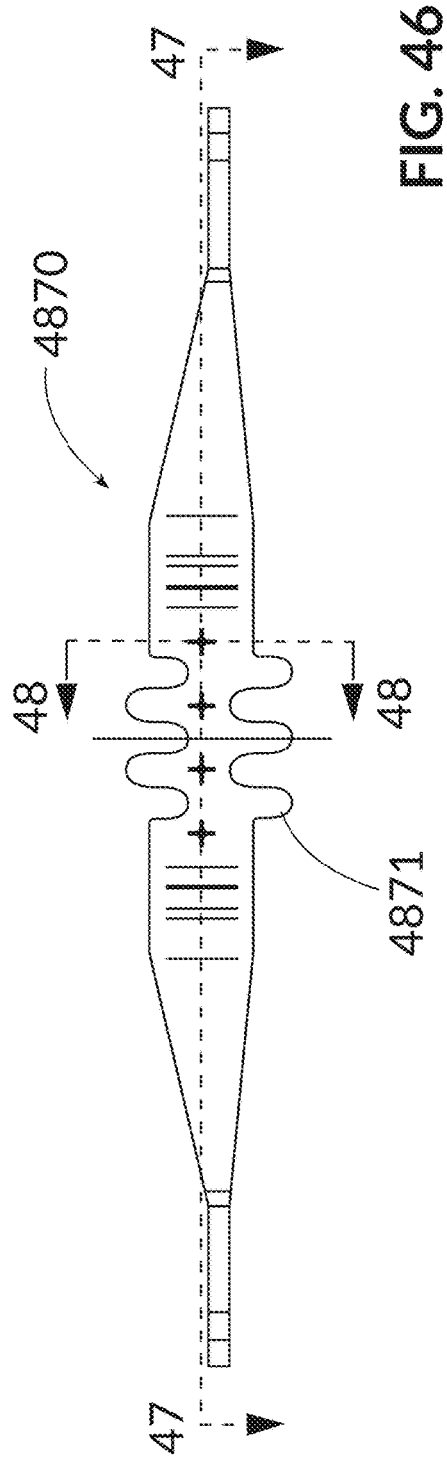
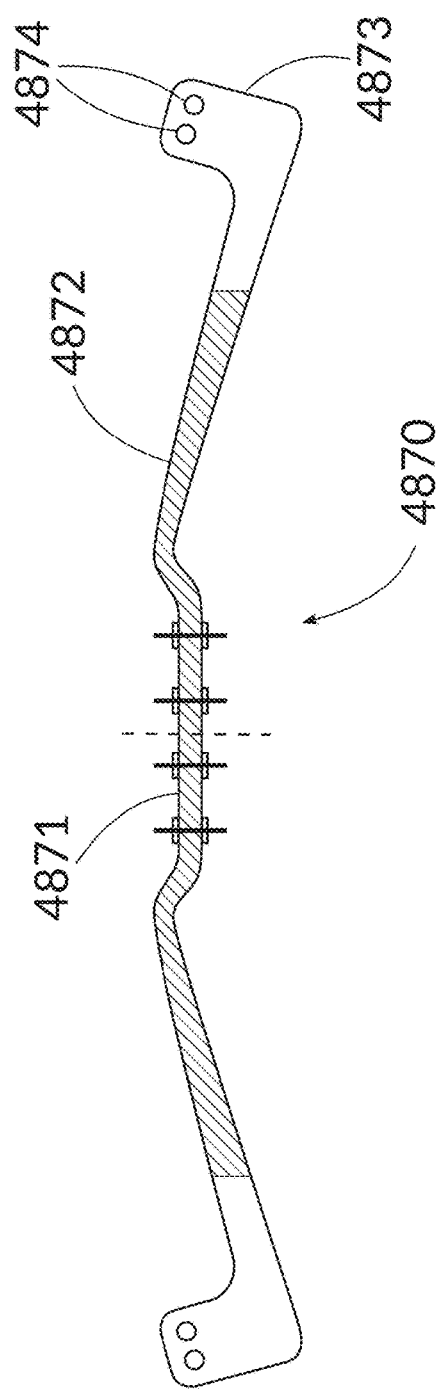
FIG. 46
FIG. 47

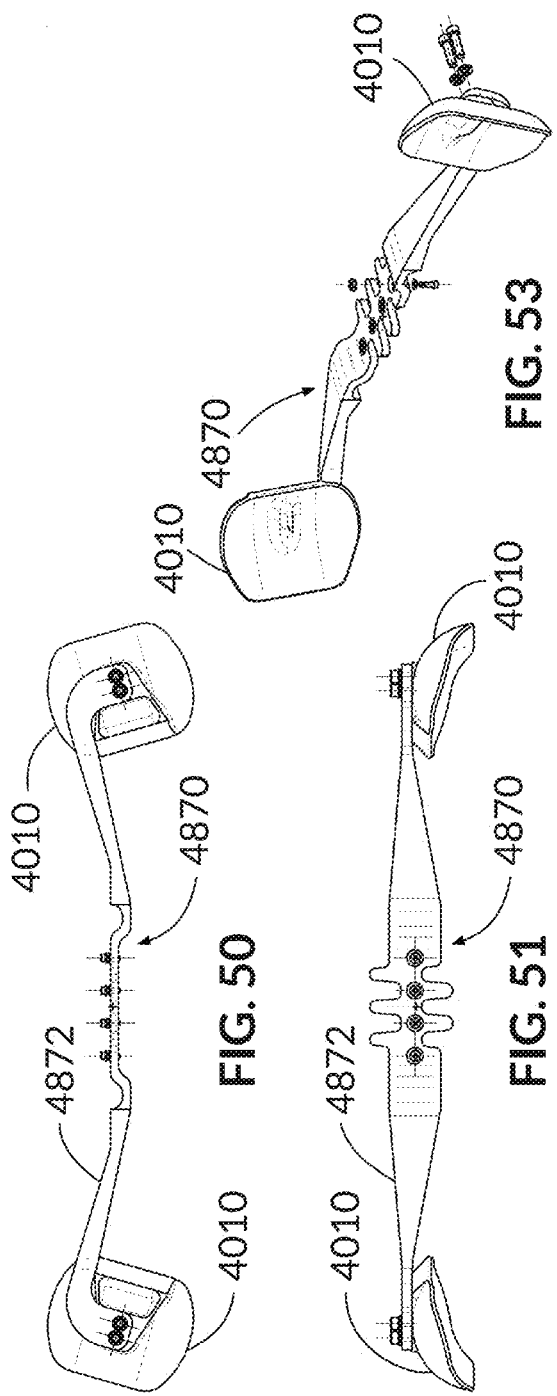
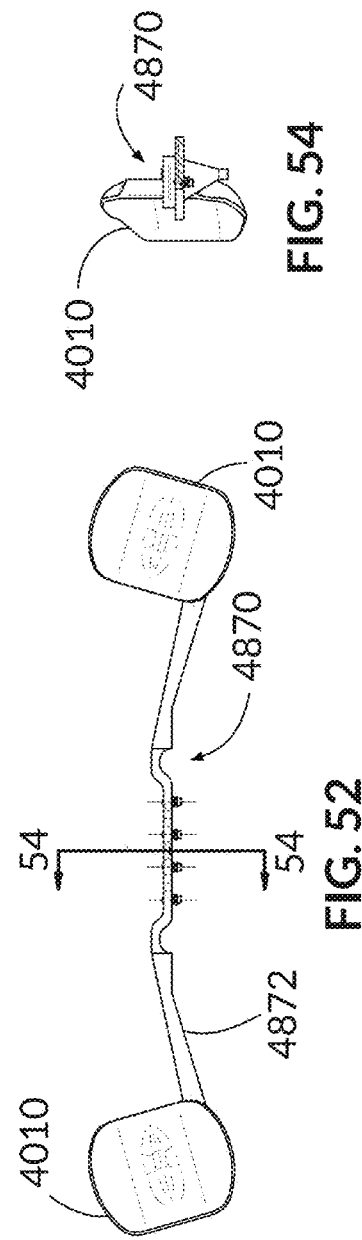

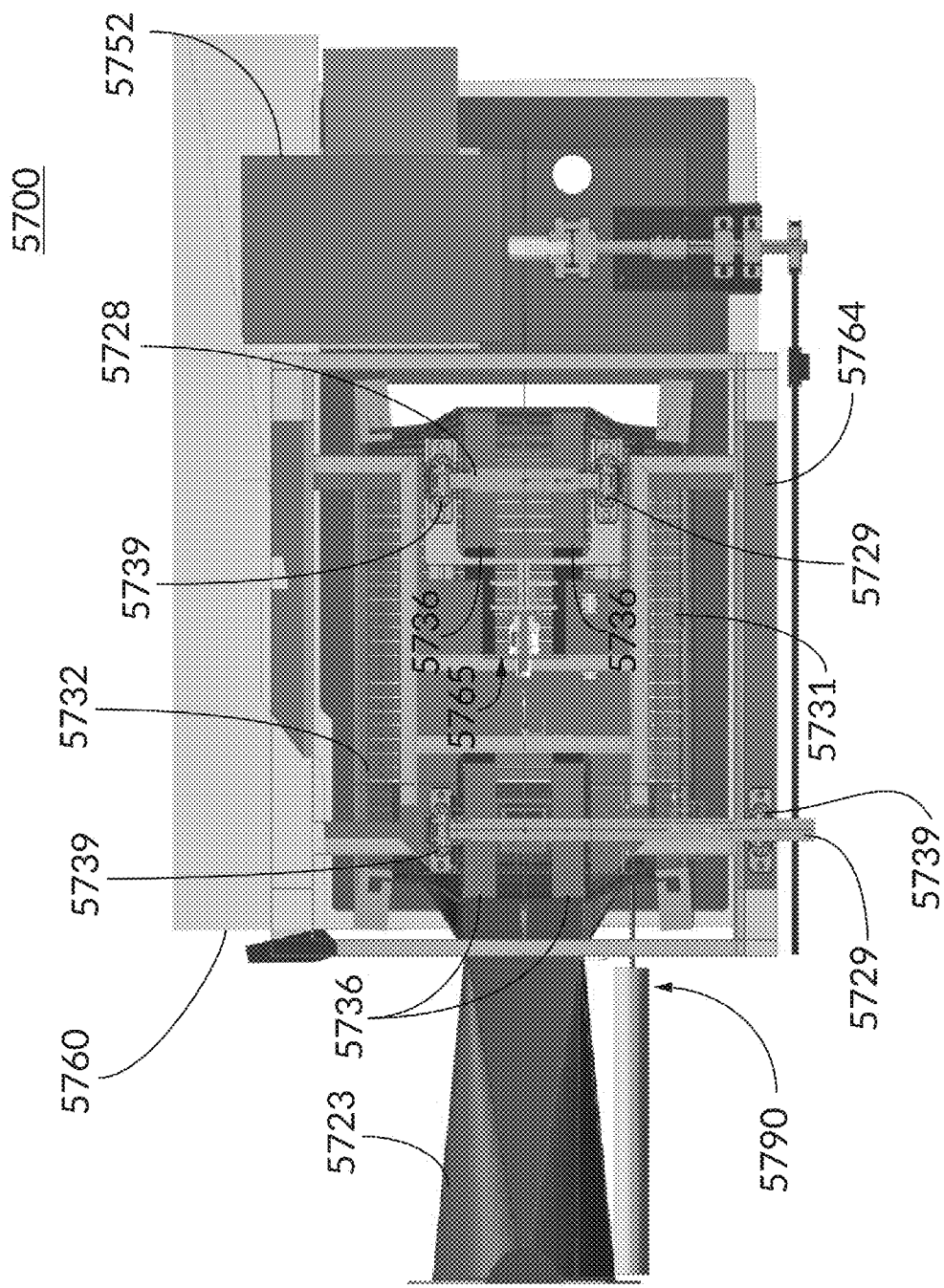

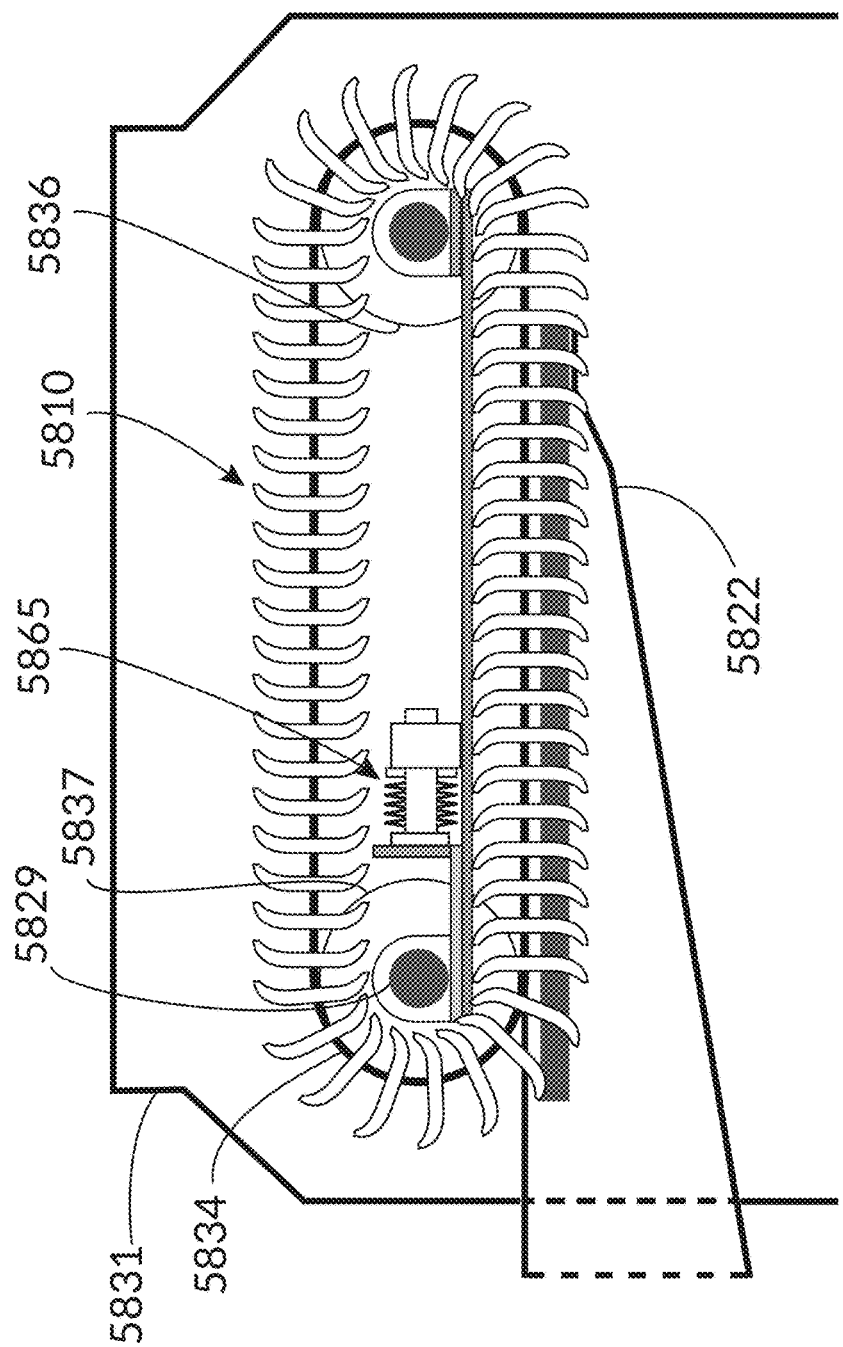

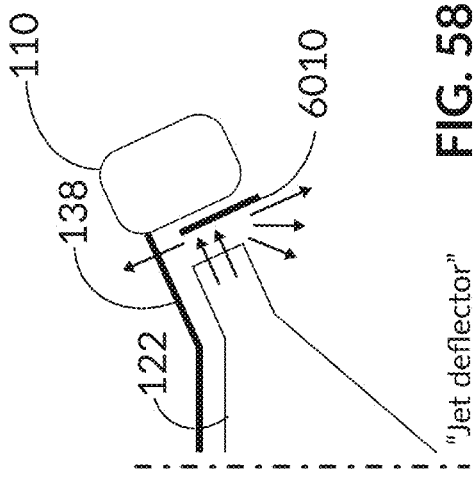
FIG. 58b "Jet deflector"
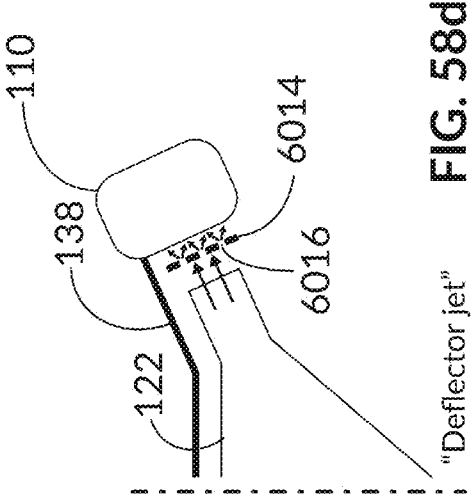
FIG. 58d "Deflector jet"
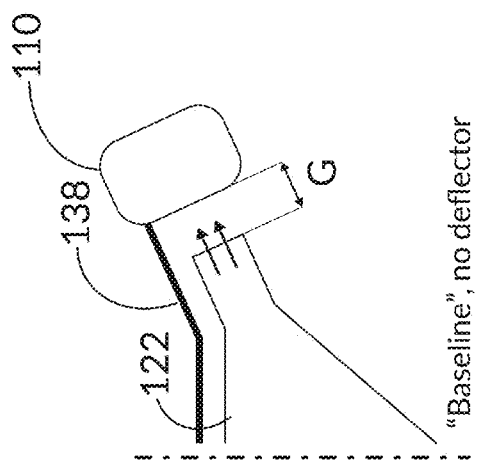
FIG. 58a "Baseline", no deflector
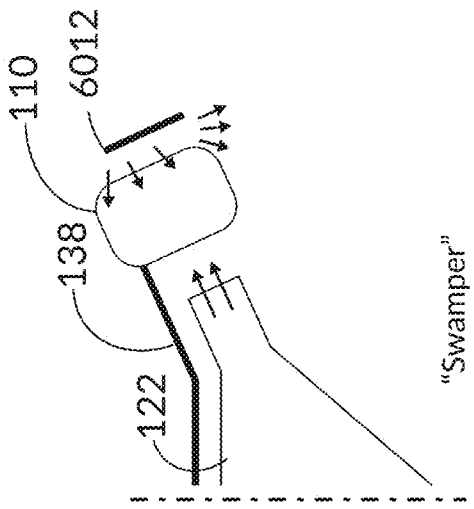
FIG. 58c "Swamper"

LINEAR PELTON TURBINE

CROSS-REFERENCE TO RELATED APPLICATIONS

This application claims the benefit of U.S. Provisional Patent Application No. 62/367,003, filed Jul. 26, 2016, and U.S. Provisional Patent Application No. 62/485,694, filed Apr. 14, 2017, both of which are incorporated herein by reference in their entireties, for all purposes.

BACKGROUND

Hydroelectric power generation harnesses flowing water—typically using a dam or other type of diversion structure—and converts kinetic energy (typically via a turbine) to generate electricity. The power output of a turbine involves the product of vertical head H (the vertical change in elevation the water level) and flow rate Q (the volume of water passing a point in a given amount of time) at a particular site. Head produces water pressure, and the greater the head, the greater the pressure to drive turbines. More head or higher flow rate translates to more power.

As illustrated in FIG. 68, these factors largely determine the type of turbine to be used at a particular site. Other non-limiting factors include how deep the turbine must be installed at a project relative to the water level downstream of the turbine (tailwater), efficiency, and cost.

Although hydraulic turbomachinery has seen widespread use for over a century, most conventional equipment is optimally suited for high head application, where environmental impacts may be severe. Most of the remaining hydroelectric energy generating potential that can be developed with relatively low environmental impact is located at sites with less than 10 meters of head.

Turbines historically finding application at low head have included waterwheels, Archimedean screws, and variations of propeller type turbines. Waterwheels and Archimedean screw turbines are progressive cavity devices, in which a bucket delivers a quantity of water from an upper elevation to a lower elevation, and the water quanta moves at the same speed as the bucket. Consequentially, these types of devices operate slowly and must be very large in order to pass large quantities of water. Propeller turbines and their derivatives, such as Kaplan turbines, can pass large quantities of water moving at high velocity across the turbine blades, but they may require large draft tubes to recover kinetic energy remaining in the fluid after leaving the turbine blades, and the units may need to be installed at a relatively low elevation with respect to the water level downstream of the turbine, to prevent operating problems such as cavitation. Consequentially, conventional turbines designed to produce power from low heads have typically been highly expensive, with extensive civil works necessitated by the operation requirements of the turbines.

Accordingly, there remains a need for a simple, highly efficient impulse turbine that is capable of operating high flow and a low head, especially at head of 10 meters or less. In addition, the environmental impact of a hydropower installation must also be taken into consideration.

BRIEF SUMMARY

Systems and methods related to linear turbine systems are presented. Each embodiment described herein may be designed as a single-stage, linear, impulse turbine system. In an embodiment, a linear turbine includes a first shaft extending along a first axis; a second shaft extending along a second axis, the second axis being separated from and substantially parallel to the first axis; a first plurality of buckets to travel a first continuous path around the first shaft and the second shaft along a first plane, the first path including a first substantially linear path segment between the first axis and the second axis; and a nozzle configured to direct a first fluid jet to contact the first plurality of buckets in the first linear path segment. The linear turbine may also include a second plurality of buckets to travel a second continuous path around the first shaft and the second shaft along a second plane, the second plane being substantially parallel to the first plane, the second path including a second substantially linear path segment between the first axis and the second axis, wherein the nozzle is configured to direct a second fluid jet to contact the second plurality of buckets in the second linear path segment. The nozzle of the linear turbine may be positioned between the first plane and the second plane and configured to direct the first fluid jet and second fluid jet outward to contact the first and second plurality of buckets.

In the embodiment, the nozzle may direct the first fluid jet to contact the first plurality of buckets at a non-zero inlet angle. In the embodiment, the first plurality of buckets and/or the second plurality of buckets are mounted to a powertrain, the powertrain having a drive shaft coupled to the first axis, the drive shaft being configured to drive an electric generator. In the embodiment, the first path may further include a second substantially linear path segment, a first substantially arc-shaped segment, and a second substantially arc-shaped segment. The linear turbine may be configured such that the first fluid jet does not contact the first plurality of buckets in the second substantially linear path segment. The nozzle may be a free-jet nozzle. The nozzle may also be positioned below a horizontal plane extending between the first axis and the second axis. The nozzle may be further configured to substantially distribute the first fluid jet at an angle to the first substantially linear path segment, the angle having a range from approximately 0° to approximately 50°. The nozzle may be further configured to substantially distribute the first fluid jet at an angle to the first substantially linear path segment, the angle having a range from approximately 10° to approximately 40°. The nozzle may be further configured to substantially distribute the first fluid jet at an angle to the first substantially linear path segment, the angle having a range from approximately 15° to approximately 35°.

In another embodiment, a single-stage linear turbine includes a first shaft extending along a first horizontal axis; a second shaft extending along a second horizontal axis, the second axis being separated from and substantially parallel to the first horizontal axis; a bucket to travel a first continuous path around the first shaft and the second shaft along a first plane, the first path including a first substantially linear path segment between the first axis and the second axis, a first substantially arc-shaped segment around the second axis, a second substantially linear path segment between the second axis and the first axis, and a second substantially arc-shaped segment around the first axis; and a nozzle configured to direct a fluid jet to contact the bucket in the first substantially linear path segment. The linear turbine may be configured such that the fluid jet does not contact the bucket in the second substantially linear path segment. The second substantially linear path segment may be positioned above the first substantially linear path segment. The linear turbine may further include a turbine blade, the bucket being connected to an end of the turbine blade (such as a at a crossbeam). The linear turbine may also include a moving structure with the turbine blade being connected to the moving structure. In some embodiments, the turbine blade is connected to the moving structure at its mid-span such that the end of the turbine blade is cantilevered. The moving structure may, for example, be a belt. In an embodiment, the nozzle is positioned below a horizontal plane extending between the first axis and the second axis. The nozzle may direct the fluid jet outward to contact the bucket. A speed of the fluid jet is greater than a speed of the bucket.

In an embodiment, a nozzle manifold for a linear turbine includes an inlet portion for receiving a volume of fluid, the inlet portion having a cross-section; a first outlet portion terminating in a first substantially rectilinear opening to provide a first rectilinear jet of fluid to the linear turbine; a second outlet portion terminating in a second substantially rectilinear opening to provide a second rectilinear jet of fluid to the linear turbine; and a bifurcation positioned between the inlet portion and the first and second outlet portions to divide the volume of fluid into the first outlet portion and the second outlet portion. In one embodiment, a distance between the inlet portion and the bifurcation is a range from approximately 0.02 to approximately 2.5 times the hydraulic diameter of the nozzle at the inlet cross-section. In one embodiment, a distance between the inlet portion and the bifurcation is a range from approximately 0.03 to approximately 0.1 times the hydraulic diameter of the nozzle at the inlet cross-section. The first rectilinear jet of fluid may be configured to exit the first substantially rectilinear opening and enter air as a free jet. In an embodiment, the cross-section of the inlet portion is substantially v-shaped. Also, a proximal edge of the inlet portion may be approximately coincident with the bifurcation.

In addition, the first and second outlet portions may be substantially symmetrical. In some embodiments, the first outlet portion directs the first rectilinear jet of fluid at an angle with respect to a plane that extends along the first substantially rectilinear opening, wherein the angle has a range from approximately 0° to approximately 40°. In other embodiments, the angle has a range from approximately 25° to approximately 35°. A velocity of the first rectilinear jet of fluid may be approximately equal to a velocity of the second rectilinear jet of fluid. In an embodiment, the first substantially rectilinear opening extends along a first plane and the second substantially rectilinear opening extends along a second plane such that the first plane and the second plane are substantially parallel. In other embodiments, the first substantially rectilinear opening extends along a first plane, the first plane having an angle in a range from approximately −5° to approximately 25° with respect to horizontal, more preferably from approximately −5° to approximately 15°.

In an embodiment, the linear turbine may include a first closure mechanism to control an area of the first substantially rectilinear opening. The first closure mechanism may be, for example, a slide gate that moves from a position adjacent a proximal portion of the first substantially rectilinear opening toward a distal portion of the first substantially rectilinear opening to reduce the area of the first substantially rectilinear opening. A second closure mechanism may also be used to control an area of the second substantially rectilinear opening. Like the first closure mechanism, the second closure mechanism may be, for example, a slide gate that moves from a position adjacent a proximal portion of the second substantially rectilinear opening toward a distal portion of the second substantially rectilinear opening to reduce the area of the second substantially rectilinear opening. An actuator and linkage may be used to simultaneously move the first closure mechanism and the second closure mechanism. Alternatively, the first closure mechanism may include rotatable wicket gates positioned adjacent the first substantially rectilinear opening. In either case, the first closure mechanism may include an elastomeric seal and a seal retainer, the seal retainer having an edge such that the first rectilinear jet of fluid separates cleanly from the seal retainer.

In an embodiment, a linear turbine system includes a linear turbine; and a nozzle configured to provide a fluid jet to the turbine. The nozzle may include an inlet portion for receiving a volume of fluid, the inlet portion having a cross-section; a first outlet portion terminating in a first substantially rectilinear opening to direct a first rectilinear jet of fluid outward to contact the linear turbine; a second outlet portion terminating in a second substantially rectilinear opening to direct a second rectilinear jet of fluid outward to contact the linear turbine; and a bifurcation positioned between the inlet portion and the first and second outlet portions to divide the volume of fluid into the first outlet portion and the second outlet portion. The first outlet portion may direct the first rectilinear jet of fluid into the linear turbine at an angle, for example, in the range from approximately 25° to approximately 35°.

In an embodiment, a linear turbine system includes a single-stage linear turbine; a free jet nozzle to supply a fluid jet to the turbine; and a housing configured to isolate the linear turbine and nozzle from an external atmosphere. The housing may include a chamber enclosing the linear turbine and nozzle. The chamber may have an outlet that is hydraulically sealed to an outlet fluid body and a control valve configured to control an amount of air in the chamber to maintain a desired elevation of suction head inside the chamber without allowing the outlet fluid body to contact the turbine. After the fluid jet contacts the turbine, fluid leaving the turbine exits the housing through the outlet. The turbine system may further include a drive shaft driven by the linear turbine, the drive shaft extending through the housing and configured to drive an electric generator positioned exterior to the housing. Movement of the fluid jet through an enclosed atmosphere in the chamber may entrain air from the enclosed atmosphere in the form of bubbles and momentum of the fluid jet evacuates the entrained bubbles of the enclosed atmosphere from the chamber. The control valve may be configured to automatically maintain a level of a fluid pool below the turbine. In addition, the control valve may be configured to automatically maintain a pressure inside the chamber below the external atmospheric pressure so as to increase a level of a fluid pool below the turbine.

In an embodiment, the nozzle receives a fluid source at a nozzle inlet, a bottom portion of the nozzle inlet being positioned at a first elevation, and the nozzle delivers the fluid jet to the turbine at a second elevation such that the first elevation is lower than the second elevation. The fluid jet may exit the turbine at a third elevation and the fluid falls to a fluid pool inside the chamber, a level of the fluid pool being at a fourth elevation such that the third elevation is higher than the fourth elevation. An exterior fluid surrounding the chamber outlet outside the chamber may have a level at a fifth elevation such that the fourth elevation is higher than the fifth elevation.

In an embodiment, a turbine system as described above may include a linear turbine having a first shaft extending along a first horizontal axis; a second shaft extending along a second horizontal axis, the second axis being separated from and substantially parallel to the first horizontal axis; and a first bucket to travel a first continuous path around the first shaft and the second shaft along a first plane. The first path may include a first substantially linear path segment between the first axis and the second axis, a first substantially arc-shaped segment around the second axis, a second substantially linear path segment between the second axis and the first axis, and a second substantially arc-shaped segment around the first axis. The nozzle may be configured to direct the fluid jet to contact the first bucket in the first substantially linear path segment such that the fluid jet does not contact the first bucket in the second substantially linear path segment. The second substantially linear path segment may positioned above the first substantially linear path segment.

In an embodiment, a second bucket may travel a second continuous path around the first shaft and the second shaft along a second plane. The second path may include a first substantially linear path segment between the first axis and the second axis, a first substantially arc-shaped segment around the second axis, a second substantially linear path segment between the second axis and the first axis, and a second substantially arc-shaped segment around the first axis. The nozzle may be configured to direct the fluid jet to contact the second bucket in the first substantially linear path segment of the second path such that the second fluid jet does not contact the second bucket in the second substantially linear path segment of the second path.

The turbine system may further include a turbine blade, with the first bucket being connected to a first end of the turbine blade (e.g., at a crossbeam) and the second bucket being connected to a second end of the turbine blade. The first bucket and the second bucket may be, for example, hydraulically self-centering.

The turbine system may also include a moving structure with the turbine blade connected to the moving structure. In an embodiment, the turbine blade is connected to the moving structure at its mid-span such that the first end of the turbine blade and the second end of the turbine blade are cantilevered. The moving structure may be, for example, a belt.

The nozzle may be positioned below a horizontal plane extending between the first axis and the second axis. The nozzle may also direct the fluid jet outward to contact the first bucket and the second bucket. For example, the nozzle may direct the fluid jet outward to contact the first bucket at an angle with respect to the first substantially linear path segment, the angle in a range from approximately 25° to approximately 35°. A speed of the fluid jet may be greater than a speed of the bucket.

In an embodiment, a linear turbine system may include a first shaft extending along a first axis; a second shaft extending along a second axis, the second axis being separated from and substantially parallel to the first axis; a plurality of buckets that travel a first continuous path around the first shaft and the second shaft along a first plane, the first path including a first substantially linear path segment between the first axis and the second axis, a first substantially arc-shaped segment around the second axis, a second substantially linear path segment between the second axis and the first axis, and a second substantially arc-shaped segment around the first axis; a nozzle configured to direct a fluid jet to contact the plurality of buckets in the first substantially linear path segment; and a depower system configured to cause rapid degradation of efficiency of the turbine system at an over-speed condition. In an embodiment, the depower system may include a deflector with the deflector arranged to selectively divert a portion of the fluid jet away from the bucket. The deflector may include a pivot plate. The pivot plate may be arranged between the nozzle and the plurality of buckets. In another embodiment, the depower system may include a deflector arranged exterior to the plurality of buckets to direct fluid that exits one of the plurality of buckets into a rear surface of an adjacent bucket. The linear turbine system may further include a control system to control the depower system in increments.

In an embodiment, a method of depowering a linear turbine system may include distributing, via a nozzle, a jet of fluid to a plurality of buckets of a linear turbine system causing the plurality of buckets to travel a path around a first axis and a second axis; and depowering the linear turbine system by rapidly degrading an efficiency of the linear turbine system. The method may further include actuating a flow deflector of the linear turbine system such that the deflector selectively diverts a portion of the jet of fluid away from the plurality of buckets. The method may also include pivoting a deflector plate arranged between the nozzle and the plurality of buckets to divert the portion of the jet of fluid. Alternatively, the method may include actuating a flow deflector arranged exterior to the plurality of buckets to direct fluid that exits one of the plurality of buckets into a rear surface of an adjacent bucket. In addition, the method may include depowering the linear turbine system by an efficiency increment.

The linear turbine bucket may be configured as an attachment to a turbine blade. In an embodiment, a linear turbine bucket may include a front surface having a concave curvature to receive a fluid jet from a first direction and turn the fluid jet toward a second direction and a rear surface to connect the linear turbine bucket to the linear turbine blade (e.g., at a crossbeam). A cross-section of the concave curvature may include, for example, a conic curve. The linear turbine bucket may include a reinforced rib, the reinforced rib being positioned along a centerline of the bucket and being configured to receive a fastener to attach the bucket to the turbine blade. Alternatively, the linear turbine bucket may be integral with the turbine blade. A projective discriminant of the conic curve, also known as the rho value of the conic, is a range from approximately 0.2 to approximately 0.6. The linear turbine bucket may include a rounded leading edge. Other computational geometric surfaces are contemplated.

With a linear turbine bucket having a base; a top; a left side; and a right side, the fluid jet may be configured to enter the bucket at the base and exit the bucket at the top, where a bucket width extends from the left side to the right side. The bucket width may have a range, for example, from approximately 100 mm to approximately 1000 mm. The bucket width may have a range, for example, from approximately 110 mm to approximately 500 mm. The bucket width may have a range, for example, from approximately 110 mm to approximately 130 mm. In an embodiment, the bucket ratio of the width to the size of a height of the fluid jet is a range from approximately 2 to approximately 6, wherein the height of the fluid jet extends along a width direction and the bucket width extends along the width direction. As used herein, "height" is not limited to a vertical orientation with respect to ground. It may be a general measurement, as measured with respect to the width direction of the bucket as discussed herein and described in the figures. The linear turbine bucket may also include a ramp on the rear surface, the ramp including an edge to separate the fluid jet from the rear surface.

In an embodiment, a linear turbine may include a turbine blade (e.g., blade, which may include a crossbeam) to travel a path around a first axis and a second axis parallel to the first axis; and a bucket connected to the blade at a bucket rear surface, the bucket including a front surface having a concave curvature to receive a fluid jet from a first direction and turn the fluid jet toward a second direction. The concave curvature may be a conic curve, a projective discriminant of the conic curve (i.e., "rho" value) being a range from approximately 0.2 to approximately 0.6. The projective discriminant of the conic curve may be in a range from approximately 0.3 to approximately 0.5. The projective discriminant of the conic curve may be in a range from approximately 0.35 to approximately 0.6. The concave curvature may include multiple conic curves, each having a projective discriminant within the above range.

The linear turbine bucket may include a base; a top; a left side; and a right side, and is configured such that the fluid jet enters the bucket at the base and exits the bucket at the top, and a bucket width extends from the left side to the right side. The linear turbine bucket may also include a rounded leading edge. The bucket width may be, for example, approximately two to six times the size of a height of the fluid jet, where the height of the fluid jet extends along a width direction and the bucket width extends along the width direction. The linear turbine bucket further comprising a reinforced rib, the reinforced rib being positioned along a centerline of the bucket and being configured to receive a fastener to attach the bucket to the blade. The linear turbine bucket may include a ramp on the bucket rear surface, the ramp including an edge to separate the fluid jet from the rear surface. The linear turbine bucket may be attached to a blade to mount on a linear turbine. Alternatively, the linear turbine bucket may be integral with the turbine blade.

In an embodiment, a linear turbine system may include a first shaft; a second shaft separated from and substantially parallel to the first shaft; a movable structure that travels a continuous path around the first shaft and the second shaft along a first plane; a plurality of buckets connected to the movable structure; and a nozzle configured to direct a fluid jet to contact the plurality of buckets, wherein the plurality of buckets are shaped to direct the fluid jet away from the movable structure. The linear turbine system may further include a first blade attached to the movable structure and including one of the plurality of buckets connected to a first end and one of the plurality of buckets connected to a second end, wherein the plurality of buckets are shaped to direct the fluid jet away from the first blade. The first blade may have a central portion attached to the movable structure; a first intermediate portion positioned between the central portion and the first end, the first intermediate portion being angled toward a plane that extends between the first shaft and the second shaft.

The first end may include a first tab that is approximately perpendicular to the first intermediate portion, the one of the plurality of buckets connected to the first end being attached to the first tab. The first blade may further include a second intermediate portion positioned between the central portion and the second end, the second intermediate portion being angled toward the plane that extends between the first shaft and the second shaft. The second end may include a second tab that is approximately perpendicular to the second intermediate portion, the one of the plurality of buckets connected to the second end being attached to the second tab.

The linear turbine system may further include a second blade attached to the movable structure and including one of the plurality of buckets connected to a first end and one of the plurality of buckets connected to a second end, wherein the plurality of buckets are shaped to direct the fluid jet away from the second blade. The second blade may be separated from the first blade by a blade or bucket separation distance. As shown in various figures, beginning with FIG. 4, a bucket separation distance may be denoted by "S". The ratio of the bucket axial chord "C" to the bucket separation distance S (i.e., C/S, denoted as "solidity") may be a range from approximately 0.9 to approximately 3. The first arc shaped path segment and second arc shaped path segment may be of substantially equal diameter. The size of this diameter may be between approximately 1.5 and approximately 4 times larger than the bucket width. In some embodiments, the arc shaped path segments may substantially correspond to the dimensions of the sprockets, such that their diameters are coincident, or substantially coincident. Similar dimensions may be defined by a blade or bucket separation distance. The first shaft may be separated from the second shaft by a shaft separation distance, the shaft separation distance being a range from approximately 1.3 to approximately 5 times larger than the diameter of the arc shaped path segments. The first shaft may be separated from the second shaft by a shaft separation distance, the shaft separation distance being a range from approximately 1.5 to approximately 4 times larger than the diameter of the arc shaped path segments. The first shaft may be separated from the second shaft by a shaft separation distance, the shaft separation distance being a range from approximately 2 to approximately 5 times larger than the diameter of the arc shaped path segments.

Solidity values may be selected to positively affect efficiency, and are scalable to differing installation requirements.

The linear turbine system may further include a roller or other support mechanism or system positioned between the first shaft and the second shaft to decrease an unsupported span of the movable structure. The linear turbine system may also include a tensioner to maintain tension in the movable structure. The tensioner may have a movable plate connected to the second shaft, the movable plate being configured to maintain the second shaft as substantially parallel to the first shaft and a pushing mechanism to push the movable plate away from the first shaft. The pushing mechanism may include a spring.

The first blade may be connected to the moving structure at its mid-span such that the first end of the first blade and the second end of the first blade are cantilevered. The moving structure may be a belt, for example. The nozzle may be positioned below a horizontal plane extending between the first axis and the second axis. The nozzle may direct the fluid jet outward to contact the plurality of buckets. The nozzle may direct the fluid jet outward to contact the plurality of buckets at an angle with respect to a first substantially linear path segment of the plurality of buckets between the first shaft and the second shaft, the angle having a range, for example from approximately 25° to approximately 35°. A speed of the fluid jet may be greater than a speed of one of the plurality of buckets.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the pertinent art to make and use the invention.

FIG. 11 illustrates a nozzle arrangement.

FIG. 12 illustrates a nozzle arrangement.

FIGS. 25-29 illustrates jet angle contours at different slide gate positions.

FIG. 30 illustrates profile at the centerline at different slide gate positions.

FIGS. 31-33 plot various parameters vs. slide gate position.

FIGS. 41-45a/b show an exemplary bucket design for a linear turbine.

FIGS. 46-49 are schematic views of an exemplary cross-beam design for a linear turbine.

FIG. 50-54 are schematic views of an exemplary cross-beam and bucket assembly (e.g., turbine blade) for a linear turbine.

FIG. 55 is a top view a linear turbine system configured as a compact arrangement.

FIG. 56 is a side view of a linear turbine chassis and take-up system.

FIGS. 58a-58d show a turbine system with no deflector, a turbine system with a jet deflector, a turbine system with a swamper, and a turbine system with a deflector jet, respectively, according to various embodiments.

DETAILED DESCRIPTION OF THE INVENTION

Embodiments of a system, method, and apparatus for producing power from a fluid source (e.g., fluid impulse source) addresses a significant challenge in the capture of low-head fluid power resources, such as low-head hydropower. The linear turbine may be configured for use at drops in elevation in natural waterways (e.g., river) or constructed waterways (e.g., a canal). The linear turbine enables power to be produced with high efficiency, and maintains high efficiency despite changes in the amount of fluid passing through the engine.

Embodiments disclosed have numerous advantages over prior turbine designs. The implementation of hydraulic impulse turbine principles in the design and operation of embodiments discussed allows the engine to maintain high efficiency over a broad range (low to high) of flows at low head. Embodiments of the linear turbine system disclosed herein may achieve efficiency of greater than or equal to 85%. Embodiments of the linear turbine system may be capable of generating over 1 MW at 10 meters ("m") head.

By way of background, turbines convert the kinetic energy of a moving fluid to useful shaft work by the interaction of the fluid with a series of buckets, paddles, or blades arrayed about the circumference of a runner. Two main classes of turbines (impulse and reaction) have many variations.

Reaction machines utilize a pressure drop across the moving blades. A reaction turbine develops power from the combined action of pressure and moving water. Reaction turbines are generally used for sites with lower head and higher flows than compared with the impulse turbines.

In an impulse machine, the entire pressure drop occurs before the fluid interacts with the moving blade, so pressure is constant across the moving blades. Conventional impulse turbines include a runner designed to rotate about a single axis when the force of a stream of water hits blades or buckets that are mounted around the perimeter of a runner. Typically, there is no suction on the outlet (e.g., down) side of the turbine, and the water falls out the bottom of the turbine housing after leaving the buckets. Conventional impulse turbines are generally suitable for high head, low flow applications.

Figure 70:
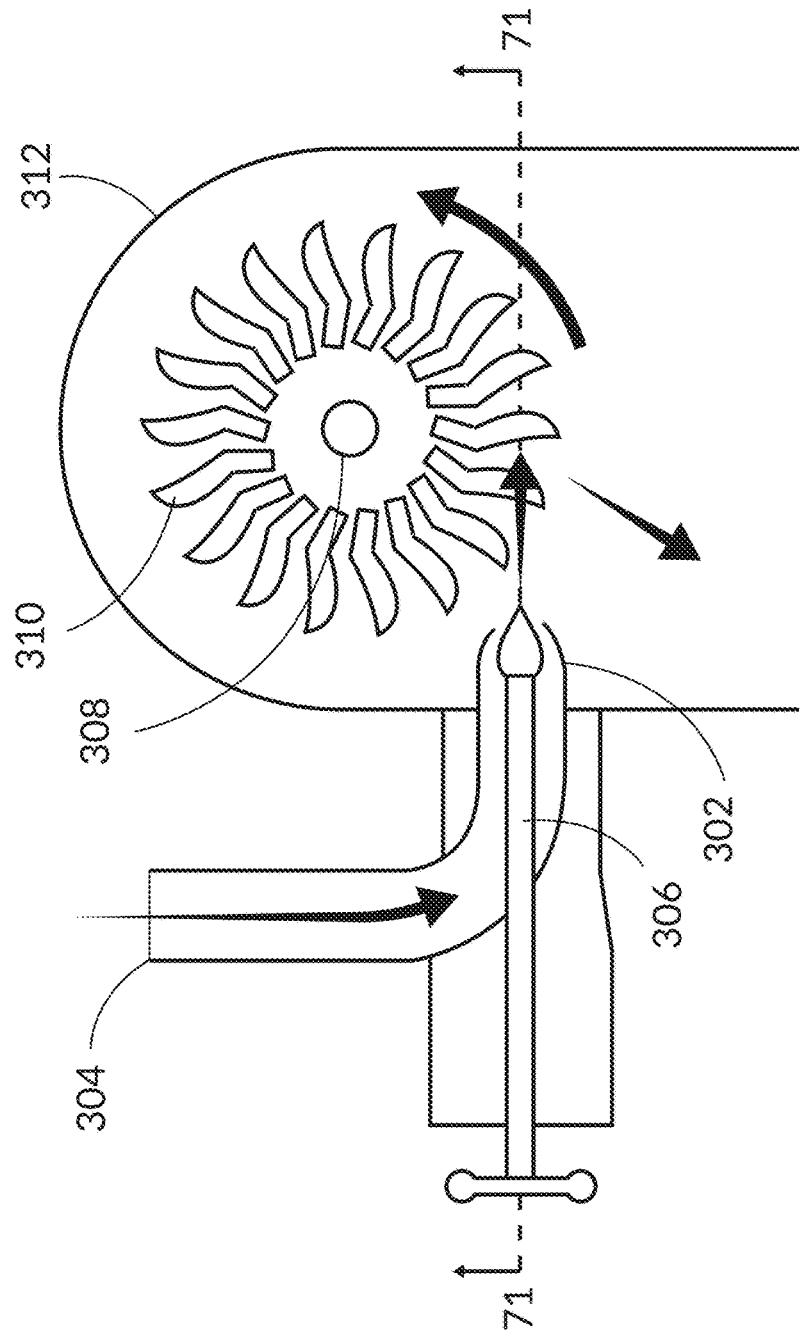
FIG. 70 is a schematic side view of a conventional Pelton turbine.
Figure 71:
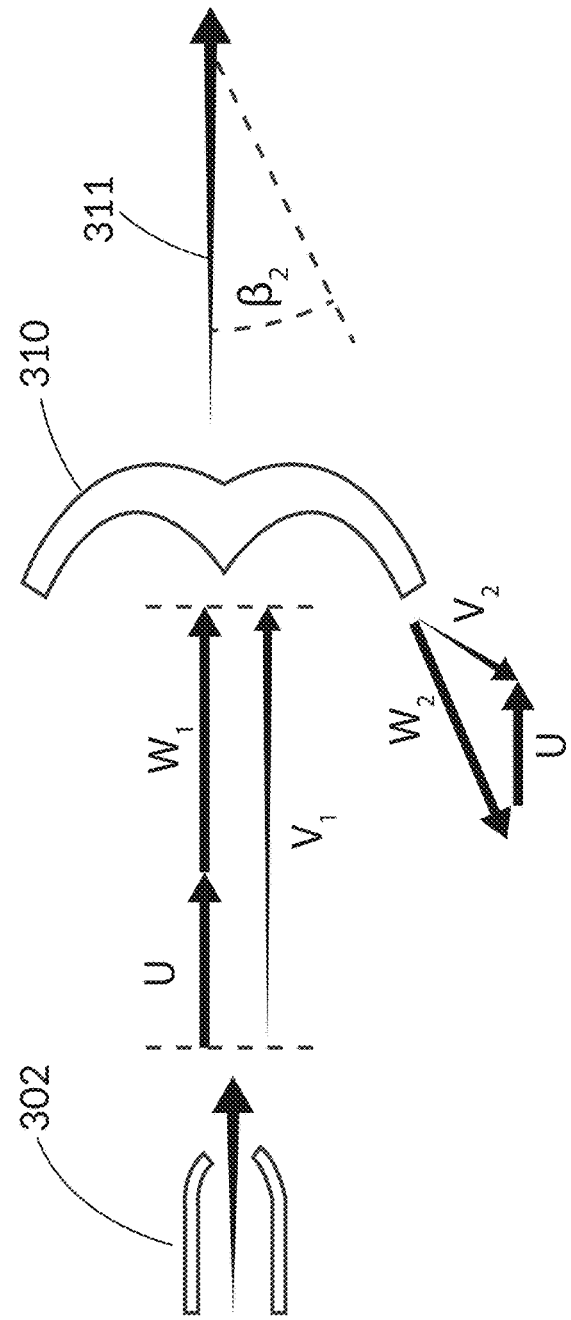
FIG. 71 is a schematic sectional view of a conventional Pelton turbine with velocity vectors.

The Pelton turbine is the most common type of hydraulic impulse turbine in use today. FIGS. 70 and 71 depict a conventional Pelton turbine arrangement in a case 312. The Pelton turbine has one or more nozzles 302 that are positioned to orient a jet of water 303 tangential to a rotatable wheel. A plurality of Pelton buckets 310 are mounted about the perimeter of the rotatable wheel. Jet 303 impacts the plurality of Pelton buckets 310 on the wheel at their centers. The impact on the plurality of Pelton buckets 310 results in a torque, causing the wheel to rotate a coaxial drive shaft 308. The drive shaft 308 may in turn drive a generator to produce electricity. Flow rate through the nozzle is adjustable through use of a valve, such as a spear valve. An adjustable spear 306 has a tapered point which cooperates with the nozzle 304 to act as a control valve to adjust the flow of the water jet.

The curvature of the Pelton buckets is chosen so that the exiting flow is turned to a direction nearly opposite to that of the incoming jet. A practical limit of this turning angle is about 165° in order to avoid subsequent buckets splashing against the outflow. Even with this limitation, Pelton turbines today typically have peak efficiency of about 0.9 (about 90%), with multi jet Pelton wheels (multiple individual jets arranged around the wheel to simultaneously push different buckets on the wheel) having efficiency exceeding 0.92. However, these turbines have the smallest specific speed of any common turbine, and thus are limited in use to very high head, e.g., over 90 meters, and frequently over 1,000 meters. Turgo turbines behave in a manner similar to Pelton turbines, but allow increased specific speed by allowing flow to intersect multiple sequential blades at once. However, Turgo turbines are still medium-to-high-head machines, with most units being utilized above 50 meters of head.

Embodiments discussed herein overcome many of the shortcomings of Pelton and Turgo turbines. As discussed below, the linear turbine (e.g., linear turbine system) may be optimized to work efficiently over a large range of head (for example, from approximately 20 meters head to approximately 2 meters head). Buckets may be mounted symmetrically on either side of a central chassis structure, about parallel shafts. The linear path of travel may be orientated in a generally horizontal direction.

The linear turbine is preferably installed such that the lowest buckets (as installed at an installation site) are located above the tailwater. The linear turbine may be equipped to operate within a case, chamber or housing capable of maintaining a vacuum relative to the ambient atmosphere, enabling the turbine to avoid loss of head below the turbine by locally elevating the tailwater inside the case. This results in the tailwater inside the case being at a level higher than the ambient surrounding tailwater. The linear turbine avoids cavitation risk due to its operation as an impulse turbine with relatively low suction head.

These and other features allow the turbine to be installed above tailwater in a way that substantially reduces civil works costs. Moreover, a free jet nozzle and single-stage interaction of the jet with the buckets causes the majority of resultant forces on the blades (imparted in the buckets) to be directed substantially in the direction of blade travel. By mounting buckets symmetrically about a bifurcated nozzle on the turbine blade, such as through a crossbeam, loads along the length of the beam are resolved into tension within the beam. By locating the buckets such that the center of pressure imparted by the fluid on each bucket is substantially close to the pitch line of the belt, moment loads are minimized, allowing the blade-to-belt attachment mechanism to become simple, primarily being designed to pass shear from the blade, into the belt. The moving impulse blades experience little drag force, so frictional losses are minimal. In some embodiments, the crossbeam and buckets may be modular, such that buckets having different sizes and shapes may be interchangeable for a given turbine.

The linear turbine may be designed without tight clearances between moving blades and stationary components, and may also implement a simple flow control. In some embodiments, the linear turbine may include a rapid depowering system. The linear turbine design is debris tolerant and thus robust to certain environmental conditions. In addition, the linear turbine produces power while maintaining pressure and velocity conditions within the fluid commensurate with biological organisms' vital needs. For example, the linear turbine design may be "fish-friendly" when utilized in a water environment.

A linear turbine system as described herein may utilize a nozzle and bucket system for efficient power conversion, without requiring a draft tube, stators, wicket gates, stay vanes, or guide vanes. Just as a conventional Pelton bucket's role is to harness the energy from the free jet (effectively reversing the direction of the free jet), the same is true of the linear turbine bucket. Similarly, the nozzle's role is to convert pressure (potential energy) into velocity (kinetic energy) with minimal loss, and orient the fluid jet toward the buckets at an optimal angle with high uniformity. As used herein, when referring to the linear turbine system, "bucket" denotes a portion of the turbine blade, such as a curved surface, that receives fluid and redirects it (converting the energy from the fluid). This is in contrast to water wheels, for example, which receive fluid and hold fluid as the water wheel turns.

The jet utilized in a conventional Pelton turbine has a circular cross-section along the jet's direction of travel. In some embodiments, in a linear turbine as described herein, the jet may be rectilinear, or have a substantially rectangular cross-section (either as shown by the nozzle outlet, or direction of travel of the jet exiting the nozzle). The jet cross-section may have a predetermined length to accommodate a desired number of buckets (or bucket modules) mounted on a powertrain conveyor, such as a belt, chain, track, or direct drive system. In contrast to the conventional Pelton arrangement, where an individual jet is limited to providing an impulse to one or two buckets at a time, a single, extended jet, such as a rectilinear jet, may be configured to simultaneously provide impulses to a large number of buckets (due to the linear nature of the turbine). As described below, two or more rectilinear jets may be utilized to multiply the already large number of impulses. Like a conventional Pelton turbine, the linear turbine systems described herein may be single-stage impulse turbine systems, that is, an impulse transfer of energy from the fluid flow to the turbine occurs in a single stage. The linear turbines discussed herein may also be configured as multi jet turbines, and similarly may be configured as multi-stage turbines.

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

As used herein, ranges are inclusive of endpoints.

As used herein, "substantially," and "about," when used in combination with ranges, are used to include variation of around +/−5% of the recited value.

Figure 1:
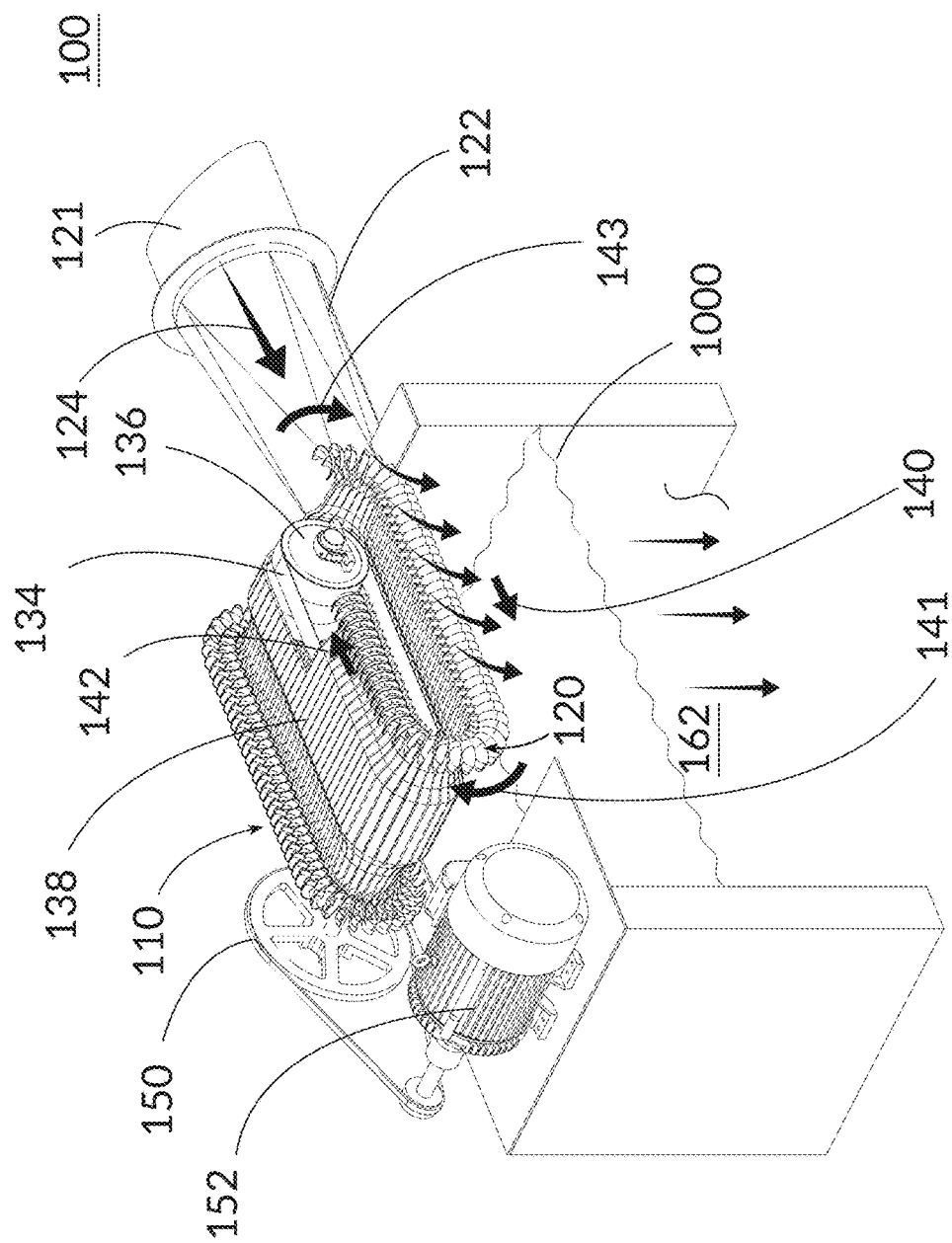
FIG. 1 is a perspective view of a linear turbine system according to an embodiment.
Figure 2:
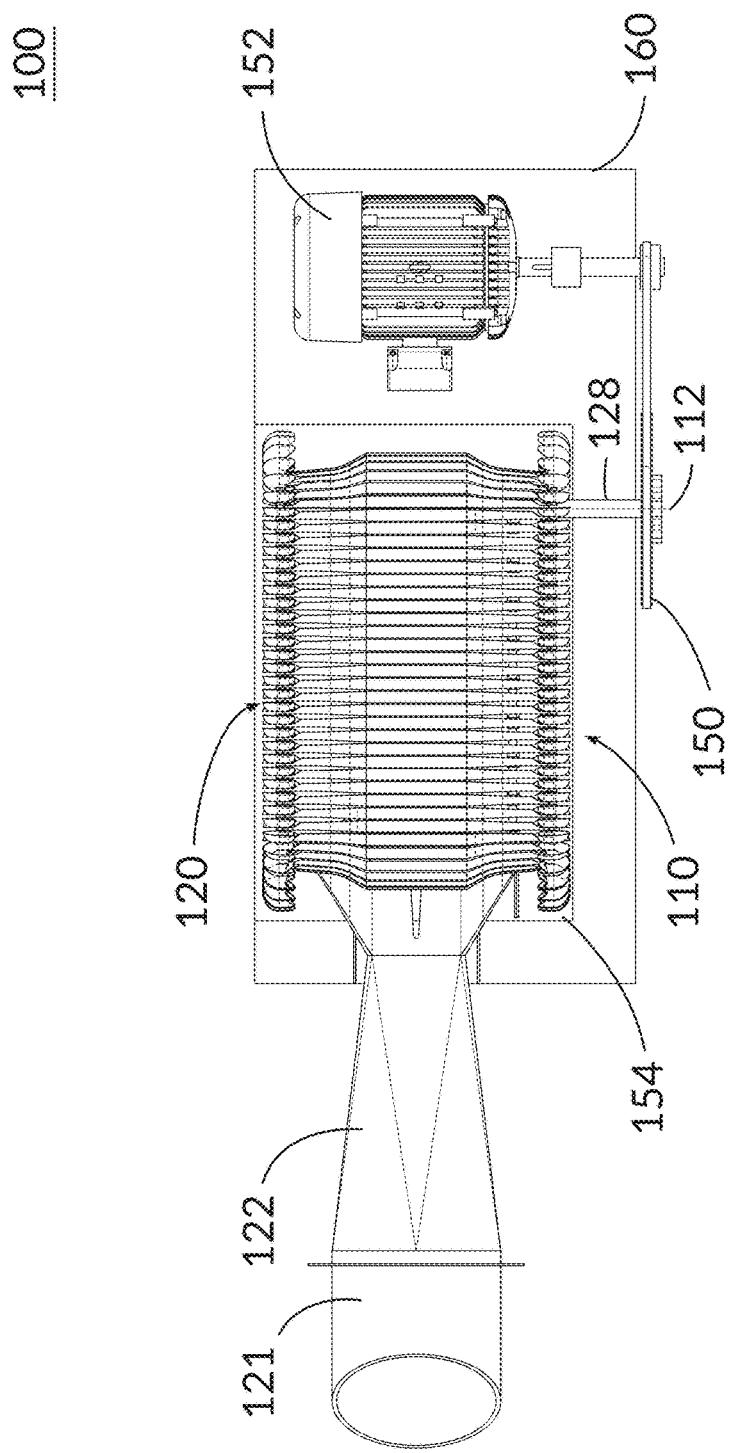
FIG. 2 is a top view of the linear turbine system shown in FIG. 1.
Figure 3:
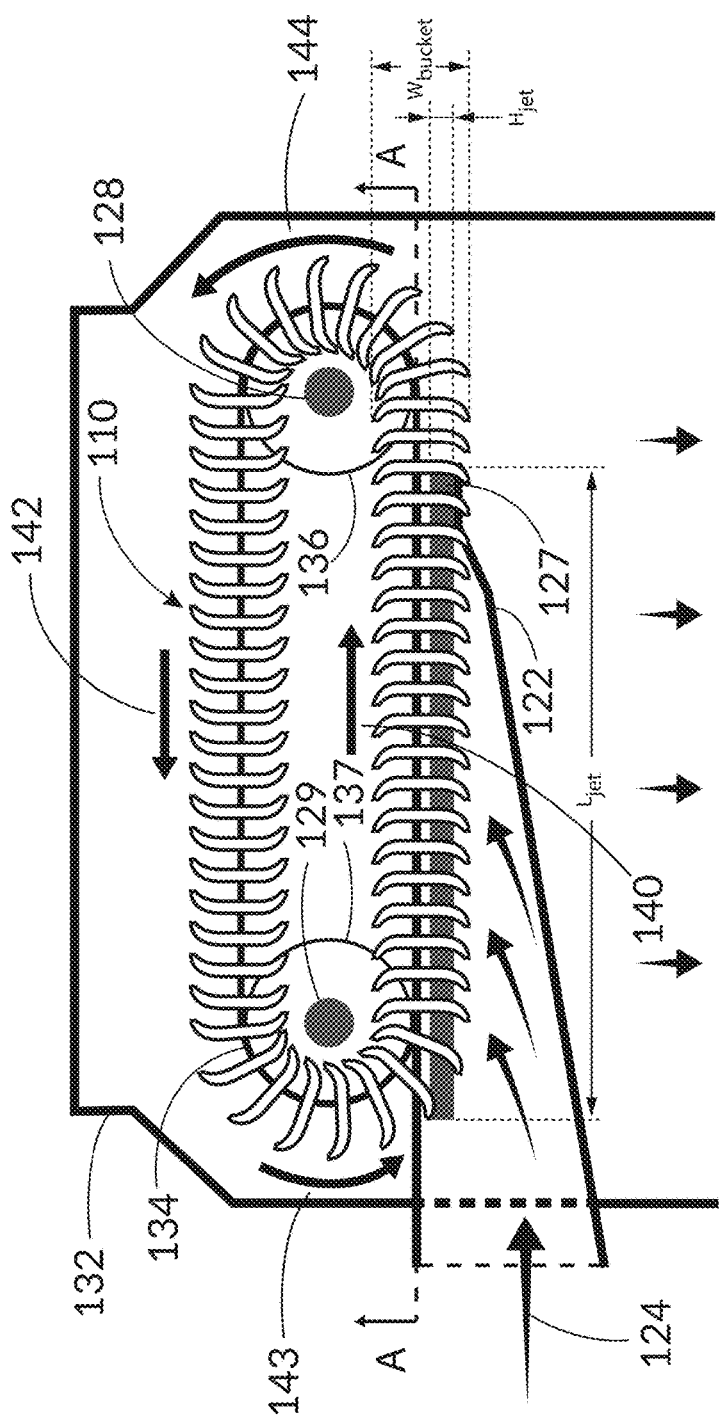
FIG. 3 is a schematic side view of the linear turbine system according to an embodiment.
Figure 4:
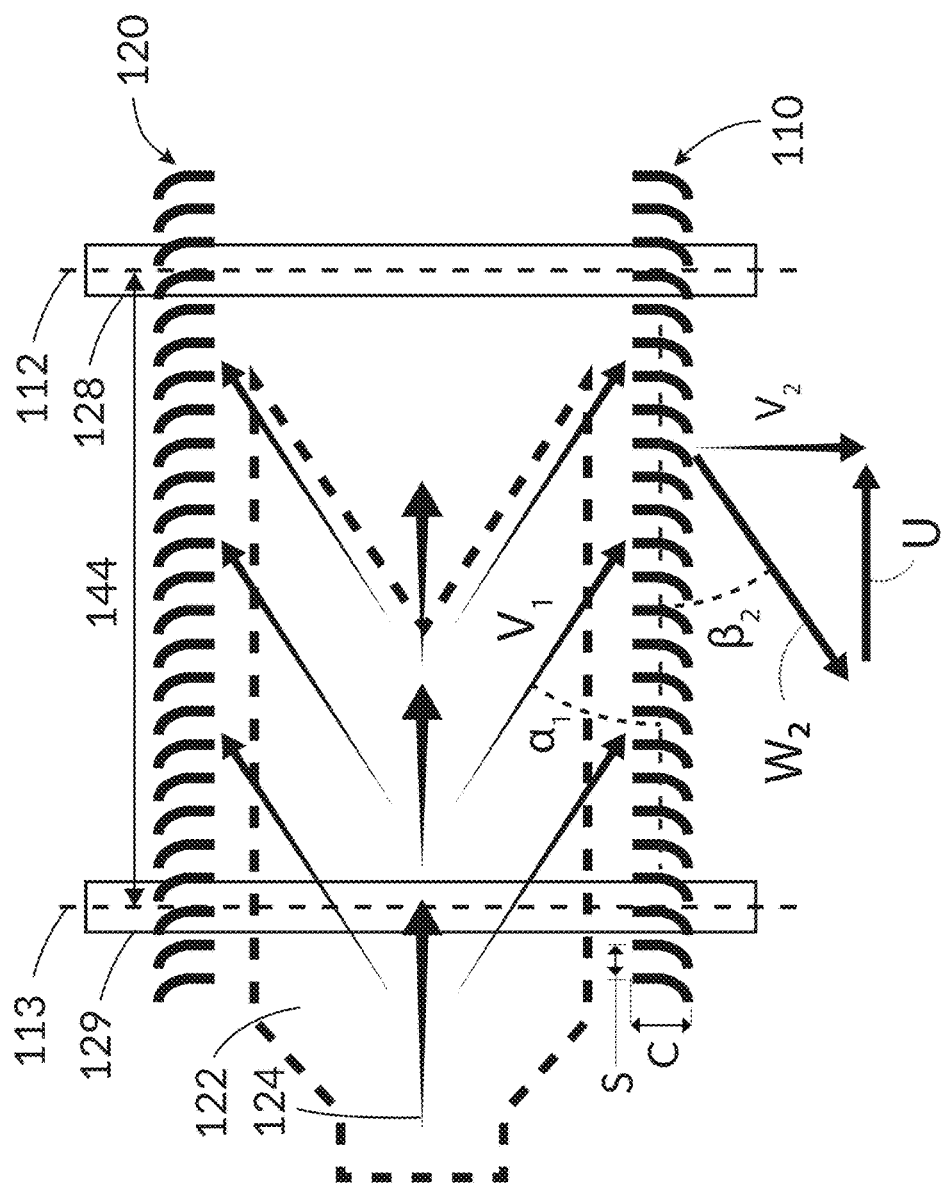
FIG. 4 is a schematic sectional view of the linear turbine system according to an embodiment.

Referring to FIGS. 1-4, one embodiment of a linear turbine or linear turbine system 100 is implemented as a hydroelectric engine for producing electric power from a fluid impulse source. FIG. 1 shows a partial perspective view of linear turbine system 100 with a portion removed to illustrate the underlying chassis. Unlike a conventional Pelton turbine which has a single axis of rotation, linear turbine system 100 is arranged having a first shaft 128 extending along a first axis 112 and a second shaft 129 extending along a second axis 113 (FIG. 4). Second axis 113 is separated from and substantially parallel to first axis 112. This configuration creates substantially linear path segments 140, 142, which are utilized for impulse power. Water level 1000 is shown within the system, at a higher level than ambient water level outside the system due to the partial relative vacuum created by the system's operation.

As shown in FIGS. 1-4, linear turbine system 100 includes a first plurality of buckets 110 to travel a first continuous path (indicated by arrows 140, 141, 142,143) around first shaft 128 and second shaft 129 with the path substantially confined to a first plane perpendicular to first axis 112 and second axis 113. In some embodiments, the fluid may be discharged in the first linear path segment. Buckets 110 may be configured as blades, or attached to an additional element that makes up a finished blade, such as crossbeam 138. In some embodiments, crossbeam 138 may be a portion of a blade. The first path 140, 141, 142,143 includes a first substantially linear path segment 140 between first axis 112 and second axis 113; a second substantially linear path segment 142 between first axis 112 and second axis 113; a first substantially arc-shaped segment 141 connecting first linear path segment 140 to second linear path segment 142; and a second substantially arc-shaped segment 143 connecting second linear path segment 142 to first linear path segment 140. First axis 112 and second axis 113 are separated by a axial separation distance 144 along a horizontal direction and in the plane of first continuous path 140, 141, 142,143 as measured from the centerlines of the shafts 112/113. Thus, axial separation distance 144 substantially defines the length of linear path segments 140, 141. As will be appreciated by a person of ordinary skill in the art, the term "substantially linear" with regard to linear path segments 140, 141 is intended to account for minor variances in the linear path due to mechanical constraints on the system, such as a measurement of sag due to gravity. As discussed herein, a tensioning system may be implemented with the linear turbine system, in part, to minimize such constraints.

In some embodiments, first linear path segment 140 is designed to be substantially linear so as to engage a linear (e.g., substantially rectilinear) free jet. In some embodiments, second linear path segment 142 needed not be so confined if second linear path segment 142 is not similarly utilized for free jet impulse power. Instead of second linear path segment 142, a non-linear path segment (e.g., arcuate), additional path segments (e.g., arcuate and linear), or no path segment (e.g., directly linking first and second arc-shaped segments 141, 143) may be utilized.

Linear turbine system 100 also includes a second plurality of buckets 120 symmetrically arranged to first plurality of buckets 110. Like buckets 110, buckets 120 are configured to travel a continuous path around first shaft 128 and second shaft 129 with the path substantially confined to a plane perpendicular to first axis 112 and second axis 113 (and thus parallel to first path 140, 141, 142, 143). Like first path 140, 141, 142, 143, the path for buckets 120 similarly includes a first substantially linear path segment between first axis 112 and second axis 113; a second substantially linear path segment between first axis 112 and second axis 113; a first substantially arc-shaped segment connecting first linear path segment to the second linear path segment; and a second substantially arc-shaped segment connecting the second linear path segment to first linear path segment.

In the embodiment shown in FIGS. 1-4, first plurality of buckets 110 and second plurality of buckets 120 may be mechanically linked so as to rotate together on first shaft 128 second shaft 129 about first axis 112 and second axis 113. Linkages may be in the form of dually cantilevered crossbeams 138, which couple one individual bucket from each of first plurality of buckets 110 and second plurality of buckets 120 by fixedly mounting a bucket on either end of the crossbeams 138. Crossbeams 138 are center mounted to a powertrain that is configured to constrain the crossbeam and bucket assemblies along first path 140, 141, 142, 143. Details regarding embodiments of the buckets and crossbeams that may be utilized with linear turbine system 100 are described below. Crossbeams 138 may be attached directly the belt, (e.g., requiring no bearings or platforms themselves), in some embodiments.

As illustrated in FIGS. 1-4, a nozzle/nozzle system may be employed to provide impulse power to linear turbine system 100. A nozzle 122 may be positioned between the first continuous path 140, 141, 142, 143 of first plurality of buckets 110 and the second continuous path (parallel to first path 140, 141, 142, 143) of second plurality of buckets 110. Nozzle 122 is configured to direct a first fluid jet to contact first plurality of buckets 110 along first linear path segment 140. Nozzle 122 is also configured to direct a second fluid jet to contact second plurality of buckets 120 along a linear path segment. Nozzle 122 is configured such that fluid jet may be a free jet. In addition, nozzle 122 is configured to generate well-conditioned flow from a penstock or inlet to two nozzle outlets. To create separate free fluid jets from each nozzle outlet and well-conditioned flow within the nozzle, nozzle 122 includes a bifurcation proximal to a nozzle inlet. In some embodiments, the speed of the fluid jet is greater than a speed of the bucket. In some embodiments, the system may discharge a portion of the fluid at points along the first or second linear path segment. In some embodiments, the system may discharge all or substantially all of the fluid at points along the first or second linear path segment. In some embodiments, the orientation of the system is such that the fluid is discharged from the buckets in the first or second linear path at an obtuse angle relative to the direction of travel.

Fluid, such as water, may flow into the linear turbine through a distributor, such as penstock or inlet 121, which is connected to an inlet of a nozzle 122. In an embodiment, the linear turbine system may include two distributors to direct fluid into buckets on complimentary sides of the linear turbine. In some embodiments, first and second outlets of nozzle 122 are substantially symmetrical (outlet 127 is illustrated in FIG. 3). Fluid exits first and second outlets into the traveling the plurality of buckets 110, 120 (e.g., at an acute angle). As illustrated by FIGS. 3 and 4 as well as others, first and second outlets may be rectilinear openings that are parallel to a plane of continuous path 140-143. Nozzle 122 is configured to direct the first fluid jet to contact the first plurality of buckets at a non-zero (e.g., non-orthogonal) angle.

In some embodiments, nozzle 122 directs the first rectilinear jet of fluid at an angle α with respect to a plane that extends along the first substantially rectilinear opening at outlet 127. The opening may be parallel and near to the plane of bucket travel path 140-143, such that the first rectilinear jet also makes an angle α with the plane of bucket travel path 140-143. The angle is in a range from approximately 0° to approximately 50°. In other embodiments, the angle has a range from approximately 25° to approximately 35°. In yet other embodiments, fluid exits first and second outlets at an angle α in a range from approximately 8° to approximately 18°, such as approximately 10° to approximately 15°. In some embodiments, the fluid interacts with a cascade of buckets. In some embodiments, fluid exits a bucket at an angle β in a range from approximately 8° to approximately 18°, such as approximately 10° to approximately 15°. In another aspect, a free jet exits the distributor/nozzle at an angle of approximately 10°.

As used herein, β denotes the relative flow angle measured from the same vector as α. $\beta_1$ denotes the relative flow angle corresponding to the angle aiding in the definition of the likely ideal angle of the bucket's leading edge. $\beta_2$ denotes the relative flow angle aiding in the definition of the likely ideal angle the likely ideal angle of the bucket's trailing edge.

A velocity of the first rectilinear jet of fluid may be approximately equal to a velocity of the second rectilinear jet of fluid. In an embodiment, the first substantially rectilinear opening extends along a first plane and the second substantially rectilinear opening extends along a second plane such that the first plane and the second plane are substantially parallel. In other embodiments, the first substantially rectilinear opening extends along a first plane, the first plane having an angle in a range from approximately −5° to approximately 15° with respect to horizontal. In other embodiments, the angle has a range from approximately −5° to approximately 10°. In other embodiments, the angle has a range from approximately −5° to approximately 5°.

Figure 5:
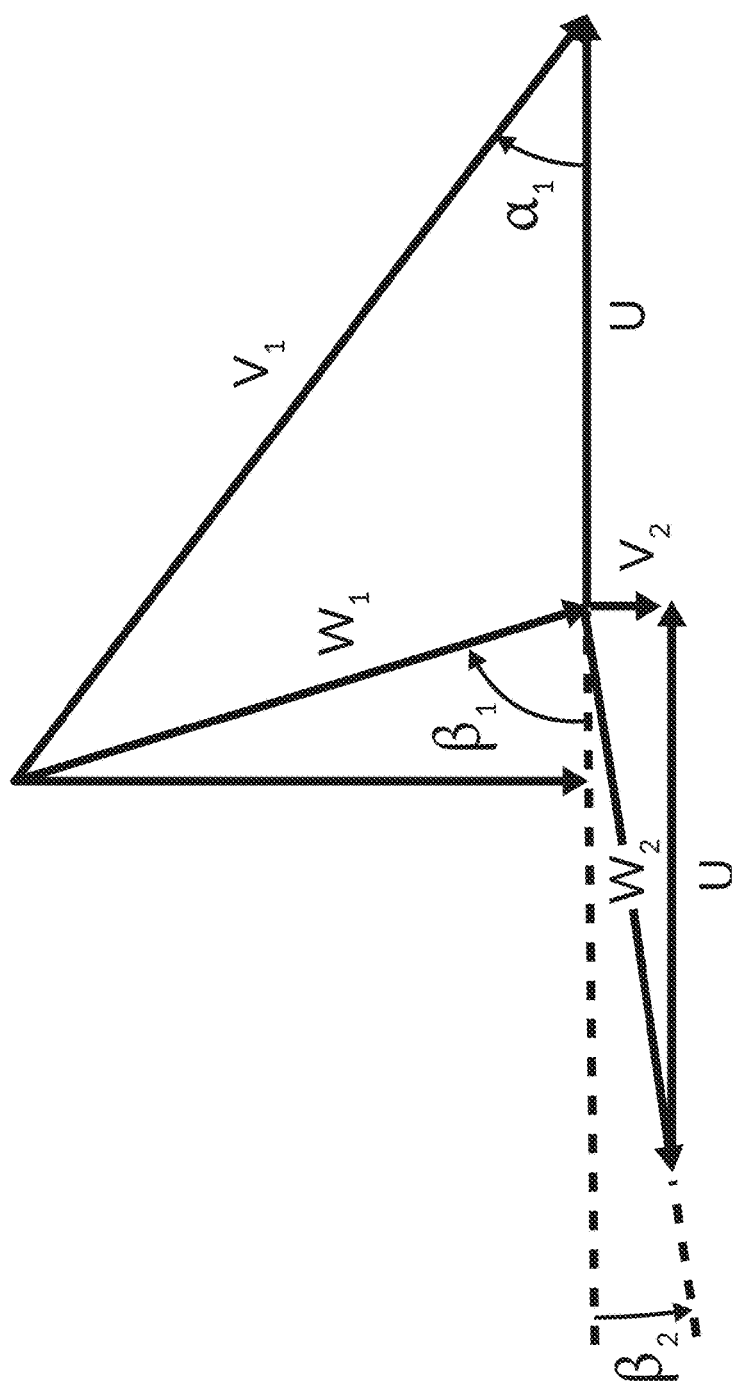
FIG. 5 illustrates velocity vectors relative to a linear turbine bucket according to an embodiment.

The relationships are shown further in FIG. 5, showing velocity vectors relative to a linear turbine bucket according to an embodiment, including relative velocity $W_2$.

The powertrain of linear turbine system 100 or linear turbine system 100 itself is mounted on a base, such as plinth 160. The powertrain may include a belt 134 operating about sprockets/pulleys 136, 137, constrained to a "stadium" or oval path resembling a racetrack. In some embodiments, the belt may be configured as a chain for example, reinforced belt, polymeric belt, or cables. In some embodiments, the powertrain may be a direct drive mechanism. Belt may be a toothed belt, for example, and pulleys may include teeth corresponding to the belt teeth. As the energy from the jet is utilized by the buckets/blades, the bucket/blades drive the belt, which in turn drives sprockets 136, which in turn drive one or more generator shafts 128, 129 at either end of belt 134. As shown in FIGS. 1-2, a speed increaser 150 is mounted on shaft 128 and is linked by a belt to an electric generator 152. Shafts 128, 129 may be attached to sprockets 136, 137 which may turn on bearings attached to a common baseplate. In some embodiments, shafts 128/129 may be generally horizontally positioned. In some embodiments, shafts 128/129 may be generally vertically positioned. In some embodiments, shafts 128/129 may be positioned at an angle between horizontal and vertical.

In some embodiments, the linear turbine may have less than ten moving parts (excluding the buckets/bucket assemblies). For example, a linear turbine may include a single belt turning around two sprockets. The sprockets may be attached to a shaft which can turn a generator. The linear turbine may also include crossbeams attached directly to the belt without the need for bearings with moving parts. The buckets can be attached to the ends of the crossbeam to receive incoming fluid flow. The linear turbine can include smaller buckets to more evenly distribute loads and better match crossbeam and bucket strength with belt strength.

The flow capacity and power of the linear turbine system 100 is adjustable for a particular project, by changing the number of buckets/bucket modules in the path, thus changing the length of the machine. This flexibility allows much larger flow per turbine than a conventional Pelton unit. Multiple nozzles can be used to increase flow rate for a given runner. The linear turbine system can utilize one side nozzle, or more, which applies increased flow rate across both linear spans for power production.

In operation, a fluid flow 124 from fluid source (such as a river or canal) enters a penstock or intake duct 121. Flow 124 then passes through nozzle 122 which accelerates, bifurcates, and redirects flow 124 to generate two free jets. The acceleration, bifurcation, and redirection may be simultaneous. Two nozzle outlets have a substantially rectilinear shape (e.g., formed from substantially straight lines) to for rectilinear shaped (e.g., rectangular shaped) free jets. Other nozzle outlet shapes are also contemplated, such as rectilinear shapes with rounded corners, circular, elliptical, or oval shapes, etc. Each free jet is directed toward and provides an impulse (force applied for a period of time) to a plurality of buckets 110, 120. Each free jet simultaneously impacts more than two buckets. For example, each free jet is configured to simultaneously impact/impinge upon 10-20 buckets. In another example, each free jet is configured to simultaneously impact/impinge upon 20-30 buckets. In another example, each free jet is configured to simultaneously impact/impinge upon 30-40 buckets. Additional blades and or buckets are contemplated, such as 30, 45, 50, 55, 60, 80, 103, and 105. One of the benefits of the linear turbine design is that the design can easily scale up for larger flows; the system may be lengthened by increasing an axial separation distance 144 and adding additional bucket assemblies. If desired, additional support shafts/axles may also be added to accommodate additional bucket assemblies.

Fluid flow 124 provides a controllable impulse to linear turbine system 100 which drives plurality of buckets 110, 120 about axes 112, 113. Plurality of buckets 110, 120 transfer this power, via crossbeams 138, belt 134, and sprocket 136, to drive shaft 129. Drive shaft 129 transfers power to the speed increaser 150, which in turn drives an electric generator 152.

In some embodiments, one or more of the shafts is coupled to a secondary structure to impart useful work (recovered through the operation of the linear turbine). In some embodiments, a shaft is coupled to a hydraulic pump, for example, or mill.

A slide gate or similar apparatus may be used to control the length of the outlet and accordingly the number of buckets impacted by the free jets to accommodate decreases in flow. For an under-mounted nozzle 122, the fluid from the free jet is simply directed away from the turbine by the bucket shape and falls to form a tailwater 162. Tailwater 162 may then rejoin the original water source. The linear turbine design is not, however, just applicable to under-mounted nozzle arrangements, as a top-mounted may also be utilized with or without an under-mounted nozzle.

The next section provides the theory and analysis behind the linear system, with certain relationships illustrated in FIG. 5.

Theory and Analysis

Flow exits a nozzle with mean velocity driven by the effective head $H_E$ $$V_1 = C_v \sqrt{2gH_E} \quad (1)$$

where $C_v$ is the velocity coefficient of the nozzle.

The effective head, $H_E$, is the head delivered at the nozzle, after subtracting losses such as pipeline friction and intake losses, from the gross head. The efficiency of the turbine is measured versus the effective head $H_E$, not the gross head $H_G$.

$$H_E = H_G - H_f \quad (2)$$

The ideal, or spouting, velocity is $$V_0 = \sqrt{2gH_E} \quad (3)$$

The nozzle velocity coefficient $C_v$ is the ratio of the actual mean velocity at nozzle exit, $V_1$, to the spouting velocity $V_0$ $$C_v = \frac{V_1}{V_0} \quad (4)$$

Typical Pelton nozzle $C_v$ ranges from 0.98 to 0.99. Nozzle efficiency is $$\eta_N = \frac{V_1^2}{2gH_E} \quad (5)$$

The complete turbine hydraulic efficiency is the ratio of work transferred from the jet to the buckets ($\Delta W$) to the available energy $gH_E$; it is also the product of the nozzle efficiency $\eta_N$ and the bucket efficiency $\eta_B$.

$$\eta_h = \frac{\Delta w}{gH_E} \left( \frac{\Delta w}{\frac{1}{2}V_1^2} \right) \left( \frac{\frac{1}{2}V_1^2}{gH_E} \right) = \eta_B \eta_N \quad (6)$$

The work transferred from the jet to the buckets is expressed by Euler's turbine equation $$\Delta W = UV_{1U} - UV_{2U} \quad (7)$$

Thus, the bucket efficiency can be expressed as $$\eta_B = \frac{\Delta w}{\frac{1}{2}V_1^2} = \frac{2U(V_{1U}V_{2U})}{V_1^2} \quad (8)$$

where $$V_{1U} = V_1 \cos \alpha_1 \quad (9)$$

$$V_{2U} = U - w_{2U} = U - kw_1 \cos \beta_2 \quad (10)$$

Friction causes the relative velocity of flow at the bucket's outlet to be lower than at its inlet, so that $$w_2 = kw_1 \quad (11)$$

Typical Pelton buckets k range from 0.8 to 0.9.

The operation of a linear turbine can be characterized in terms of the ratio of bucket speed to jet speed $v$ $$v = \frac{U}{V_1} \quad (12)$$

In a linear turbine, the jet may enter the bucket cascade at a non-zero inlet angle, $\alpha_1$. The bucket's shape is chosen to turn the flow such that it leaves with relative velocity angle $\beta_2$. For any combination of $\alpha_1$, and $\beta_2$, there exists an optimal $v$ such that efficiency is maximized.

In comparison, conventional Pelton turbines represent a special case in which the inlet angle is 0°. The optimal blade-jet speed ratio of a conventional Pelton turbine is $v=0.5$ since $\alpha_1=0$ and $\eta_B=2v(1-v)(1-k \cos \beta_2)$; the optimal efficiency of a conventional Pelton turbine is $\eta_{Bmax}=(1-k \cos \beta_2)/2$.

Using the law of cosines $$w_1 = \sqrt{V_1^2 + U^2 - 2\cos\alpha_1 UV_1} \quad (13)$$

Given 9, and since $$U = vV_1 \quad (14)$$

$w_1$ can be found $$w_1 = v_1\sqrt{v^2 - 2\cos\alpha_1 v + 1} \quad (15)$$

Substituting Equation (15) into Equation (10), the expression for linear bucket efficiency can be written as $$\eta_B = 2v \cos \alpha_1 - 2v^2 + 2k \cos \beta_2 v\sqrt{v^2 - 2v\cos\alpha_1 + 1} \quad (16)$$

The efficiency can be alternatively formulated in terms of a ratio of blade speed to the peripheral speed, $V_U$, rather than jet speed $V_1$.

$$v^+ = \frac{U}{V_{1U}} \quad (17)$$

$$\eta_B = 2v^+ \cos^2\alpha_1 - 2v^{+2}\cos^2\alpha_1$$

$$+ 2k\cos\alpha_1 \cos\beta_2 v^+ \sqrt{1 + v^+(v^+ - 2)\cos^2\alpha_1} \quad (18)$$

To determine the maximum efficiency, differentiate Equation (16) with respect to v $$\frac{d\eta_B}{dv} = 2v\left(\frac{k\cos\beta_2(2v - 2\cos\alpha_1)}{2\sqrt{v^2 - 2v\cos\alpha_1 + 1}} - 1\right) + \quad (19)$$
$$2\left(\cos\alpha_1 + k\cos\beta_2 \sqrt{v^2 - 2v\cos\alpha_1 + 1} - v\right) = 0$$

Dimensionless hydrodynamic coefficients for linear turbines may be re-derived for the linear turbine.

Head Coefficient:

$$C_H = \frac{gH_e}{\omega^2 D^2} = \frac{1}{8C_v^2 v^2} \quad (20)$$

Flow Coefficient:

$$C_Q = \frac{Q}{\omega D A_t} = \frac{1}{2v} \quad (21)$$

Power Coefficient:

$$C_P = \frac{P}{\rho \omega^3 D^3 A_t} = \frac{\eta_B}{16v^3} \quad (22)$$

The turbine throat area is a function of the jet angle $$A_t = H_j L_j \sin \alpha_1 \quad (23)$$

Where $H_j$ is the jet height as shown in the figures, and $L_j$ is the total length of the jet in the tangential direction.

Thus, $A_t \propto \sin \alpha_1$ and the power specific speed, $C_{pss}$, can be expressed in terms of the inlet jet angle $$\frac{D}{\sqrt{H_j L_j}} * C_{pss} = \frac{\sqrt{C_P \sin \alpha_1}}{C_H^{5/4}} \quad (24)$$

The turbine is able to maintain high efficiency across a wide range of jet angles, with slight changes in the optimal speed ratio. For example, assuming bucket friction factor k=0.9 and bucket exit angle $\beta_2=10°$, the bucket efficiency only decreases from 0.94 at 0°, to 0.9 at a jet angle of 40° (FIG. 6).

Figure 6:
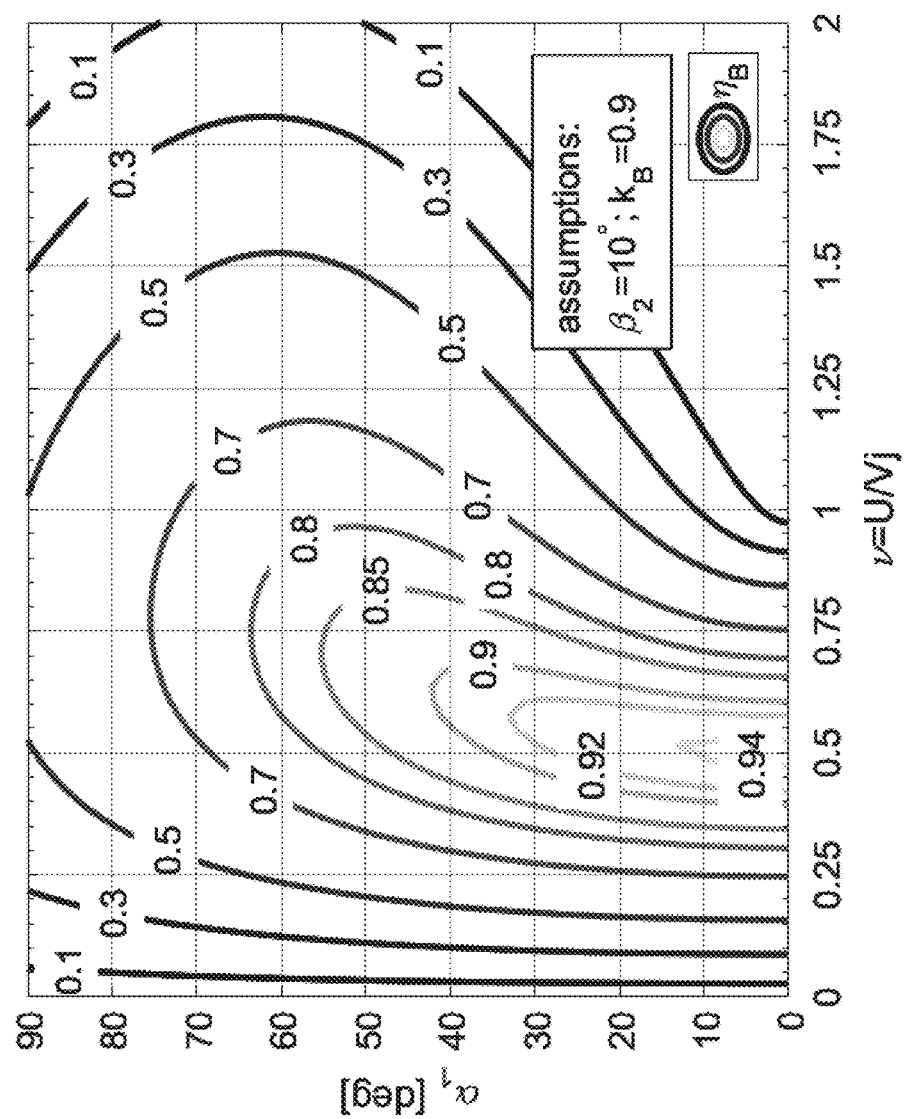
FIG. 6 is a plot of linear turbine efficiency as a function of speed ratio ν and jet angle $\alpha_1$, assuming a friction factor k=0.9 and exit angle $\beta_2$=10°.

FIG. 6 is a plot of linear turbine efficiency as a function of speed ratio v and jet angle $\alpha_1$, assuming a friction factor k=0.9 and exit angle $\beta_2=10°$.

Figure 7:
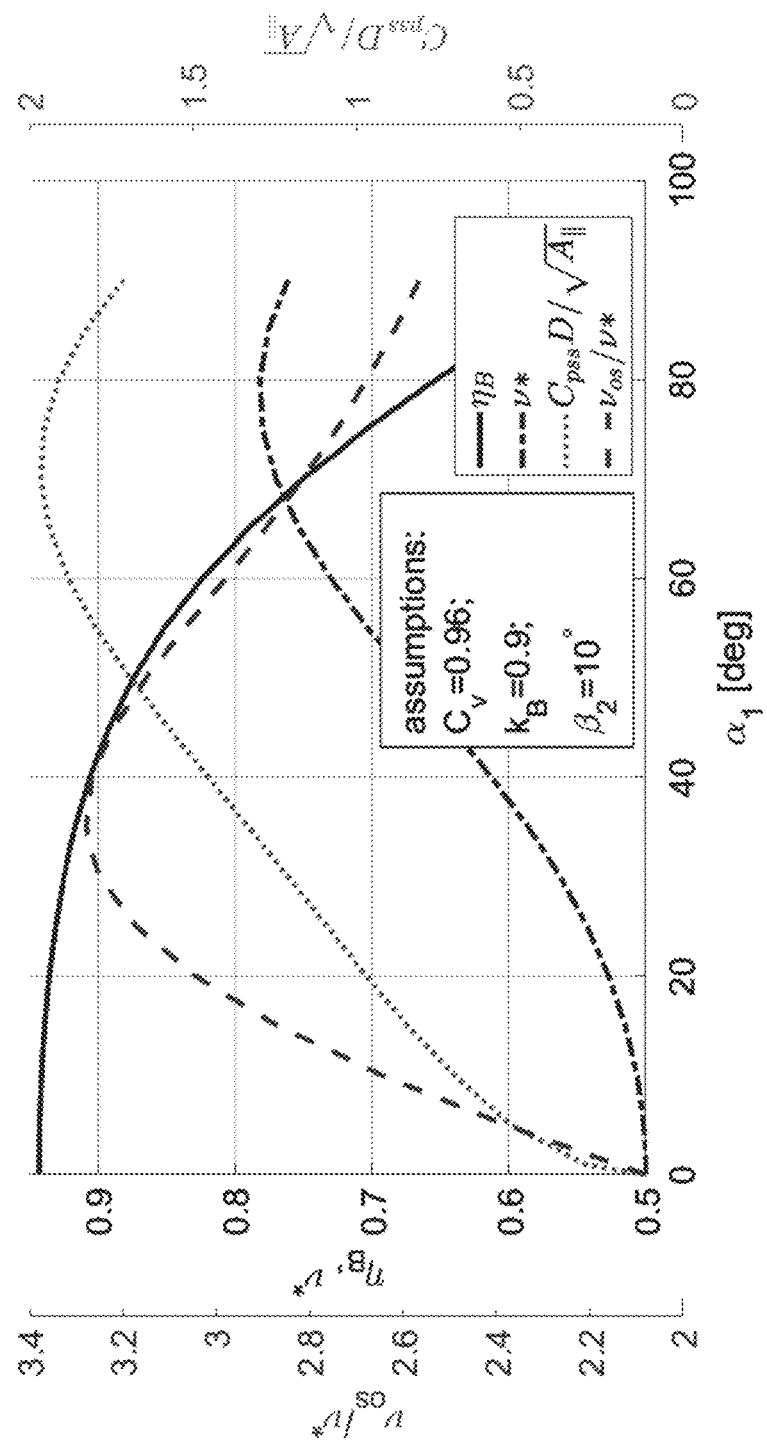
FIG. 7 is a plot of inlet angle vs. linear optimal speed ratio, efficiency, specific speed, and runaway multiple when operated at optimal conditions.

FIG. 7 is a plot of inlet angle vs. linear optimal speed ratio, efficiency, specific speed, and runaway multiple when operated at optimal conditions.

Figure 8:
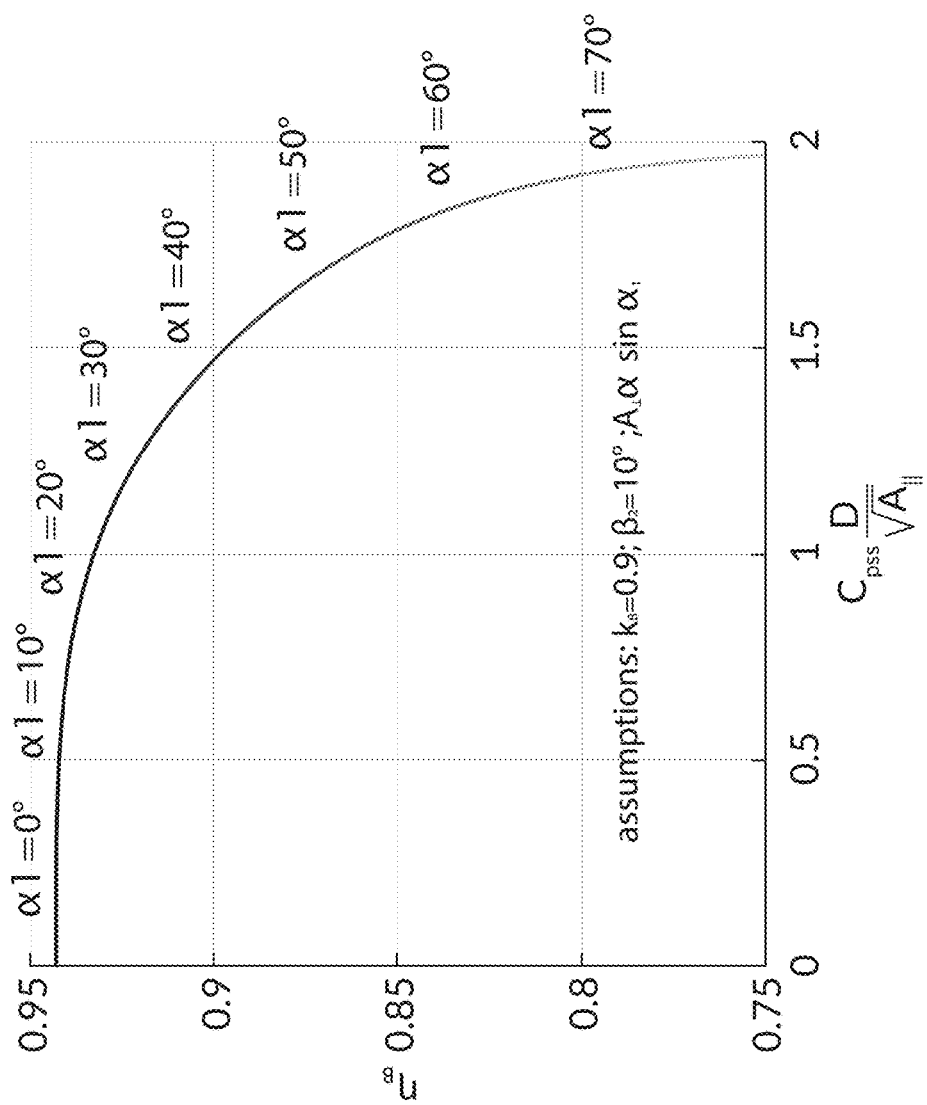
FIG. 8 illustrates the tradeoff between specific speed and efficiency.

FIG. 8 illustrates the tradeoff between specific speed and efficiency.

Figure 9:
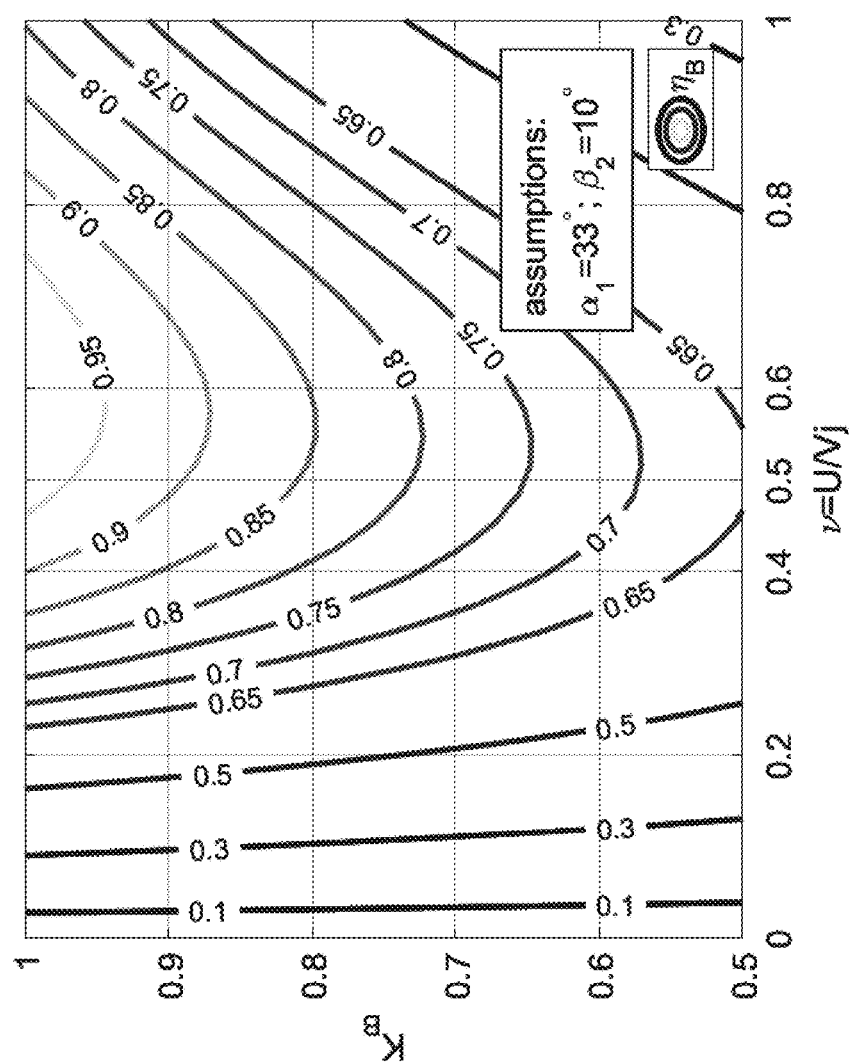
FIG. 9 illustrates the sensitivity of optimal speed ratio to variation in bucket loss coefficient k, assuming $\alpha_1$=33° and exit angle $\beta_2$=10°.

FIG. 9 illustrates the sensitivity of optimal speed ratio to variation in bucket loss coefficient k, assuming $\alpha_1=33°$ and exit angle $\beta_2=10°$.

An advantage of the disclosed linear turbine in comparison to the conventional Pelton turbine lies in its ability to accept a much larger amount of flow, within a small physical footprint. This can be understood by inspecting the relationship between power specific speed, and the jet angle $\alpha_1$. Linear turbine bucket efficiency decreases only weakly as $\alpha_1$ increases, while the throat area and thus the power specific speed $C_{pss}$ increase substantially at larger inlet angles (FIG. 7). The choice of optimal inlet angle will be a tradeoff, with the engineer choosing a balance between specific speed, and efficiency (FIG. 8), which may be Pareto-optimal.

Generally, friction experienced by the bucket (e.g., bucket friction) has a large impact on efficiency. Additionally, an increase in bucket friction results in a decrease in the optimal bucket-to-jet speed ratio. For example, a linear turbine configured with $\alpha_1=33°$ and $\beta_2=10°$, a decrease in k from 0.95 to 0.65 results in a decrease in bucket efficiency $\eta_B$ from 0.95 to 0.75, and a decrease in v* from 0.58 to 0.53 (FIG. 9).

Nozzle Arrangement

Without a proper nozzle design, fluid flow may exhibit non-uniform distribution of velocity down the length of linear travel of the buckets. The nozzle design architecture described here allows very uniform velocity distribution (variation approximately <3%) in the jet outlet. Design parameters have been developed for proper sizing of the nozzle length as a function of the jet angle, distance from nozzle outlet to bucket, and bucket chord width. The nozzle architecture allows for efficient ($C_v$>0.95) conversion of pressure into kinetic energy, without any components such as guide vanes needed inside the flow path. In some embodiments, guide vanes or other flow-enhancement devices are contemplated.

Figure 10:
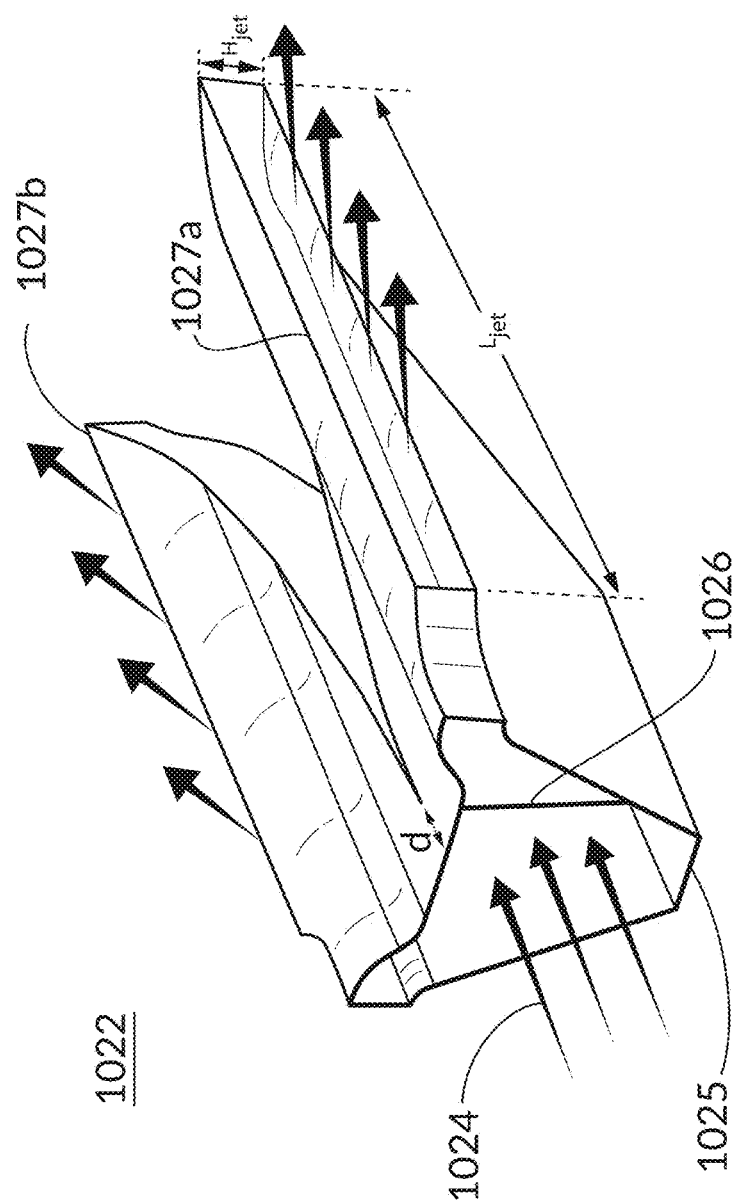
FIG. 10 illustrates a nozzle arrangement.

Turning to FIGS. 10-12, as shown in FIG. 10, a bifurcation 1026 within a nozzle arrangement 1022 is located very close to the nozzle inlet 1025. Thus, a separation distance d between nozzle inlet 1025 and bifurcation 1026 is desirably small, such as approximately 0.02 to approximately 2.5 times the hydraulic diameter of the nozzle at the inlet cross-section. This allows for substantially uniform velocity at the two nozzle outlets 1027a, 1027b.

Figure 17:
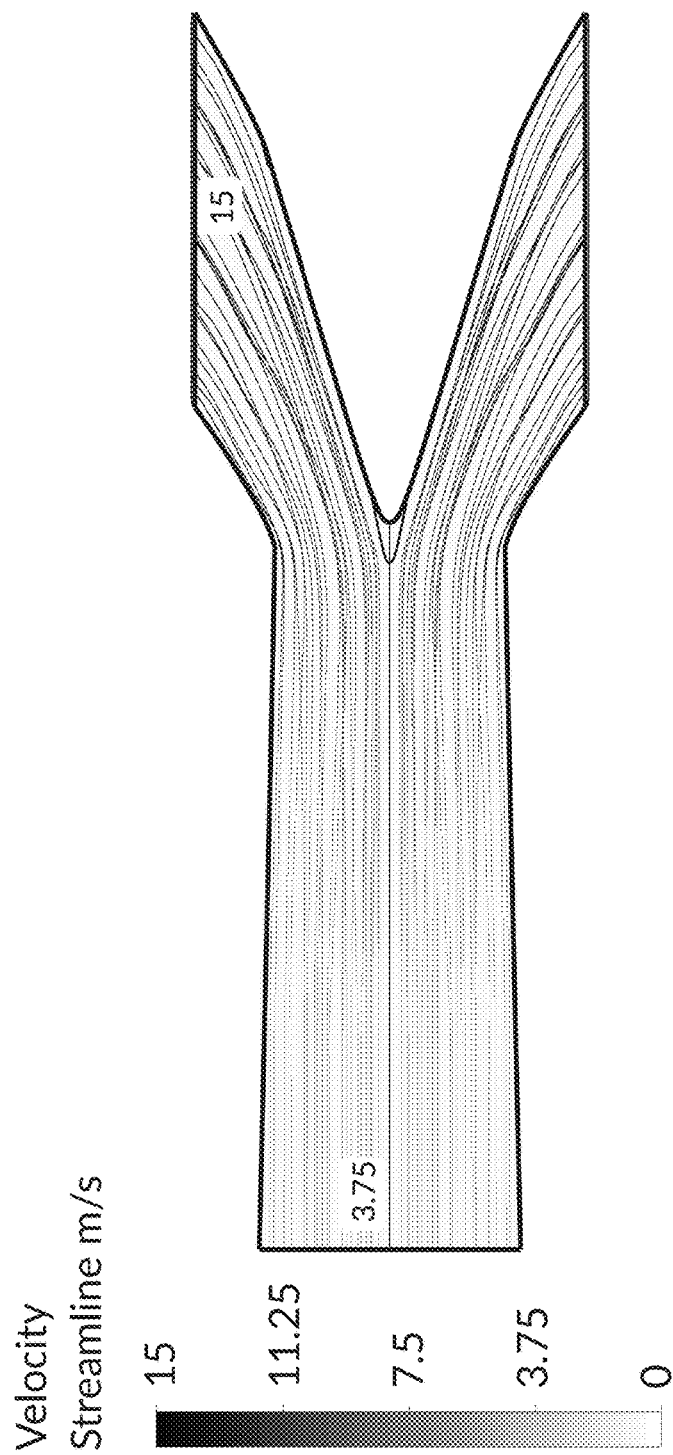
FIGS. 17-19 show streamlines of flow velocity for an exemplary nozzle arrangement.
Figure 18:
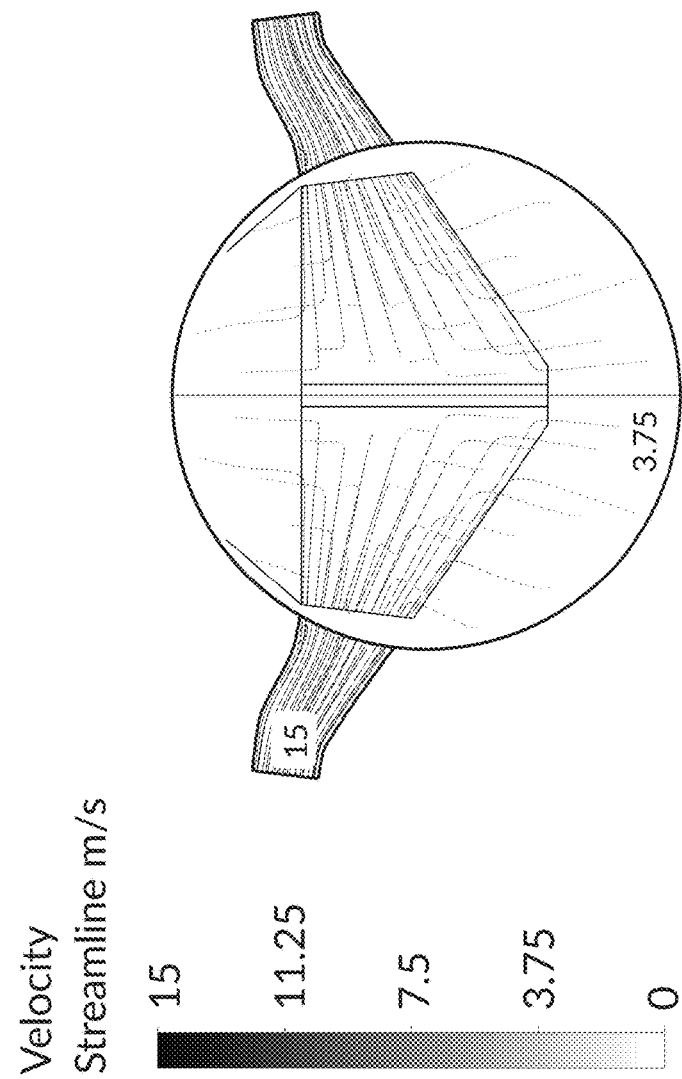
Figure 19:
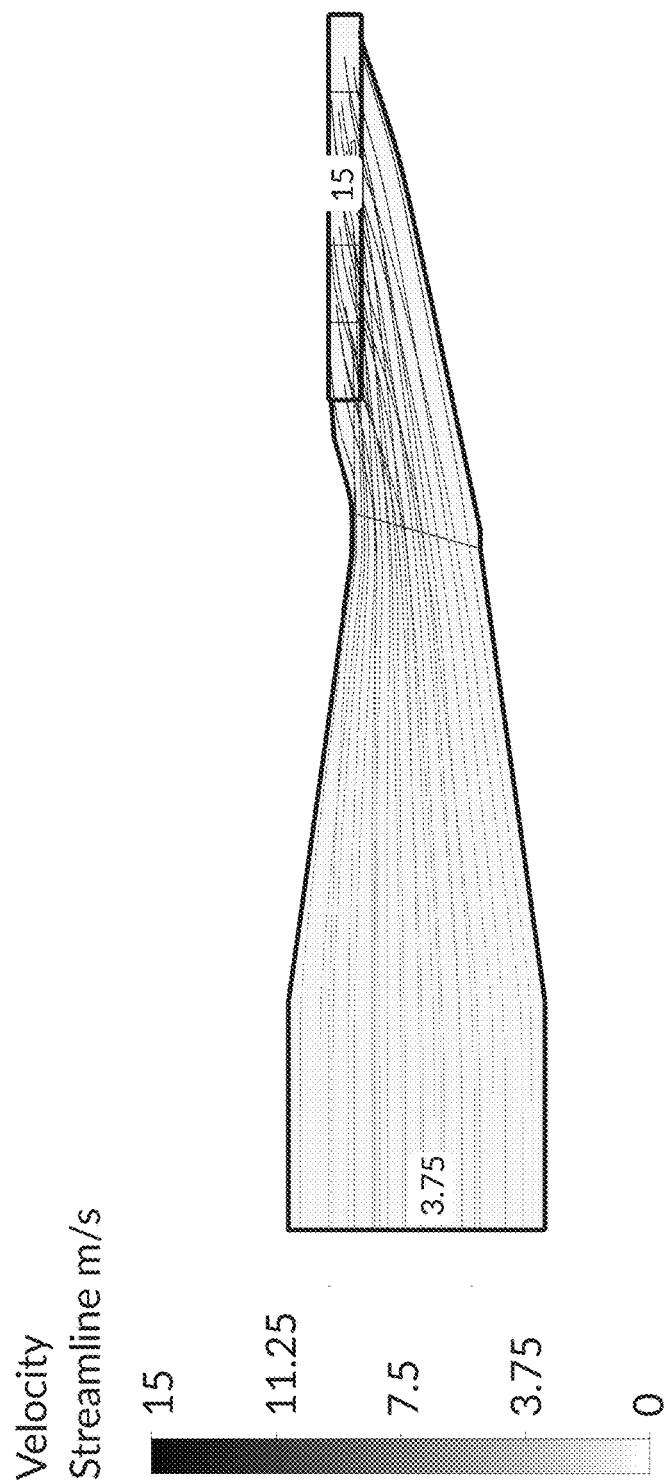

FIG. 12 illustrates nozzle arrangement 1122 similar to the nozzle arrangement 1022. A separation distance $d_2$ between a nozzle inlet 1125 and a bifurcation 1126 is kept small. A round-to-polygonal adapter section 1123 is joined to funnel fluid flow 1124 from a penstock into nozzle 1122. One end of round-to-polygonal adapter section 1123 is matched to the size and shape of the penstock. The other end is sized and shaped to match nozzle inlet 1125 and joined to nozzle inlet 1125. FIGS. 17 (top view), 18 (rear view), and 19 (side view) plot streamlines of velocity and contours for velocity angle for nozzle arrangement 1022, which exhibits well-conditioned flow having uniform or substantially uniform exit velocity angle across the entire nozzle exit. In some embodiments, the nozzle provides centrally delivered flow, that is, inward to outward flow. The outlet may be disposed at or near the bottom of the system. Furthermore, in some embodiments, the nozzle only acts on a straight, section of the belt, e.g., within one of the linear path segments disclosed and described herein.

FIG. 11 illustrates a comparative example of a nozzle arrangement 1222. Unlike nozzle arrangement 1122 in FIG. 12, a separation distance $d_1$ between a nozzle inlet 1225 and a bifurcation 1226 is located much further away, resulting in less than idealized pressure and velocity distributions, and particularly undesirably large variations in nozzle exit angle α. A round-to-polygonal adapter section 1223 is joined to funnel fluid flow 1224 from a penstock into nozzle 1222. One end of round-to-polygonal adapter section 1223 is matched to the size and shape of the penstock/inlet from the source. The other end is sized and shaped to match nozzle inlet 1225 and joined to nozzle inlet 1225. During testing, while nozzle arrangement 1122 in FIG. 12 exhibited a velocity distribution variation less than 3%, the nozzle arrangement 1222 in FIG. 11 exhibited a velocity distribution variation greater than 10%.

Compared to the nozzle arrangement 1222, nozzle arrangement 1122 removes an intermediate tapering portion of the nozzle outlet, and widens the nozzle inlet accordingly. The "V"-shape at the end is steeper and tuned to provide maximum streamline parallelism. For the purposes of comparative testing further described below, the exemplary length of nozzle arrangement 1122 was 402 mm, whereas the exemplary length of nozzle arrangement 1222 was 545 mm, corresponding to 26% difference in length.

Arranging the nozzle with a v-shaped inlet cross-section in which the bifurcation depth is driven by the total cross-sectional area of the jet outlet allows for nozzles of longer and shorter dimension to be built without significant change in performance.

The nozzle architecture may be adapted for use with different manufacturing methods. For example, straight-brake sheet metal or plate fabrication may be used with a nozzle designed with prismatic-type surfaces and sharp corners. Alternatively, if a molding or similar manufacturing approach is utilized, smoothly rounded corners and an organic manifold shape may be used, resulting potentially in lower losses.

The nozzle arrangements may be desirably configured such that a length of jet is matched to available linear travel of buckets (e.g., along linear path 140). The nozzle arrangements may also be configured to generate uniform and/or parallel streamlines at all locations along fluid flow. The nozzle arrangements may also be configured to produce a high velocity coefficient and thus a highly efficient and low loss design.

Figure 13:
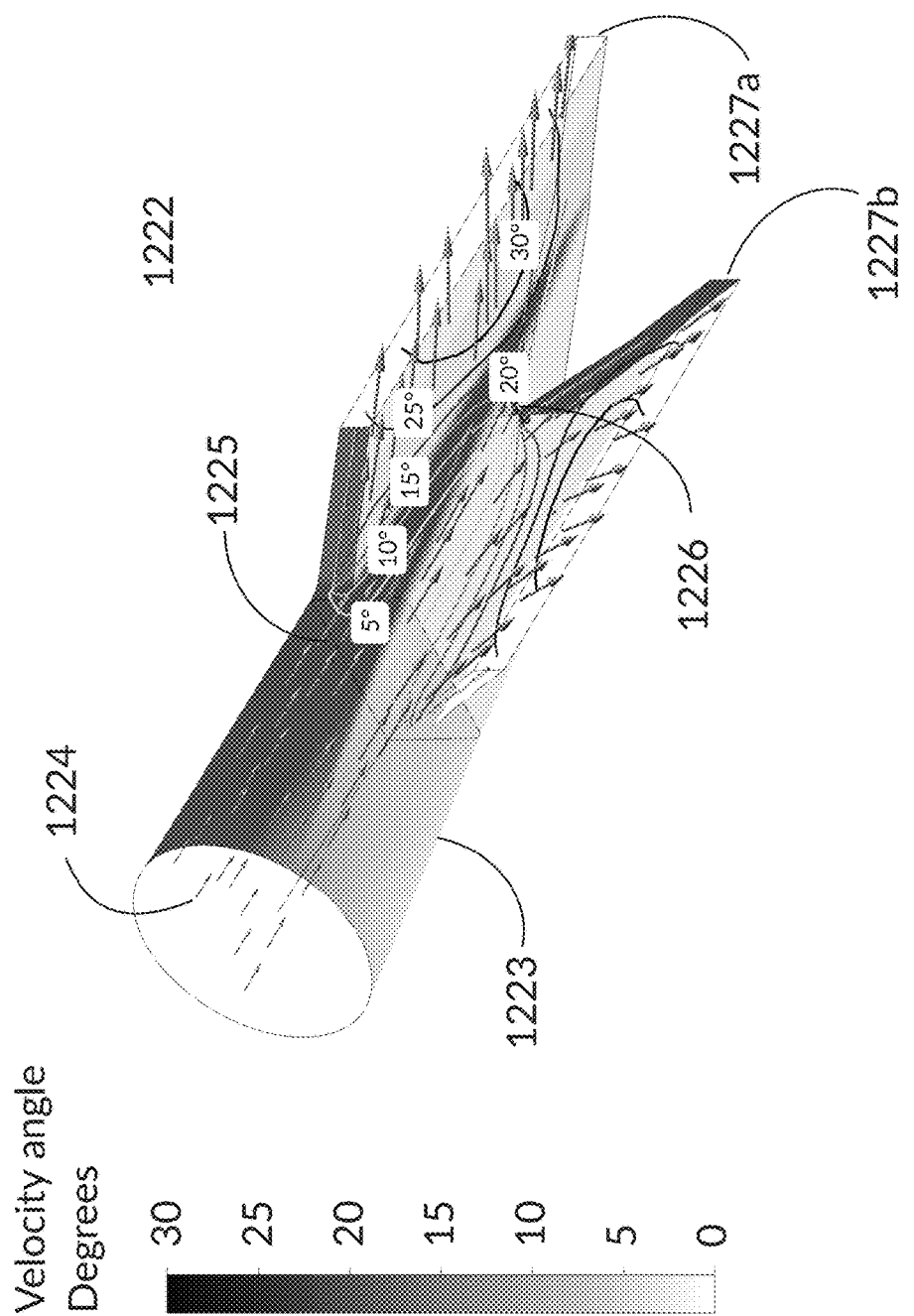
FIGS. 13 and 14 depict plots of velocity angle as shaded contour lines that correspond to nozzle arrangements shown in FIGS. 11 and 12, respectively. The shading of the light effect is solely for graphical clarity.
Figure 14:
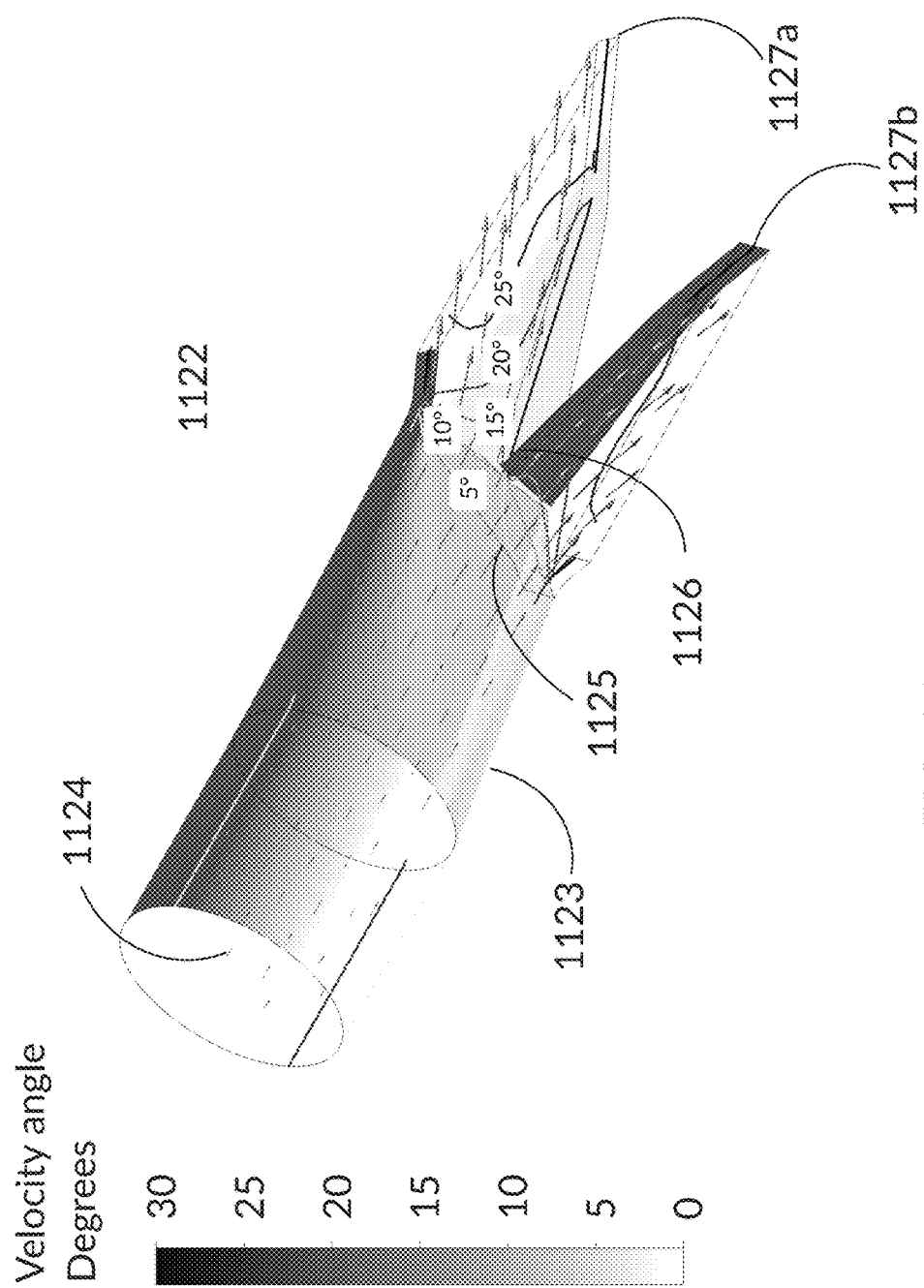

FIGS. 13 and 14 depict plots of velocity angle that correspond to nozzle arrangements in FIGS. 11 and 12, respectively, operating at the same head (approximately 3.4 m). FIG. 13 illustrates velocity angle for nozzle arrangement shown in FIG. 11, which is characterized by a strong variation in velocity angle along the length of the jet. Velocity angle at mid-span is roughly 40% higher than velocity angle at the entry and exit of the jet. FIG. 14 illustrates velocity angle for nozzle arrangement shown in FIG. 12, which accomplishes a major improvement in uniformity of velocity angle at the jet exit. Velocity angle varies by only approximately 7%. along the length of the nozzle exit.

The performance of nozzle arrangements 1222 and 1122 may be summarized using standard $C_v = V_{jet}/\sqrt{(2gh)}$ calculation, augmented by the important measure of uniformity of vU along the jet length.

The performance of nozzle arrangements 1222 and 1122 may be summarized using standard $C_v = V_{jet}/\sqrt{(2gh)}$ calculation, augmented by the important measure of uniformity of vU along the jet length.

TABLE 1

| nozzle arrangement | | 1222 (FIG. 11) | 1122 (FIG. 12) |
|---|---|---|---|
| $P_{tot, in}$ | Pa | 33285 | 33588.9 |
| $P_{tot, out}$ | Pa | 31100 | 31453.6 |
| $V_{jet}$ | m/s | 7.88 | 7.93 |
| h, in | M | 3.4 | 3.43 |
| $C_v$ | — | 0.964 | 0.966 |
| $C_v^2$ | — | 0.931 | 0.933 |
| vU, ends | m/s | 7.45 | 7.4 |
| vU, midspan | m/s | 6.45 | 7.2 |
| % delta | — | 0.127 | 0.025 |

Figures 15, 16:
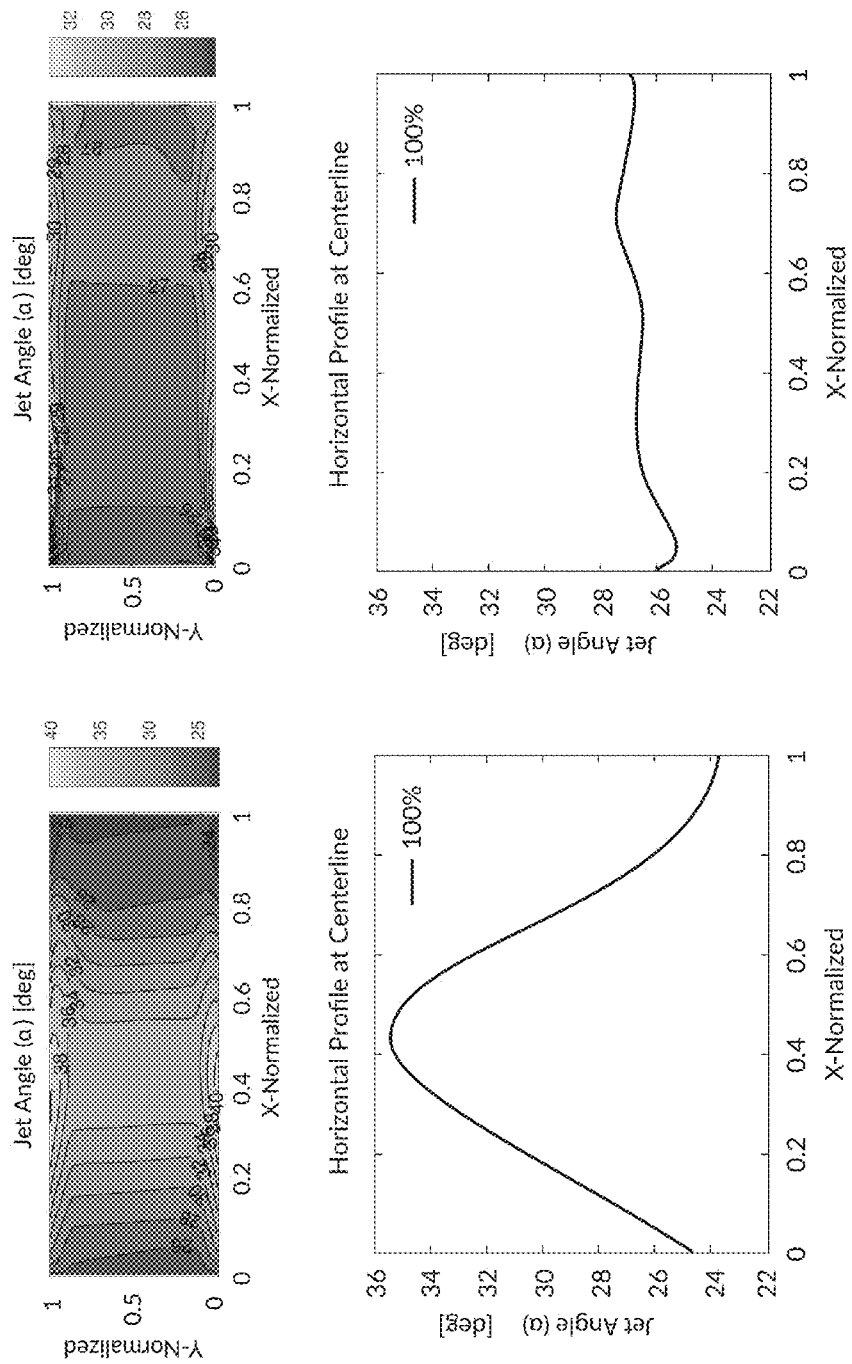
FIGS. 15 and 16 plot jet angle contours, as well as a profile at the centerline as shown in FIGS. 11 and 12, respectively.

More detailed analysis of flow angle uniformity for nozzle arrangements 1222 and 1122 is shown in FIGS. 15 and 16. FIG. 15 plots jet angle contours, as well as a profile at the centerline for nozzle arrangement of FIG. 11. FIG. 16 plots jet angle contours, as well as a profile at the centerline for nozzle arrangement of FIG. 12. The x-axes are normalized between FIGS. 15 and 16.

Nozzle Tilt

In the development of large linear turbines, for example, those capable of generating over 1 MW at 10 m head, an issue was discovered which could create problems in which the turbine efficiency strongly suffered at low head. At low head, the trajectory taken by a jet of water remains constant, even as physical bucket size increases for larger machines. For nozzles with substantial upward tilt angles, a substantial proportion of flow streamlines can re-enter the machine after exit, causing drag losses.

Computational Fluid Dynamics (CFD) studies were performed to quantify the issue. A novel solution was identified in which head-insensitive efficiency can be achieved with a certain range of nozzle tilt angles, ideally close to zero° (e.g., providing a horizontal jet). Though the long axis of the linear system (parallel to axial separation distance 144 or pitch line of the powertrain belt) need not be arranged entirely horizontally, horizontal implementations are contemplated and useful for the purposes of discussion herein. Linear turbine systems may benefit from slight upward jet tilt (e.g., 5-15°) due to substantial reductions in the space required, at the expense of more complicated blade crossbeams, to accommodate the nozzle. In an embodiment, a nozzle may be inclined between 5-20° inwards. This allows placement of the center of hydraulic pressure of the buckets, near or coincident with the pitch line of the powertrain belt 134, which minimizes operating moments and span of the crossbeams.

Figure 22:
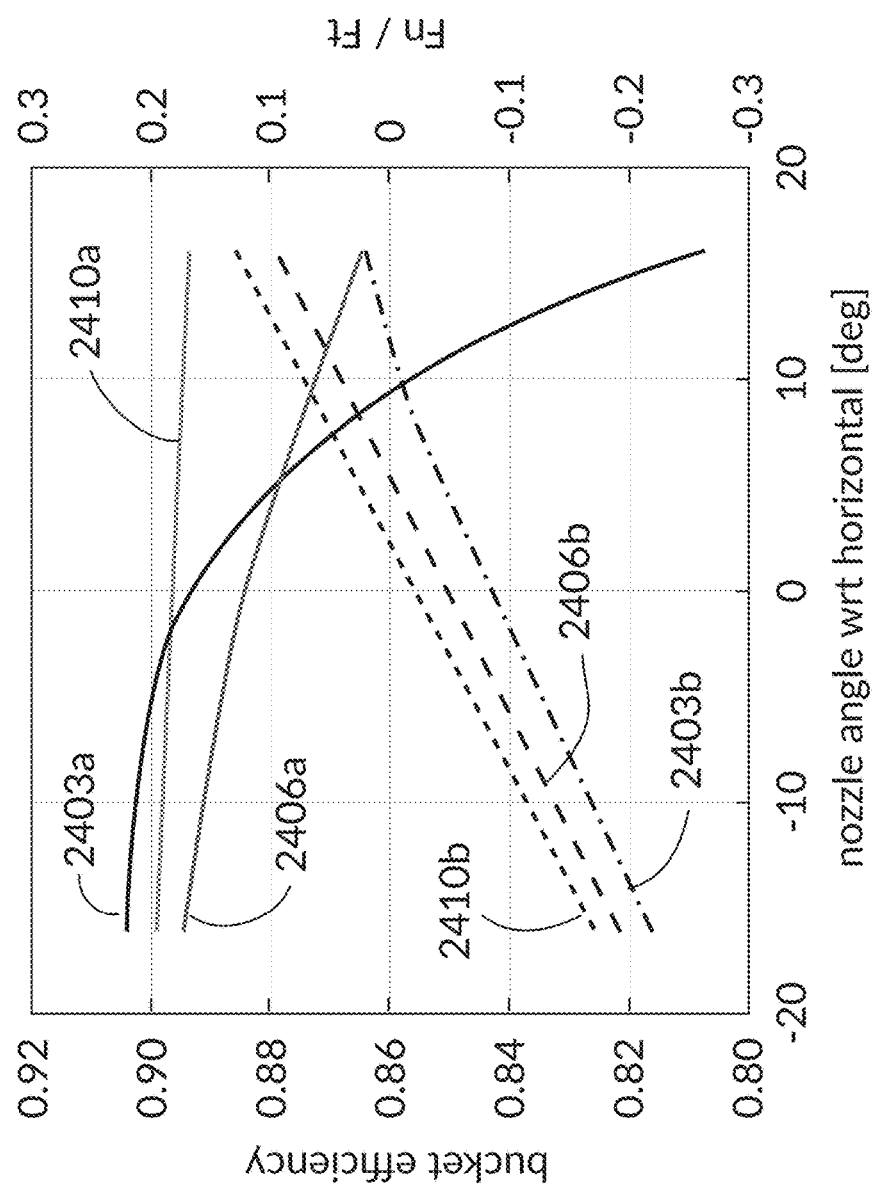
FIG. 22 is a plot of bucket efficiency vs. nozzle angle with respect to horizontal.

One approach to a head-insensitive efficiency is found in changing the nozzle tilt angle. Testing has shown that the efficiency of relatively large buckets is very sensitive to this angle. For nozzles pointed straight to the side (horizontal) or even slightly downward, the efficiency becomes increasingly head-independent. An added benefit is that the exit water may take less axial space to clear out of the machine. FIG. 22 illustrates the strong dependence of low head efficiency and normal force vs. nozzle angle. In the simulation plotted, the distance from the nozzle exit to the bucket center is 0.326 m, so at 16 degree tilt, the vertical drop is 0.09 m. Lines 2403a, 2406a, and 2410a represent efficiency at 3 m, 6 m, and 10 m of head, respectively. Lines 2403b, 2406b, and 2410b represent the ratio $F_n/F_t$ of a force normal to the belt back $F_n$ to the tangential force $F_t$ (the useful torque-producing force) at 3 m, 6 m, and 10 m of head, respectively. The relative efficiency impact is small at 10 m head but at 3 m head, this drop will account for some about 2.8% of the bucket head. Note the strong dependence of $F_n/F_t$ on nozzle tilt. For an undershot linear turbine, a slightly positive $F_n/F_t$ ratio means that the jet helps levitate the belt span (supporting belt and blade mass). This could be useful to reduce catenary belt deflection. A strongly negative $F_n/F_t$ ratio will add tension to the belt attachment bolts, and will induce belt sag reducing clearance between the belt and the nozzle. From these trends and general observations, a nozzle tilt angle with respect to horizontal of about +5° is a reasonable compromise of head-insensitive efficiency and a $F_n/F_t$ ratio near 0, while also allowing wider belt spans and less curvy crossbeams than a jet exit angle equal to about 0.

Figure 20:
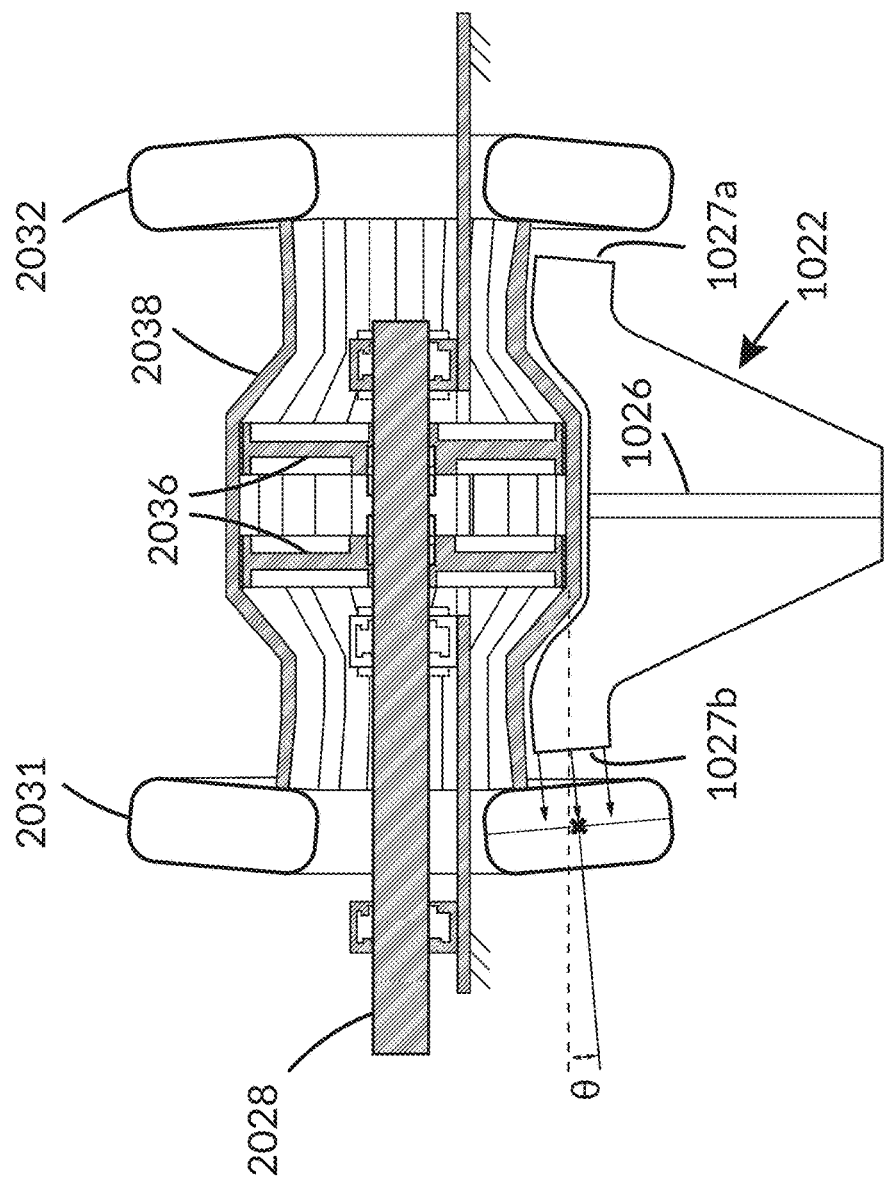
FIG. 20 is a partial cross-sectional view of a system including a nozzle with a −5° jet angle according to an embodiment.
Figure 21:
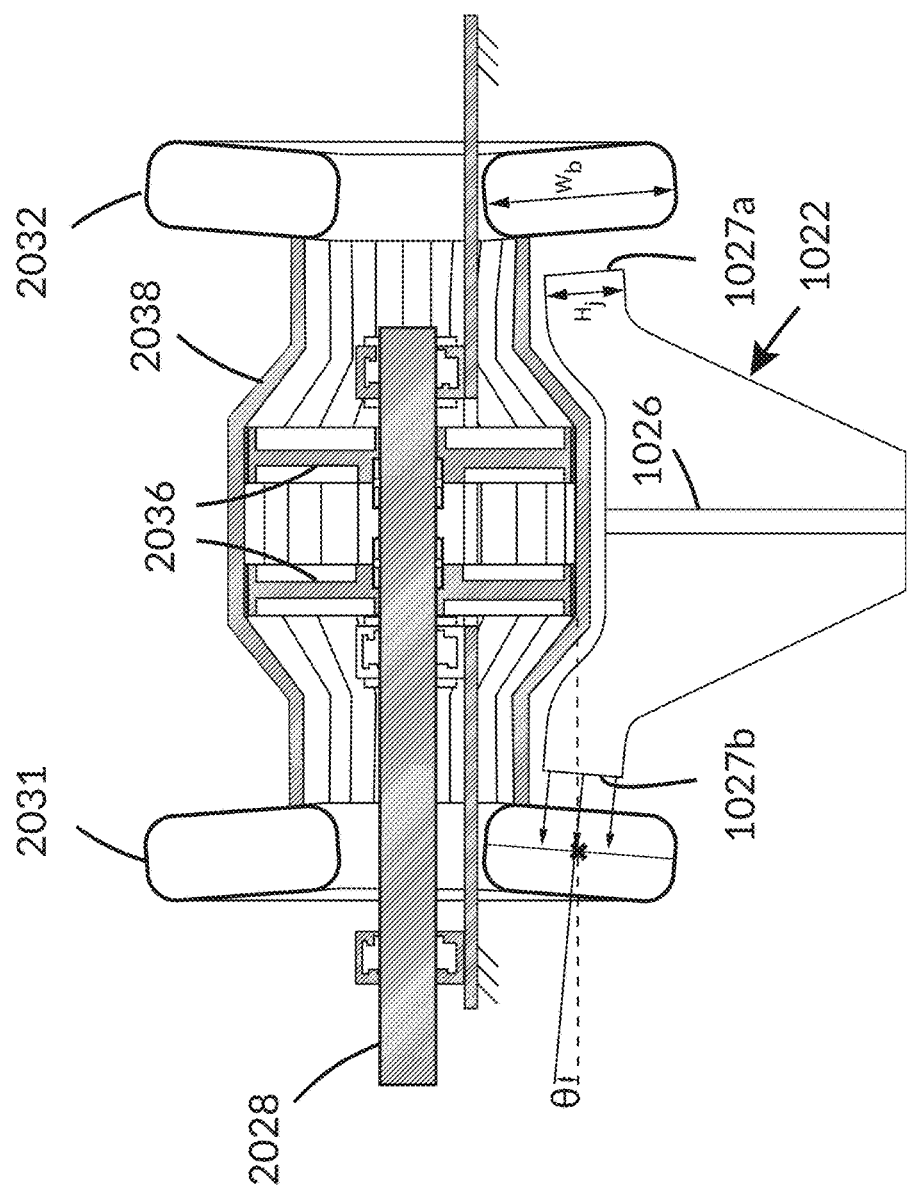
FIG. 21 is a partial cross-sectional view of a system including a nozzle with a +5° jet angle according to an embodiment.

FIG. 20 illustrates nozzle 1022 sloped down at −5°, with accompanying crossbeams and buckets, the angle denoted by "0". FIG. 21 illustrates a nozzle tilted up +5°, and buckets' center located coincident with belt back plane. FIG. 20 illustrates how the shape of crossbeams 2038 and nozzle 1022 are configured to match each other. Crossbeams 2038 and nozzle 1022 are shaped to utilize dual sprockets 2036, which are mounted on drive shaft 2028. In some embodiments, a single sprocket may be used. Like previous embodiments of a linear turbine, the single-stage linear turbine of FIG. 20 similarly includes second shaft with set of sprockets (though not shown). First and second plurality of buckets are shown by swept path 2031 and swept path 2031, respectively. Crossbeams 2038 are designed to clear nozzle outlets 1027a, 1027b so that the buckets are located proximal to nozzle outlets 1027a, 1027b. In some embodiments, buckets attached on either side of the crossbeams can be housed in independent bucket covers that can be independently removed for maintenance. As shown in various figures such as FIGS. 20 and 21, the bold "X" marks the center of pressure on the bucket, imparted by the jet (schematic flow lines shown for illustrative purposes). Additionally, "$H_j$" denotes the jet height, and "$W_b$" denotes bucket width, and "$L_j$" denotes jet length. Schematic flow lines are shown for illustrative purposes.

The implementation of downward-tilted, or even horizontal, nozzle, may influence additional design parameters. For example, the crossbeam may be configured as a recurve-bow shape to clear the nozzle, which is designed to occupy minimal space to ensure low losses in turning the flow. The curved crossbeam shape removes space budget within the turbine, making it important to check clearance with various chassis concepts. Further, the dual sprocket design may allow for a wider span than in a single central belt/sprocket design, in that a plurality of sprockets may distribute the belt over a larger support structure. The bucket's center of pressure may advantageously be positioned close to the belt back plane to keep moment loads low.

Nozzle Flow Control System

Embodiments of the linear turbine may include a closure mechanism to control an area of the opening of a nozzle outlet. The linear turbine systems described herein have particular application to natural sources of water, such as rivers. Such sources typically have a significant flow variability, causing a turbine to need to operate at a wide range of flow rates. A turbine is conventionally optimized to accommodate a maximum predetermined flow from the natural source. When flow from the source is less than the maximum predetermined flow, the turbine may experience a significant loss in efficiency. For example, the efficiency of propeller-type turbines declines rapidly at any flow rate less than the maximum design flow. Conventional high head Pelton turbines, on the other hand, maintain high efficiency across a wide range of flow rates. As shown in FIG. 70, a conventional Pelton turbine has an adjustable flow control mechanism in the form of an adjustable spear 306 within nozzle 302. Such a conventional solution, however, is not generally applicable to the unique linear turbine systems described herein. For example, nozzle 122 described herein may have a rectilinear outlet opening, from which a free jet uniformly exits at an angle to the opening.

Figure 24:
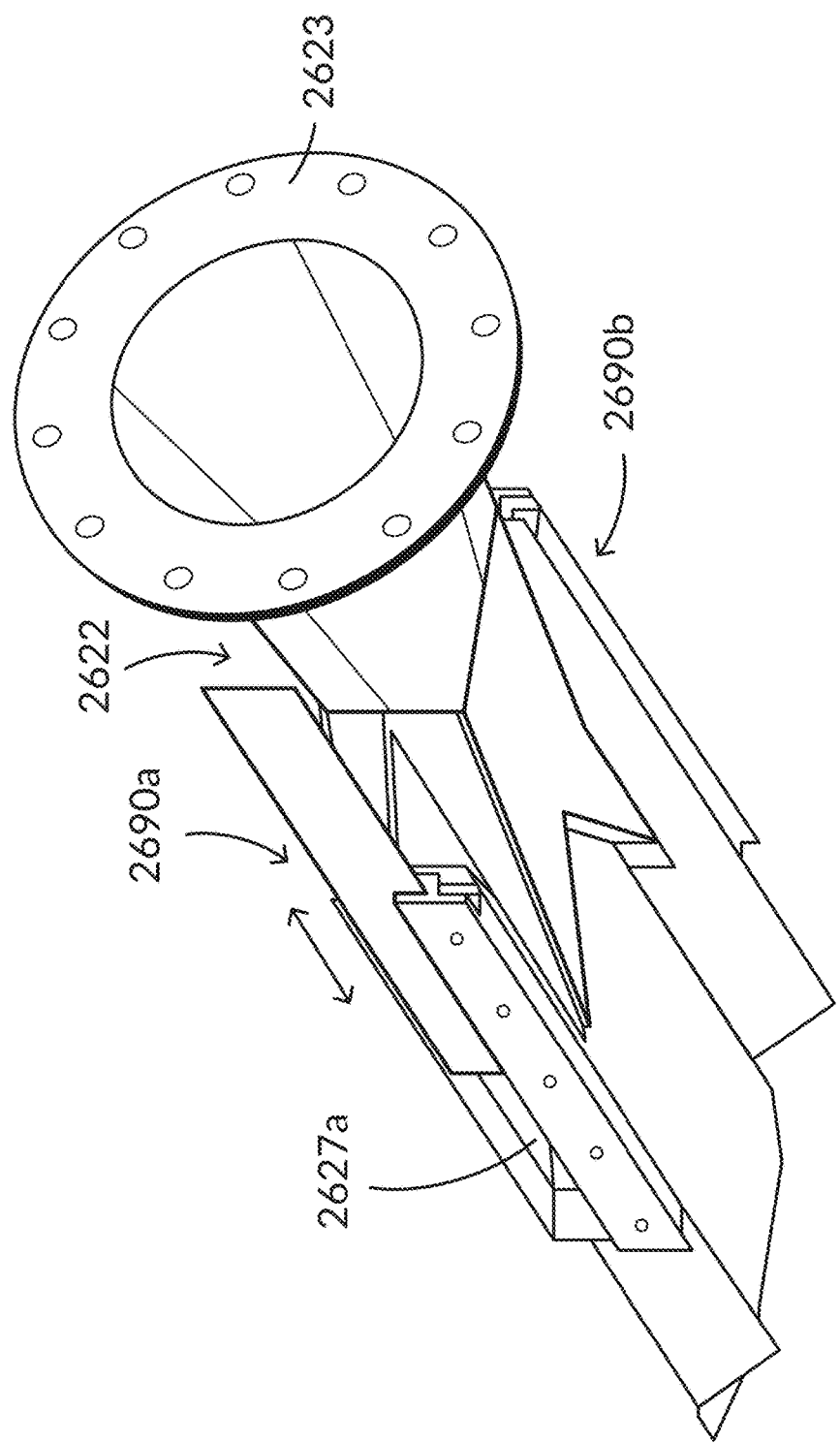
FIG. 24 shows a partial perspective view of a nozzle arrangement having a slide gate according to an embodiment.

As shown in the partial perspective view of FIG. 24, a first closure mechanism may be, for example, a first slide gate mechanism 2690a that moves from a position adjacent a proximal end of the first substantially rectilinear opening toward a distal end of the first substantially rectilinear opening to reduce the area of the first substantially rectilinear opening 2627a. A second closure mechanism may also be used to control an area of the second substantially rectilinear opening. Like the first closure mechanism, the second closure mechanism may be, for example, a second slide gate mechanism 2690b that moves from a position adjacent a proximal end of the second substantially rectilinear opening toward a distal end of the second substantially rectilinear opening to reduce the area of the second substantially rectilinear opening.

Figure 24A:
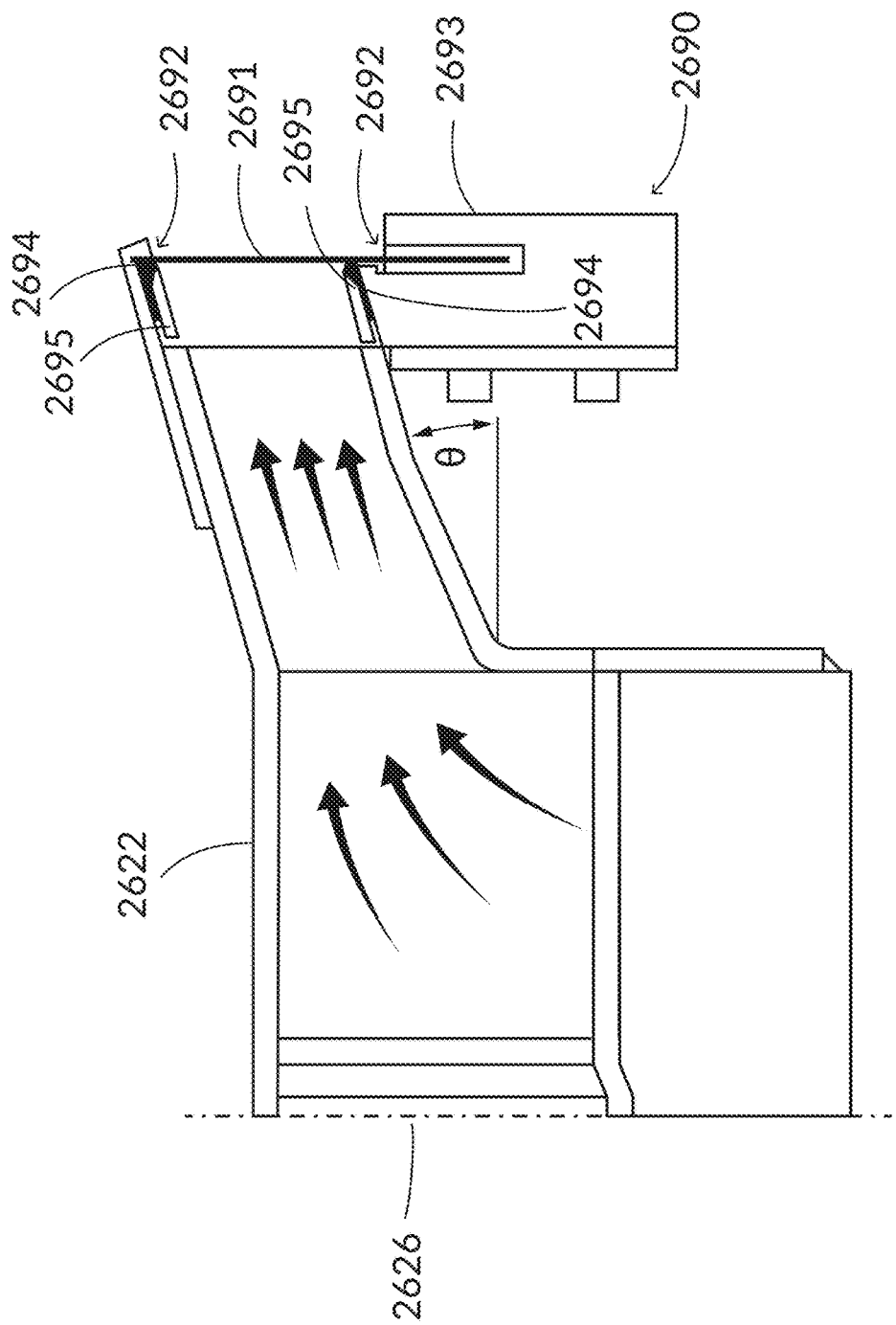
FIG. 24A shows a partial cross-sectional view of a nozzle arrangement having a slide gate according to the embodiment shown in FIG. 24.

Slide gate mechanisms 2690a, 2690b may be separate modules mounted at outlets of nozzle 2622 or integrated into nozzle 2622. As shown in FIG. 24A, a slide gate 2691 may be vertically mounted with respect elongated rectilinear opening 2627a. Such an arrangement allows dual parallel actuation of slide gate mechanisms 2690a, 2690b. In an embodiment, rectilinear opening 2627a and slide gate 2691 may be angled with respect to vertical. Though in an embodiment slide gate mechanisms 2690a, 2690b may function independent of one another, linking the slide gate mechanisms 2690a, 2690b allows for a reduction in the number of actuation elements needed. It is also desirable to move both slide gate mechanisms 2690a, 2690b at the same time, at the same rate, and in the same manner. Differences in the size of the openings in nozzle 2622 may induce undesirable twisting forces in the turbine. An actuator and linkage system may be used to simultaneously move first slide gate mechanism 2690a and second slide gate mechanism 2690b together. Alternatively, the first closure mechanism may include a rotatable wicket gates positioned adjacent the first substantially rectilinear opening. In either case, first closure mechanism may include an elastomeric seal 2694 and a seal retainer 2695. Seal retainer 2695 may have a sharp edge such that the first rectilinear jet of fluid separates cleanly from the seal retainer.

Figure 23:
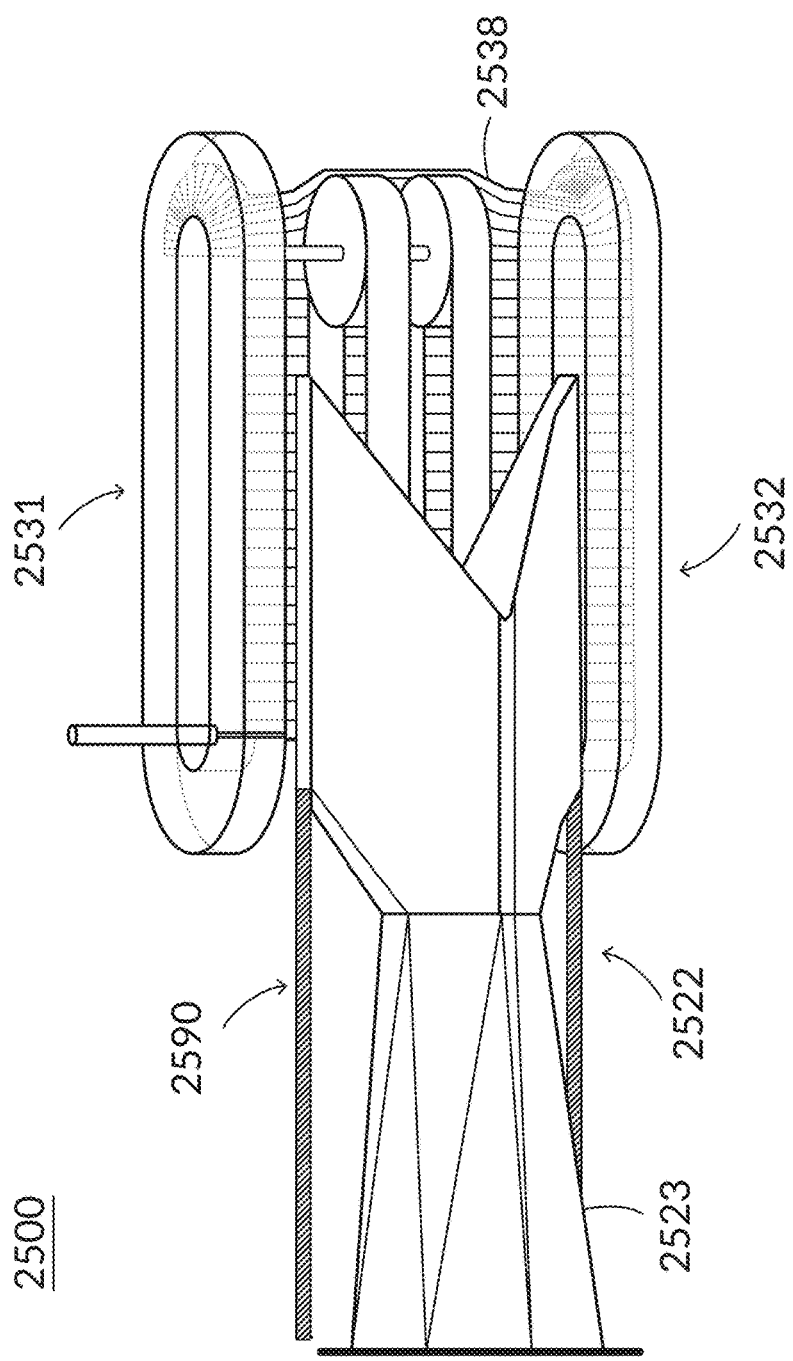
FIG. 23 illustrates a linear turbine and a nozzle arrangement having a slide gate according to an embodiment.

Similar to the above described embodiments, FIG. 23 shows a linear turbine system 2500 with a nozzle 2522 for redirecting flow from a round-to-polygonal adapter section 2523 toward buckets connected by crossbeams 2538 and enclosed by two parallel swept paths, showing the path of the buckets 2531, 2532. A slide gate assembly 2590 is integrated with nozzle 2522 (shown with the slide gate retracted). FIG. 24 shows slide gate assemblies, mounted on nozzle 2622, with the slide gate partially retracted. FIG. 24A shows a cross-section view of one side of the system shown in FIG. 24, illustrating details of slide gate mechanism 2690a including gate guides and seals. A variety of designs are possible to implement the gate and guide system beside the concept shown. For example, the slide gate guide bearings 2963 may be linear rails rather than slots. In some embodiments, the orientation of the slide gate may be substantially perpendicular to projected jet vector, rather than vertical as shown.

Figure 34:
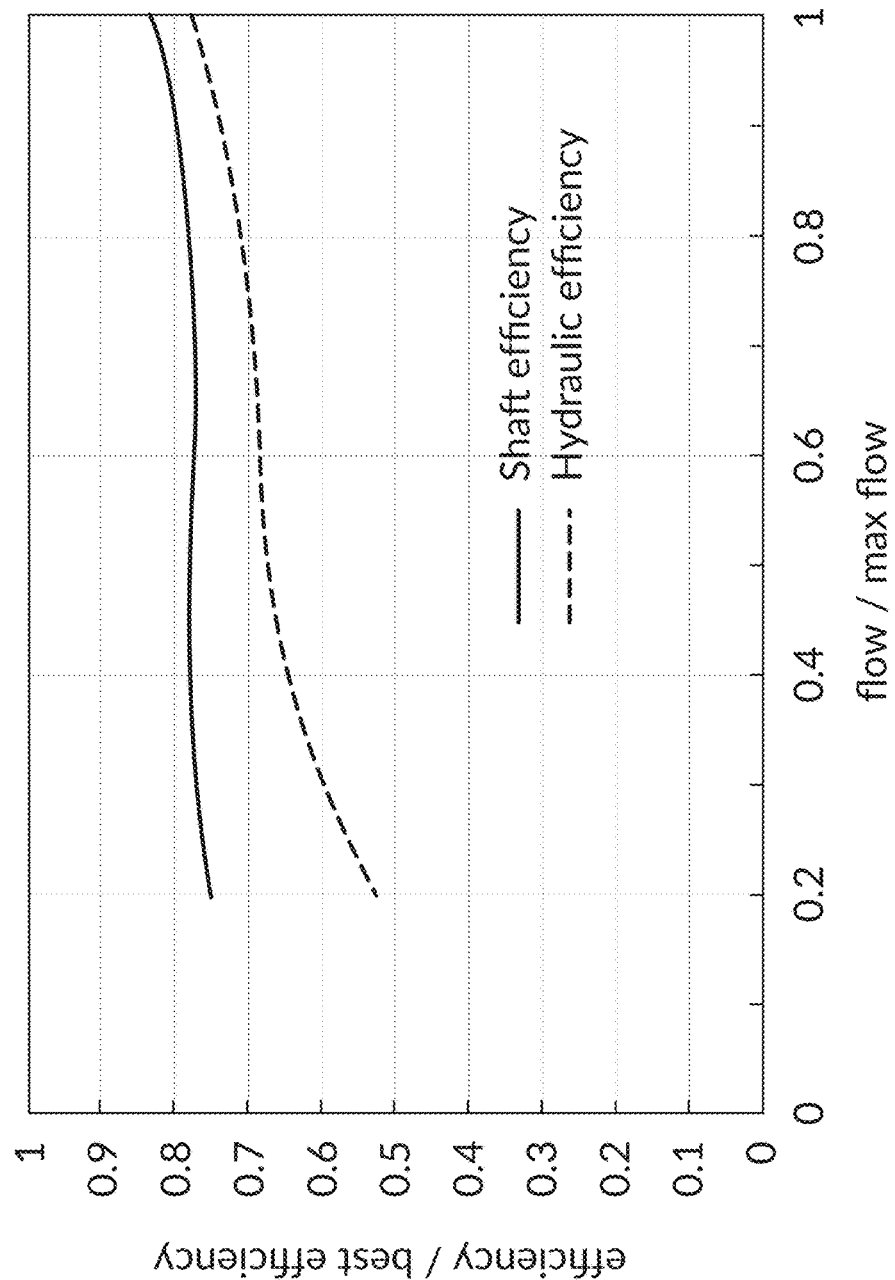
FIG. 34 is a plot of relative efficiency vs. $Q/Q_{max}$ (flow/best flow) for a slide gate.

Similar to FIGS. 15 and 16, FIGS. 25-30 illustrate how flow angle and $C_v$ changes with respect to flow conditions for nozzle arrangement 1122 at different slide gate positions. FIGS. 31-33 illustrate that mass averaged flow angle decreases by roughly 3° when slide gate is not fully open, while nozzle losses reduce slightly as flow rate goes down. This should be taken into account when predicting flow rate at part flow, as well as bucket efficiency. Test results plotted in FIG. 34 shows that the turbine maintained high relative efficiency across a wide range of flows, with less than 7% change in hydraulic efficiency from full flow, to 25% of full flow. These values are exemplary in a small model with relatively higher internal mechanical friction. Larger commercial-scale turbines will have relatively lower mechanical friction versus the hydraulic power being produced.

Figure 35:
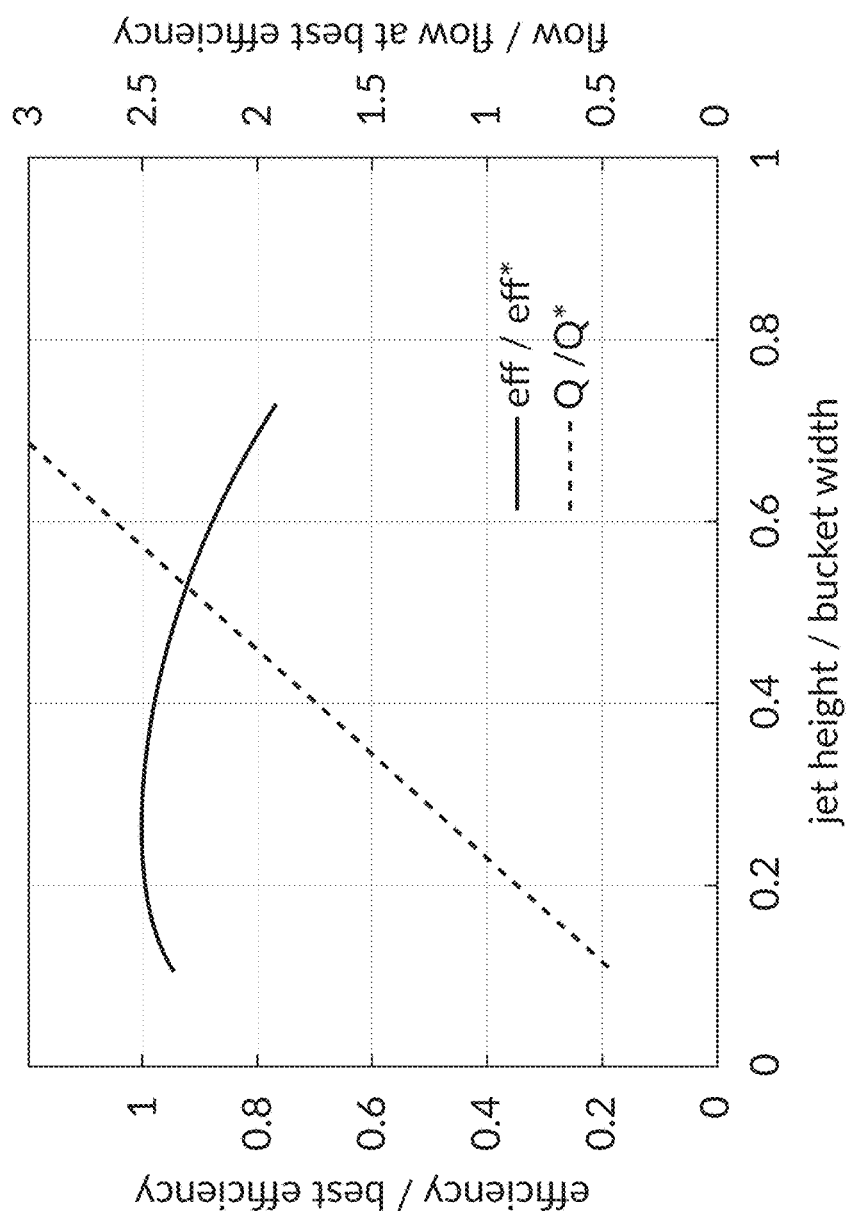
FIG. 35 is a plot of efficiency vs. the ratio of jet height to bucket width.

FIG. 35 is a plot of efficiency vs. the ratio of jet height to bucket width.

Figure 36:
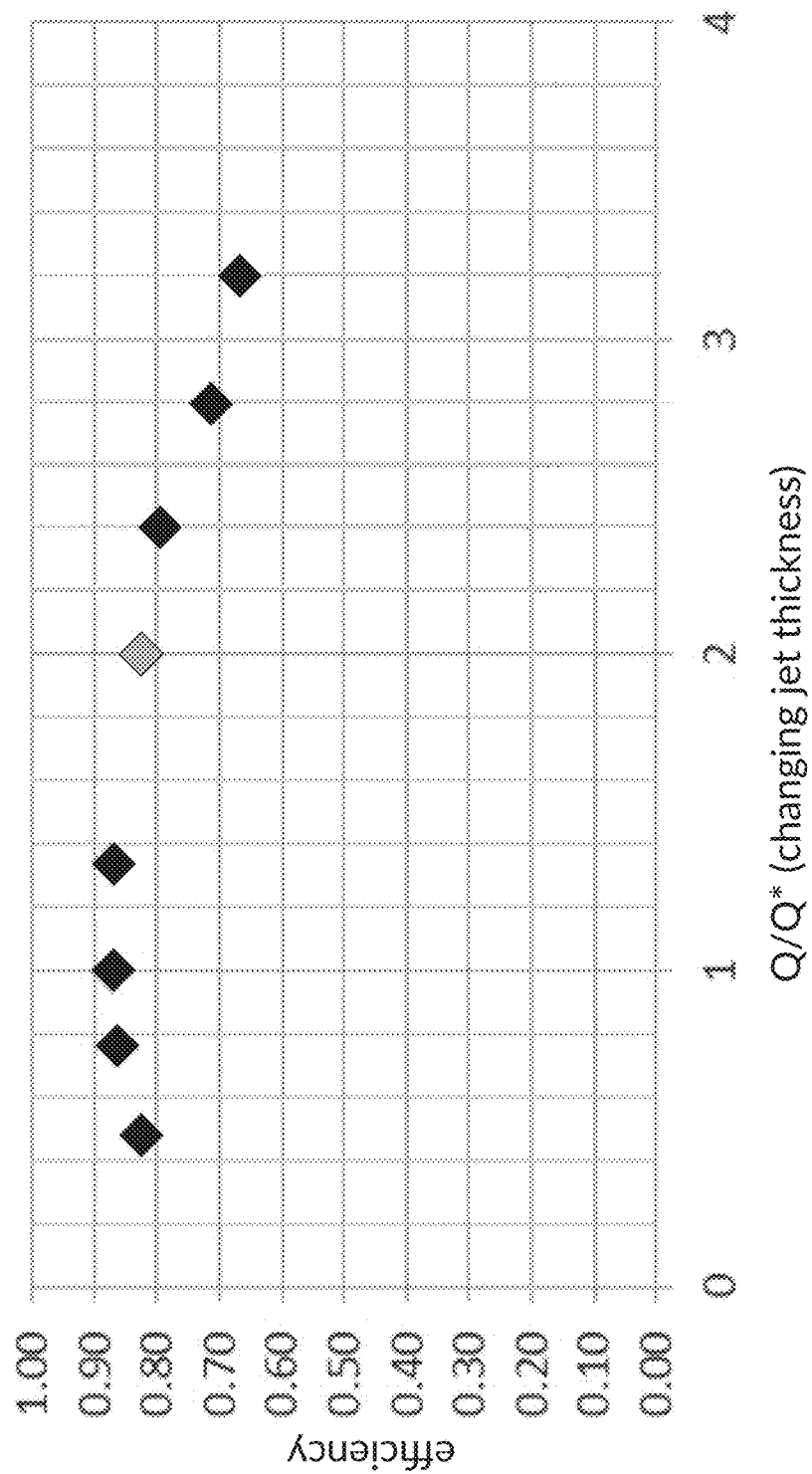
FIG. 36 is a plot of efficiency vs. Q/Q*.

FIG. 36 is a plot of efficiency vs. Q/Q*.

Figure 37:
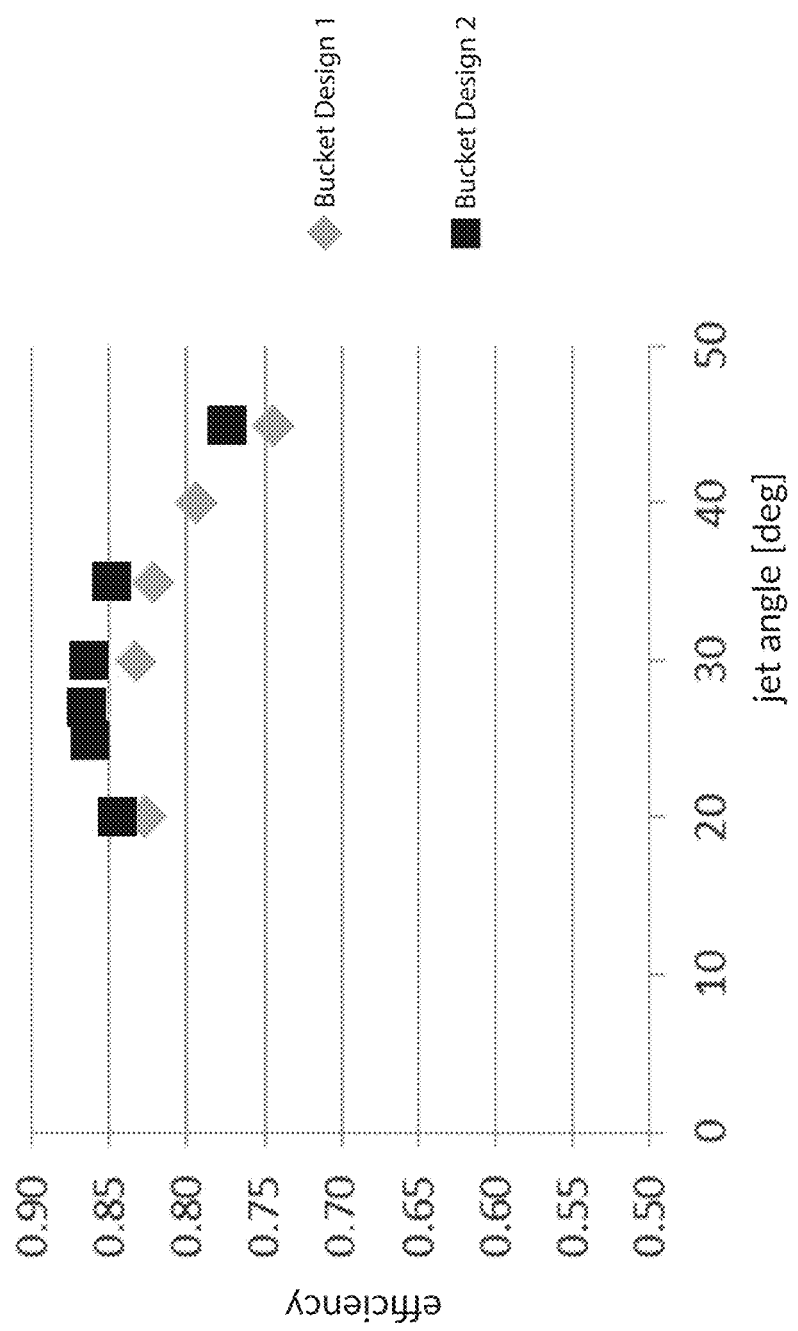
FIG. 37 is a plot of efficiency vs. jet angle.

FIG. 37 is a plot of efficiency vs. jet angle.

In an embodiment, slide gate 2691 may be made solid, without any folding. A rack and pinion, for example, may be used for actuation. Because the rack may be difficult to seal at the vacuum housing interface, a protective housing may be fitted over the gate in its extended position. This housing is configured to avoid problems with icing. The rack actuator may be housed in air and drive the pinion via an extension shaft. The length of the penstock/inlet-to-distributor adapter 2523 is such that the sliding gate can be accommodated without a large additional length penalty, so a rigid, non-folding gate may be a feasible option for many sites. This provides valuable flexibility, particularly for high head sites where the loads required for full closure and opening may be quite large for a coiling design.

In an alternative embodiment, a coiling gate is used for compact powerhouses to reduce the overall length of the turbine. Feasibility of coiling the gate depends to some extent on the design criteria such as maximum allowable panel deflection, and max allowable bending stress during the coiling operation (which defines the max allowable bend radius). The following list provides other, non-limiting example embodiments of the slide gate: a simple spooled sheet metal; plates on roller chain; rigid pinned sections; sheet metal with reinforcement bars; bars and a pretensioned cable framing a rubber seal sheet; bars with a cable attached to each bar and a sealing mechanism; and bars with a sheet acting as a living hinge. Drive options include, but are not limited to: holes in sheet metal and plates; rack gears on inside face of plates; and a gear rack on the outside edge of a plurality of plates.

In further aspects, flow control can be achieved by using one butterfly valve on each distributor, using slide gates, and/or using segmented slide gates. Segmented hinged panels or wicket gates may also be used as an alternative to a slide gate.

Bucket Shape

With reference back to FIGS. 1-5, nozzle 1022 directs a free jet at an angle $\alpha_1$ to direction of bucket travel 1040. The shape of the bucket is configured such that the flow a free jet is redirected in a direction opposite to the direction of travel 1040 and away from the turbine at an angle $\beta_2$. These parameters play an important role in determining the amount of work done by the linear turbine and hence its efficiency.

Figure 38:
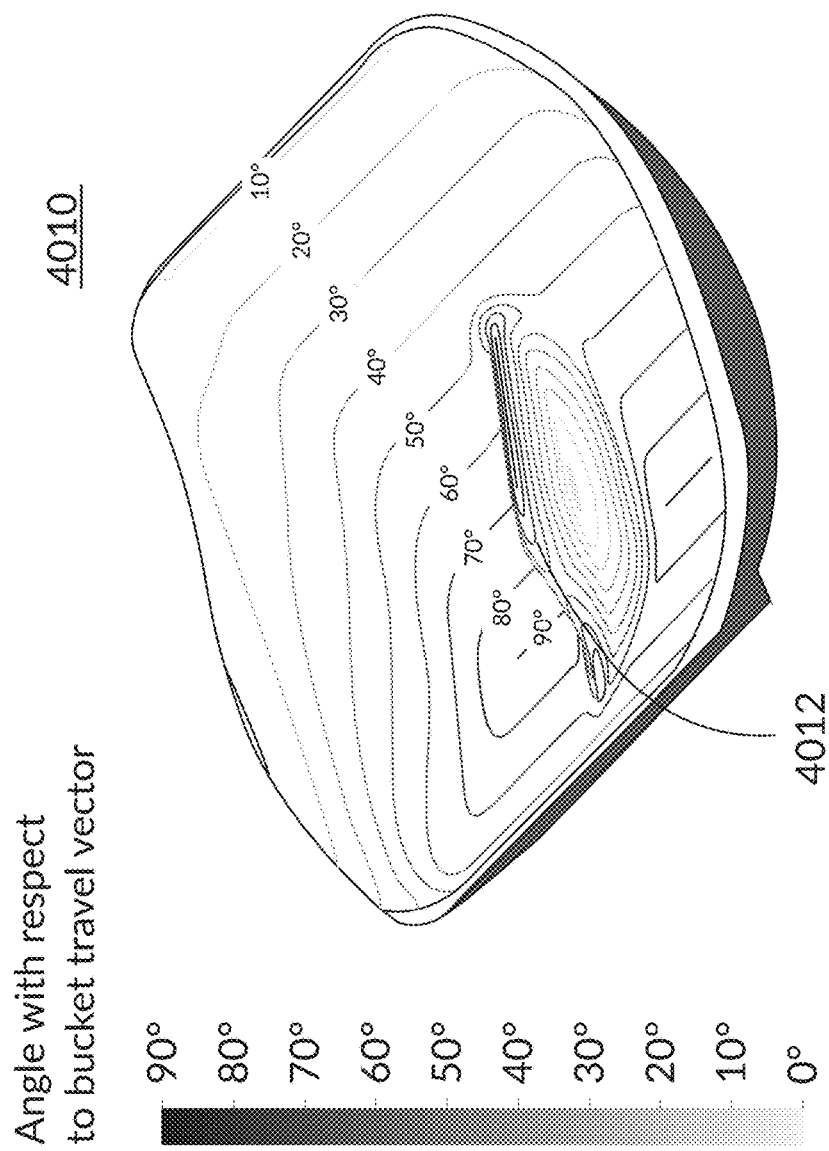
FIGS. 38, 39, and 40 show an exemplary bucket design for a linear turbine, with FIGS. 39 and 40 illustrating a partial cascade of exemplary buckets, their dimensional relationship, illustration of solidity, and fluid illustration from a CFD simulation showing the path of fluid once it impinges upon a bucket.
Figure 39:
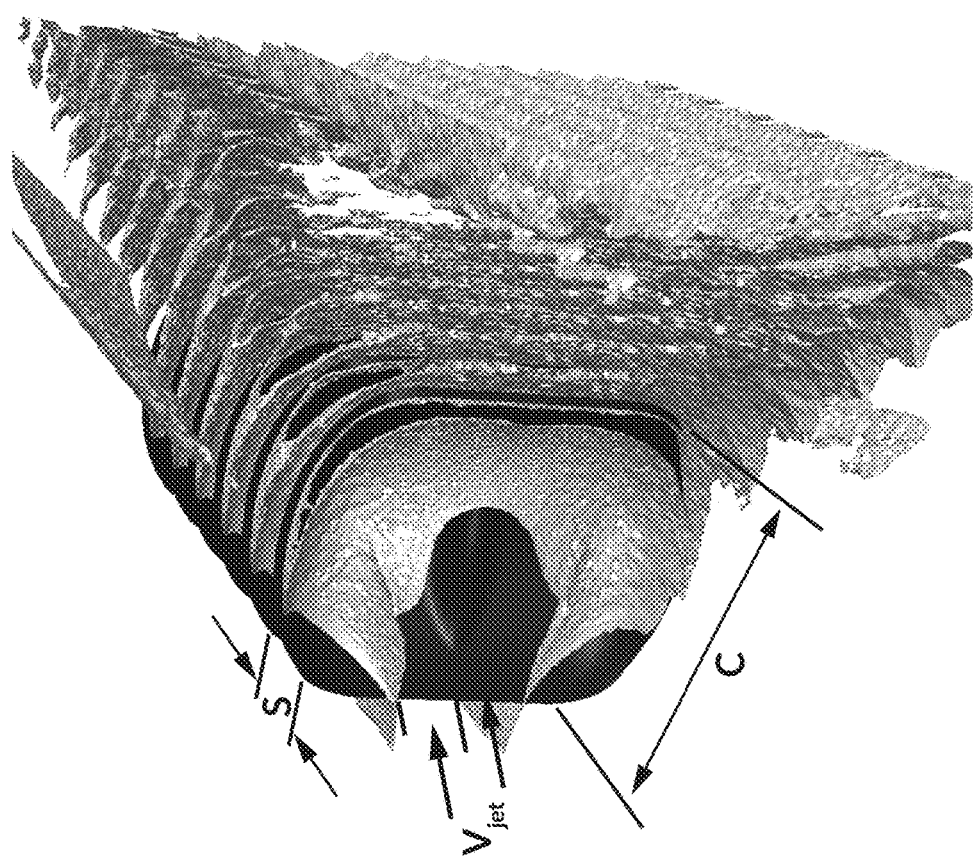
Figure 40:
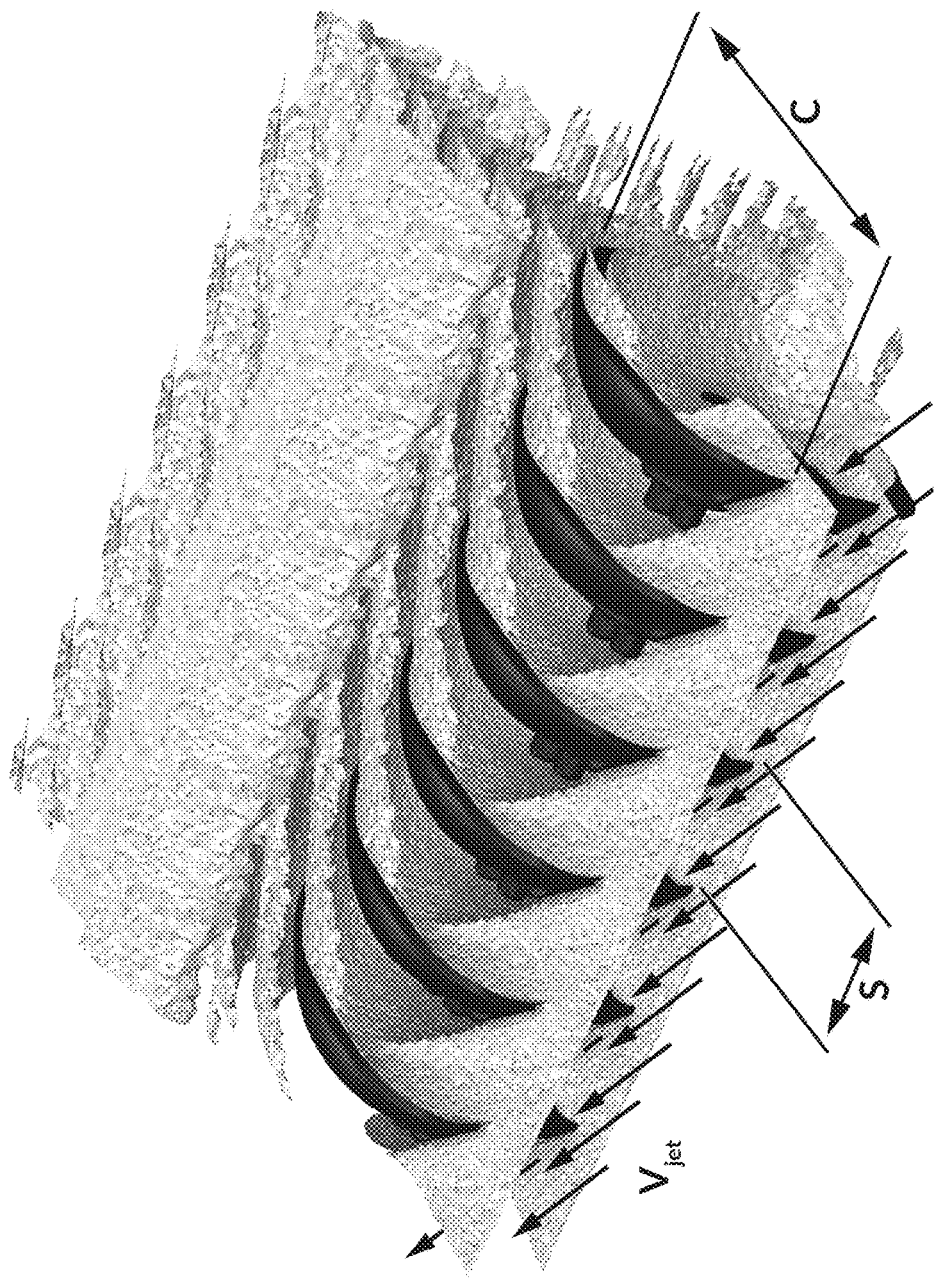
Figure 49:
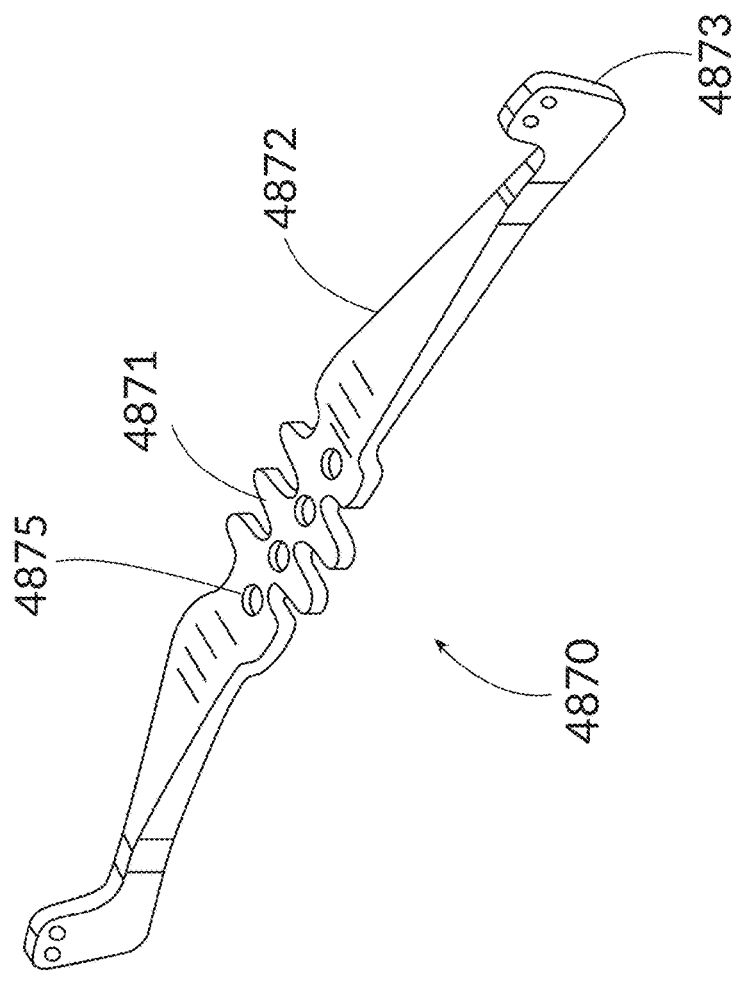
Figure 48:
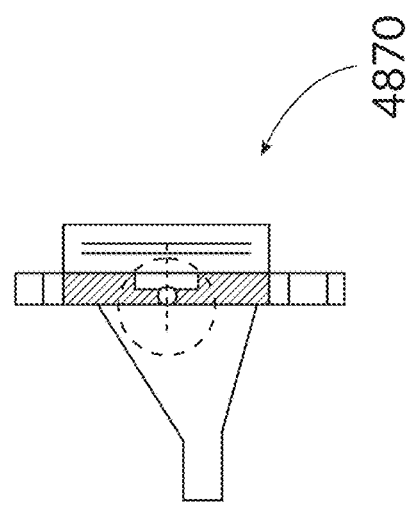

FIGS. 38, 39, and 40 show an exemplary bucket design for a linear turbine, with FIGS. 39 and 40 illustrating a partial cascade of exemplary buckets, their dimensional relationship, illustration of solidity, and fluid illustration from a CFD simulation showing the path of fluid once it impinges upon a bucket as it moves.

FIGS. 38-45a/b illustrate a bucket design that is specifically designed for a linear turbine (e.g., linear Pelton turbine). Buckets of a single-stage linear turbine may be designed to enable all or substantially all streamlines to exit across the blade, with substantially no re-entrant streamlines. The bucket 4010 show in these FIGS. enables efficient clearing of water around perimeter of bucket, with no or substantially no re-entrant streamlines (see FIGS. 39 and 40); virtually shockless entry; a defined separation point around bucket lip; a defined separation point on bucket backside (creating an intentional air cavity in which the crossbeam and associated bucket-mounting hardware can fit without any drag or back splashing); a rounded leading edge (enabling parametric design for various goals, such as high efficiency or fish passage); an integrated rib (providing a location for threaded fasteners with minimal negative impact on efficiency); and a bucket shape that may be configured to be elongated or reduced in embodiments with varying jet width jets.

While previous buckets displayed flow that for the most part exited the bucket to the side and downward, a noticeable amount of flow visibly exited the upper perimeter of the buckets and re-entered the turbine interior. This flow created a drag force as subsequent blades impelled the fluid. Ultimately some of this trapped flow is flung out of the machine as the blades turn around the distal sprocket, emerging as a large "roostertail." To reduce roostertailing, in some embodiments, the nozzle/jet may be positioned further from the return axle. Further, in some embodiments linear travel may be increased so that the fluid may fully exit the bucket prior to returning.

Bucket 4010 is self-centering, that is, it balances itself along a direction of travel (such as a plane defined by the belt). Because bucket 4010 has concave curvature on either side of the incoming jet, there will be a restoring force which rises in magnitude in proportion with the degree of parallel misalignment to the jet.

A front concave surface of bucket 4010 is formed by parametric curvature-smooth blends (conics), allowing tuning of the bucket's shape to eliminate problems such as backsplashing, while maximizing the amount of flow turning (efficiency). FIG. 40 shows how the bucket's slope varies. The side and tips have tight curvature (approximately 8° and 9° respectively) while the corner area has lower slope (approximately 27°) to allow the flow in that area to exit at an angle large enough to clear the blade.

FIGS. 41-45b, for example, shows a concave surface extending to meet the jet inlet with an angle that minimizes shock or sudden change in fluid angle. A rounded leading edge, the radius of which can vary, is useful for improving safety of biological organisms, such as fish, which may pass through the turbine (e.g., "fish-friendliness"). A rib 4012 in the concave bucket surface allows a local thickness increase and provides room for a threaded hole 4016 allowing use of fasteners to attach the bucket to the blade beam. The rib is smoothly blended into the surrounding bucket. Curvature extends fully around the perimeter of the bucket. A clearly defined separation edge 4020 around the bucket rim allows the water to cleanly exit the bucket. The rim face may be approximately perpendicular to the surface. A clearly defined separation edge on the bucket convex backside that resembles a ramp or wedge 4014 terminates in a sharp edge, forcing the jet to cleanly split off the ramp in a deterministic way. A flat pad area 4018 provides a stable attachment surface for the crossbeam tab. A rim whose shape allows subsequent buckets to clear each other without colliding, particularly as they travel around the sprockets. As shown, the angle of the surface with respect to the bucket travel vector is plotted with contour lines.

The bucket 4010 show a significant improvement versus bucket 4310. The machine with buckets 4010 was tested to be about 84% efficient, vs. about 71% for the machine with buckets 4310. In some tests, the measured turbine efficiency peaked at a lower than expected value of U/Vjet, in part because the nozzle design had not yet been optimized. For example, visible flow was still being entrained in the machine, and being flung up in the air by returning buckets.

FIGS. 41 and 42 show the interaction of fluid with the buckets, showing the air gap on the back side of the buckets. In this regard, the air pocket allows for space to fit the cross-beams, other mechanicals, and allows for clearance and lack of backsplashing/interference with the cascade of buckets as the buckets move along their path. The air pocket allows for the tabs of the cross beam to couple to the bucket. As shown, it shows substantially no sideloading. These figures also illustrate the theoretical nature of FIG. 5. While the jet enters the bucket at a coherent vector, it immediately begins to spread out along the surface of the bucket as it is deflected by the bucket surface.

These results show that performance of the entire machine is based on a combination of buckets and nozzle, rather than just buckets alone. Based on observation of flows during the tests, it is apparent that remaining undesirable dynamics may be improved upon. These dynamics may be due to an interaction of sub-optimal, non-uniform streamlines exiting the nozzle, with the blades. For example, it was observed that returning buckets may fling water up in the air (known as a rooster tail). This means that jet flow is not completely clearing across the bucket before the buckets are forced to return around the axle. Some fluid remains in a bucket which flung upward when the bucket reaches an arc-shaped segment of the travel path. Repositioning or retracting the nozzle end may allow additional linear travel so that water can fully exit the bucket prior to returning. It was also observed that buckets proximal to the fluid inlet cleared water to the sides more effectively than the buckets in the mid-span. This behavior was attributable to non-uniform streamlines exiting the nozzle. This issue may also be addressed by optimal nozzle design.

Bucket 4310 is shown, for example, in FIGS. 43-47a/b. Each of the buckets 4310 can have a dimension C and a width W. Dimension C may be in a range from approximately 90 mm to approximately 115 mm, such as in a range from approximately 100 mm to approximately 105 mm. Width W may be in a range from approximately 110 mm to approximately 130 mm, such as in a range from approximately 115 mm to approximately 120 mm. As shown, bucket may also include dimension L, shown as a linear distance of the edge of the bucket along its width, prior to the curvature of the sidewalls of the bucket. This is best shown in FIG. 47a. Dimension L may be varied while curvature remains constant, allowing for a wider platform for jet impingement.

Each bucket may be removably mounted to an end of a crossbeam through attachment holes. A first attachment hole can be spaced from the top of bucket 4310 a distance D1. In an embodiment, D1 be in a range from approximately 40 mm to approximately 50 mm. A second attachment hole can be spaced from the first attachment hole a distance D2. In an embodiment, D2 be in a range from approximately 5 mm to approximately 20 mm. Bucket 4310 can have a depth Z. In an aspect, Z be in a range from approximately 25 mm to approximately 35 mm.

A top portion of bucket 4310 may have an angle $\beta_{2a}$ from a rear portion of bucket 4310. In an embodiment, $\beta_{2a}$ can range from approximately 5° to approximately 15°. In an embodiment, $\beta_{2a}$ can range from approximately 0° to approximately 20°. A bottom portion of bucket 4310 can have an angle $\beta_{2b}$ from a rear portion of bucket 400. In an embodiment, $\beta_{2b}$ may be in a range from approximately 5° to approximately 15°. In an embodiment, $\beta_{2b}$ may be in a range from approximately 0° to approximately 20°. These angles are tuned such that the efficiency may be increased, and so that the buckets do not hit each other, particularly when the buckets enter or exit the curved paths.

Similar to a conventional Pelton bucket, a front surface of bucket 4310 may include concave surfaces. The concave surfaces may have a radius of curvature ranging from approximately 25 mm to approximately 35 mm. In some embodiments the concave surfaces may have a constant radius of curvature. In other embodiments, the concave surfaces may have a varying radius of curvature. Bucket 4310 may have a thickness T. In an embodiment, T may be in a range from approximately 1 mm to approximately 5 mm, such as in a range from approximately 2 mm to approximately 4 mm.

The dimensions referenced herein are exemplary, and are non-limiting. The dimensional ranges may be scaled, for example, to be utilized in a linear turbine system of a larger scale, such as a turbine of up to or exceeding 1 megawatt.

Crossbeams

The linear turbine systems described herein may utilize cantilevered crossbeams that are mounted to a belt of the linear turbine. The crossbeams may be a part of a turbine blade. The buckets may be attached to the crossbeams (e.g., of the turbine blade). The crossbeams are configured to be centered mounted and configured to carry a bucket at each end. The cantilevered crossbeam design enables identical buckets to be used on the left side and right sides of the crossbeam. The crossbeams are configured to be placed in the linear turbine so as to avoid interference with water. Crossbeam 4870 is shown, for example, in FIGS. 46-49. Crossbeam 4870 includes a flat central mounting portion 4871 for mounting crossbeam 4870 to a belt or similar structure of a linear turbine. The crossbeam attachments may be centered at the center of mass to minimize inertial moments as the blade assembly moves around the shaft axis. Two symmetrical cantilevered arms 4872 extend from central mounting portion 4781. As shown in the figures, cantilevered arms 4872 may be sized and shaped so as to accommodate sprockets of the linear turbine, clear a nozzle, and properly position buckets at a nozzle outlet. Bucket mounting portions 4873 are integrally formed at each distal end of cantilevered arms 4872. Bucket mounting portions 4873 include through-holes 4874 that are configured to accept fasteners into through-holes 4874 for attaching a bucket to crossbeam 4870 at each end. In other embodiments, the buckets and crossbeams may be integrally formed, or fastened in other suitable ways, such as welding. In some embodiments, buckets and crossbeams together make up the turbine blade. Central mounting portion 4781 may include interlocking finger extensions to provide an increased moment arm to resist hydraulic moments. The crossbeam 4870 may be made, for example, from aluminum, an aluminum alloy, stainless steel, or a fiber-reinforced composite such as carbon fiber or fiberglass in an epoxy or thermoplastic matrix.

The bucket and crossbeam assembly is shown, which may make up a turbine blade, for example, in FIGS. 50-54. Because of the shape of crossbeam 4870 and the position of bucket 4310 on crossbeam 4870, the buckets 4310 can be hydraulically self-centering. This assembly may comprise a turbine blade, as used herein. A turbine blade may include one or more of these components. Fasteners are shown, which may connect crossbeam 4870 to the belt/chain; and also bucket 4010 to crossbeam 4870.

The crossbeams may be attached directly to a belt, e.g., requiring no bearings or parts having sliding relative motion.

Each side of buckets attached to the crossbeams can be housed in an independent cover that can be independently removed for maintenance. A linear housing central housing can support the nozzle. The shaft attached to the belt sprockets can turn on bearings attached to a common baseplate.

Mechanical Arrangement

U.S. provisional patent application 62/367,003 discussed using shafts whose bearings were located far outboard of the runner. A length and diameter of the shafts may be reduced by utilizing a chassis in which the bearings are brought inward and are located in close proximity to the powertrain sprockets.

FIG. 55 illustrates an over-head cross-sectional view of a compact mechanical arrangement. Conventional industrial roller bearings 5739 are mounted in pillow block housings affixed to a single plate 5764. Plate 5764 having all bearing locations machined in the same operation is secured to plinth 5760. In some embodiments, plinth 5760 may coact with other elements of the system to provide the draft chamber and relative vacuum features described herein. Axle bearings may be added at any of 4 locations to accommodate left-hand or right-hand overhung loads, etc. Widely spaced belts and sprockets 5736 add torsional stability and may allow elimination or deprecation of any powertrain guide rails. With this arrangement, belt attachments may be simple bolts without moving parts. As an additional benefit, a mass of each sprocket 5736 is halved, and the manufacturing process to produce them (such as castings) may be simpler, with less expensive tooling. The chassis design comprises a structure that is simple yet allows repeatable positioning of the outboard bearing in this configuration. These configurations may increase the stiffness of the system and decrease the free span. According to site installation requirements, the blades and belt may be tuned to avoid natural frequencies leading to unfavorable resonance.

The compact linear turbine system 5700 shown in FIG. 55 may include many of the features described herein with respect to other embodiments. For example, linear turbine system 5700 may include a slide gate mechanism 5790, which operates in a similar manner to slide gate mechanism 2690a described with respect to FIGS. 26 and 26A. Linear turbine system 5700 may also include bucket swept paths, showing the paths of the buckets 5731, 5732, which function in a similar manner to paths 2531, 2532. Linear turbine system 5700 may further include a round-to-polygonal adapter section configured to direct fluid flow from a penstock to a nozzle inlet in a manner similar to round-to-polygonal adapter section 1123, described with respect to FIG. 12. Linear turbine system 5700 may be configured to drive an electric generator in a manner similar to the arrangement illustrated by FIG. 1. Linear turbine system 5700 may also utilize a powertrain tension control system, such as take-up mechanism 5765. Powertrain tension control is further described below.

Powertrain Tension Control

Powertrain tension control is used in a linear turbine to maintain proper tension even as perturbations such as ambient temperature changes or ingestion of foreign objects occur. A spring loaded take-up may be designed to accomplish passive tension control without additional complex systems (as would be required by hydraulic or pneumatic take-ups). FIG. 56 illustrates a take-up mechanism 5865 utilizing a spring (such as a set of Belleville washers, for example) that is pressed using a stainless screw jack. Take-up mechanism 5865 may be in line with a belt center of load.

The powertrain may include additional mechanical components, such as a flywheel configured to provide useful inertia. In some embodiments, the flywheel may be replaced with or augmented by a shaft brake. High proportionality of nozzle control eliminates need for large inertia during startup. Shaft brake can be timed to come on only if turbine exceeds a particular speed limit while nozzle is attempting closure (i.e., if nozzle can close quickly enough, then brake will not trip on).

Tailwater Suction without Submergence

Linear turbines as described above may operate in an air-filled vacuum case, in which air bubbles are entrained by the jet and evacuated from the case by momentum of the outgoing fluid. As these bubbles are evacuated, the lower pool is sucked upwards in the draft chamber, recovering useful head below the turbine. This concept allows the turbine and associated equipment to be situated above tailwater, yet not lose the water fall below the turbine as working head. This is useful, for example, to avoid damage from flood waters, accommodate natural variations in tailwater, and to minimize construction cost.

Figure 57:
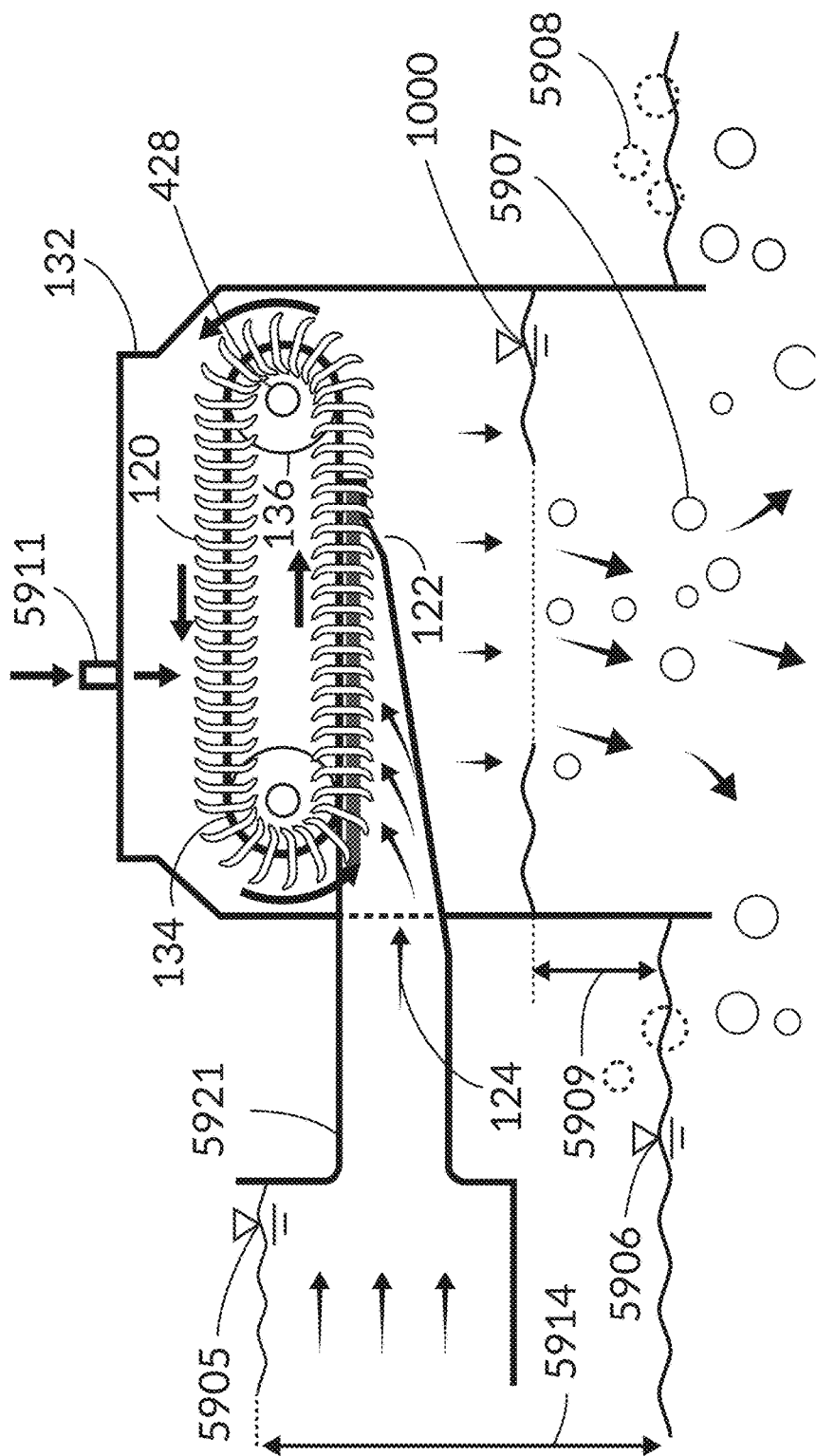
FIG. 57 is a schematic view illustrating an exemplary installation of a linear system including a sealed housing.

FIG. 57 illustrates a linear turbine, such as linear turbine 100, in the context of a site having a difference in elevation 5914 between a pool of working fluid, such as water, at an upper elevation 5905 and a pool at a lower elevation 5906. The fluid is conveyed through an intake conduit or penstock 5921 into a nozzle 122, which is disposed within housing or enclosure 5932. In this regard, the nozzle and housing may be coupled together such that a relative vacuum compared to the ambient atmosphere may develop. This enclosure extends below the surface of the lower pool, such that an enclosed atmosphere is isolated from the ambient external atmosphere. The length of the penstock 5921 or inlet can be arbitrarily large as needed, and its shape can be any convenient shape, such as circular or rectangular in cross-section.

The working fluid, such as water, moves under pressure through a nozzle 122 and exits the nozzle as a free jet. The system shown in derives pressure due to a difference in water levels of two pools, but in other applications, this pressure can come from any available source, internal water level 1000 is shown for illustrative purposes, and may vary relative to system operation and operating conditions. The linear turbine shown may operate in a manner as described with linear turbine 100 described with respect to FIGS. 1-4.

As the free jet of working fluid engages blades 130 of the turbine, air from the enclosed atmosphere is entrained in the working fluid and carried with the outlet flow in the form of bubbles 5907. Upon exiting the system into the lower pool, bubbles 5908 rise to the surface and rejoin the external atmosphere. Because the housing 5932 is airtight, the evacuation of air from the internal atmosphere will create a vacuum pressure, which elevates the internal water level within the housing to a distance 5909 above the external lower pool elevation 5906. An air inlet valve 5911 is provided to enable replenishment of fresh air from the external atmosphere, into the internal atmosphere.

This valve can be regulated such that a desired vacuum pressure is maintained inside the enclosed volume. The vacuum pressure adds to the usable pressure on the linear turbine, allowing the turbine to use most of the available elevation difference 5914, while also allowing the turbine to be placed at a convenient elevation above the lower pool, such as to avoid damage during high flow events, such as floods. This capability is important at hydropower projects that have small elevation drops, since the proportion of the total available drop represented by the unit elevation above tailwater can be significant. For example, at a project with 6 meters of total drop from upper pool to lower pool, the unit may need to be positioned 2 meters above the lower pool, so as to avoid being damaged when the tailwater rises during floods. The ability to use vacuum suction allows the turbine to take advantage of the 2 meters of drop that would otherwise be lost.

Rapid Depower

Hydropower plants must be designed to operate safely even if the utility grid connection is lost. Normally, in the event of power loss, the turbines must be quickly shut down to prevent risk of damage due to high speed operation. Conventional high-flow turbines, such as Kaplan, bulb, circular crossflow, and Francis turbines, are subject to large pressure fluctuations (known as water hammer) if the turbine is suddenly turned off or if a grid-disconnect event occurs and the machine rapidly accelerates. Water hammer occurs when all the water flowing through these types of turbines is suddenly stopped to fully depower the turbine. Conventional Pelton turbines, used only at sites having very high pressure, benefit by being able to use a jet deflector plate to divert the water stream/jet in an emergency, which allows fast and safe shut-down without water hammer, because only the direction of flow is changed, not the rate of flow. The U.S. provisional patent application 62/367,003 discussed ways of rapid depower, including jet deflector, deflector jets, and a relief valve.

Alternative means of rapid depower are herein disclosed, including methods of rapidly "swamping" the buckets, causing fast degradation of efficiency at overspeed conditions. As used herein, "swamping" denotes a system that causes fluid that exits one of the plurality of buckets into a rear surface of an adjacent bucket. A "swamper" may include portions of a system that effect this, including a deflector/pivot plate. In an embodiment, a linear turbine system may include a depower system configured to cause rapid degradation of efficiency of the turbine system at an overspeed condition. The depower system may include a deflector with the deflector arranged to selectively divert a portion of the fluid jet away from a plurality of buckets, such as buckets 110, 120. The deflector may include a pivot plate. The pivot plate may be arranged between the nozzle and the plurality of buckets. In another embodiment, the depower system may include a deflector arranged exterior to the plurality of buckets to direct fluid that exits one of the plurality of buckets into a rear surface of an adjacent bucket. The linear turbine system may further include a control system to control the depower system in increments.

The linear turbine theory discussed above shows that runaway speed multiple is a function of the jet angle. For example, at a 33 degree jet angle α, the no-load speed ratio is U/Vu=2.23, compared to the optimal efficiency speed ratio of U/Vu=0.69. Ignoring windage or drag, this yields a 3.23× speed increase. The actual multiple will be smaller than this value due to nonlinear increases in drag and bucket splashing, but we need to carefully consider increasing the speedup spec for all relevant components (belt attachments, bearings, generator etc.). Real-world conditions will involve fluid-dynamic drag at faster than optimal speed as well as mechanical friction and windage, all of which will reduce efficiency more quickly than the ideal theory, keeping the overspeed multiple to about 2.25×.

Various jet deflector shapes are possible. In one embodiment, a partial deflection may reduce overspeed multiple yet not actually completely starve the bucket immediately. This allows a much smaller and simpler deflector mechanism when compared to a solution which completely diverts the jet. For example, a small pivoted plate may be used for partial deflection, instead of a large plate on a 4-bar linkage. In an embodiment, a small pivoted plate may be configured to reduce the overspeed multiple from 2.25× to 1.8×. This condition will result in moment loading of the bucket relative to the belt, but this load will dissipate quickly as the unit runs up to the speed-no-load condition.

In an alternative embodiment, a plate may be arranged outboard of a plurality of buckets (opposite the nozzle) to interfere with flow otherwise exiting the turbine. A nozzle and bucket arrangement of a linear turbine system may be designed to efficiently redirect a fluid flow as shown in FIG. 4. A plate may be pivoted, translated, or otherwise positioned proximal to a plurality of buckets on a side opposite a nozzle. By blocking the flow of fluid, fluid remains entrained in the turbine naturally impeding the travel of the buckets. FIG. 58c illustrates how the system acts as a "swamper" to rapidly cause drag loads on the buckets.

FIG. 58a shows a baseline embodiment, having no deflector. As shown, gap "G" between the nozzle 122 and the bucket 110 (attached to crossbeam 138) is shown. This allows travel within the system, as well as room to position other mechanical systems within the space (such as flow control mechanisms and rapid depower mechanisms). The distance of this gap affects structural rigidity of the system, e.g., the turbine blade including the cross beam and bucket, so that as the distance increases, other dimensions may be required to be altered, including those of the components of the turbine blade, belt, and powertrain generally. FIG. 58b shows a Jet deflector 6010, which may be used to direct a portion of fluid that has exited the jet away from the bucket. In this regard, better control of the flow impinging on the buckets can be achieved, without a large pressure load (for example, if the flow was cutoff at the nozzle exit itself, sealing the opening). FIG. 58c shows the swamper system, where fluid that has exited the buckets is directed back towards the backside of the buckets by swamper 6012. FIG. 58d shows a deflector jet 6014, which may include holes 6014 drilled at an angle in a plate. The holes may direct fluid exiting the nozzle at a given angle to a different angle, e.g., at an angle coming out from the page, as illustrated. This will also direct fluid to the backs of the buckets. In some embodiments, the deflector jet may be a series of nozzles, that may have an adjustable angle. In these embodiments, fluid may be directed towards either the front or back of the buckets. Each of the fluid altering systems may be used to slow or stop the turbine, and each may be adjustable such that a rate of slowing or stopping may be controlled.

Further Embodiments

Figure 59:
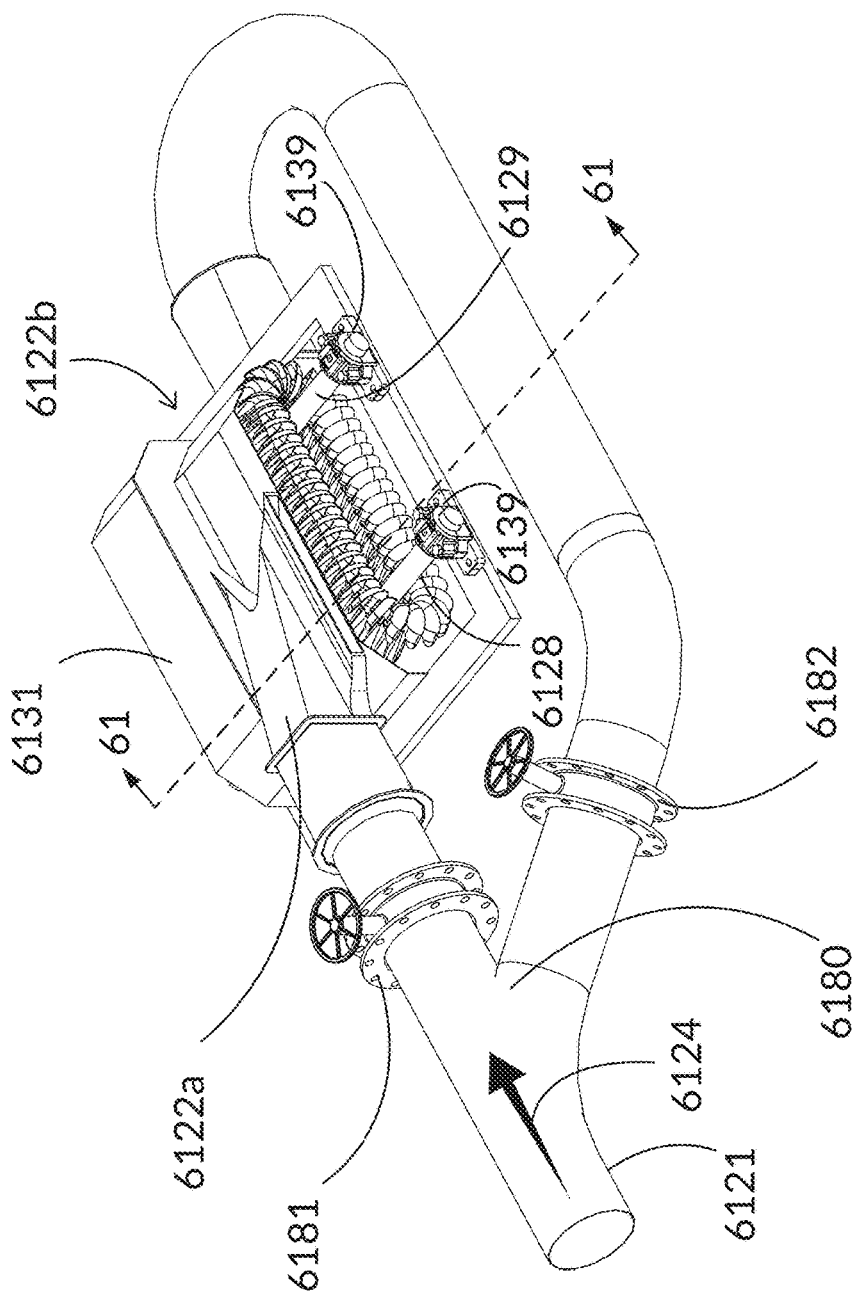
FIG. 59 is a perspective view of a linear turbine according to a dual distributor (e.g., upper and lower distributor) embodiment.
Figure 60:
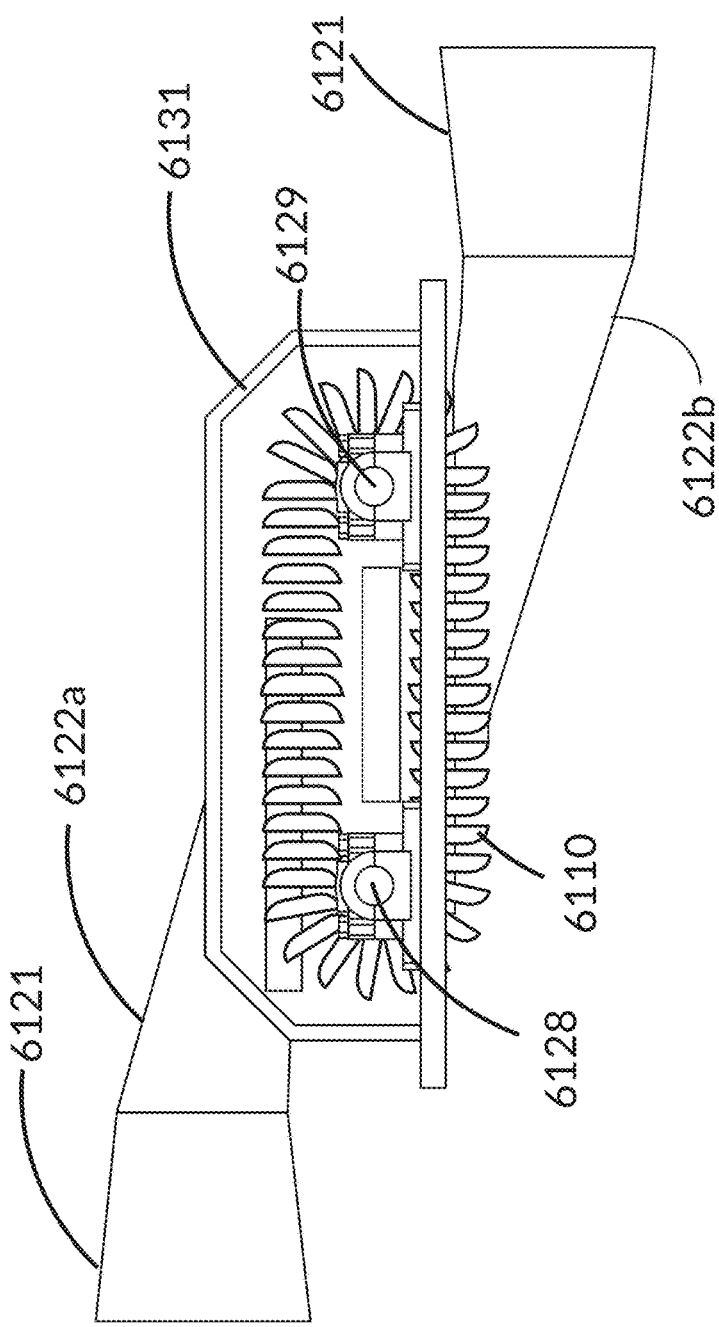
FIG. 60 is a schematic side view of a linear turbine shown in FIG. 59.
Figure 61:
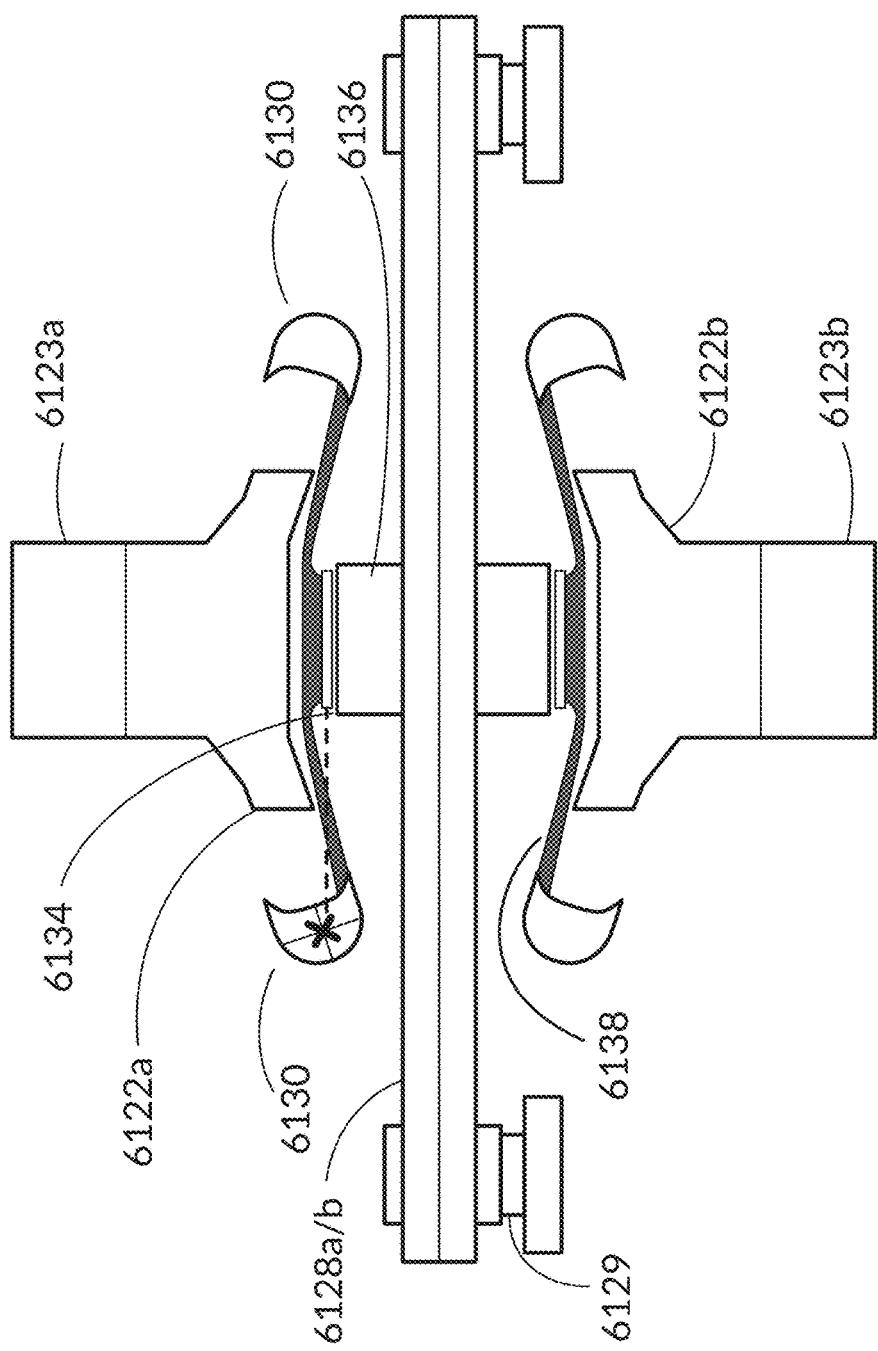
FIG. 61 is a cross-sectional side view of a linear turbine shown in FIG. 59.

FIGS. 59-61 illustrate a linear turbine system with a dual distribution arrangement. A dual distribution system may be utilized to take advantage of the symmetry of a linear turbine system. Penstock 6121 utilizes a Y-junction 6180 to feed flow 6124 to an upper nozzle 6122a and a lower nozzle 6122b. Upper nozzle 6122a and lower nozzle 6122b each provide a free jet impulse to both of a first plurality of buckets 6110 and a second plurality of buckets 6120. Upper nozzle 6122 and lower nozzle 6122b are arranged in opposite directions so as to provide impulse power in opposing directions to the corresponding linear segments of first plurality of buckets 6110 and second plurality of buckets 6120. The resultant forces combine to increase the collective force on the turbine. Just as with previously described embodiments, the buckets are mounted on crossbeams 6138 and transfer the impulse power to belt 6134. Forces on belt 6134 turns sprockets 6136, as well as first shaft 6128 and second shaft 6129, which may be used, for example, for electric power generation. Respective bearings 6139 may carry first shaft 6128 and second shaft 6129. Bearings 6139 may be outboard of the bucket assemblies as shown in FIG. 59. Alternative, bearings 6139 may be arranged similar to the arrangement shown in FIG. 55. In an embodiment, first plurality of buckets 6110 and second plurality of buckets 6120 may be disposed within a housing such as enclosure 6131. Enclosure 6131 may be part of a larger general linear turbine housing, for example. First shutoff valve 6181 and second shutoff valve 6182, which may be, e.g., butterfly valves, may utilized to independently adjust the amount of flow to either upper nozzle 6122*a* or lower nozzle 6122*b*.

Figure 62:
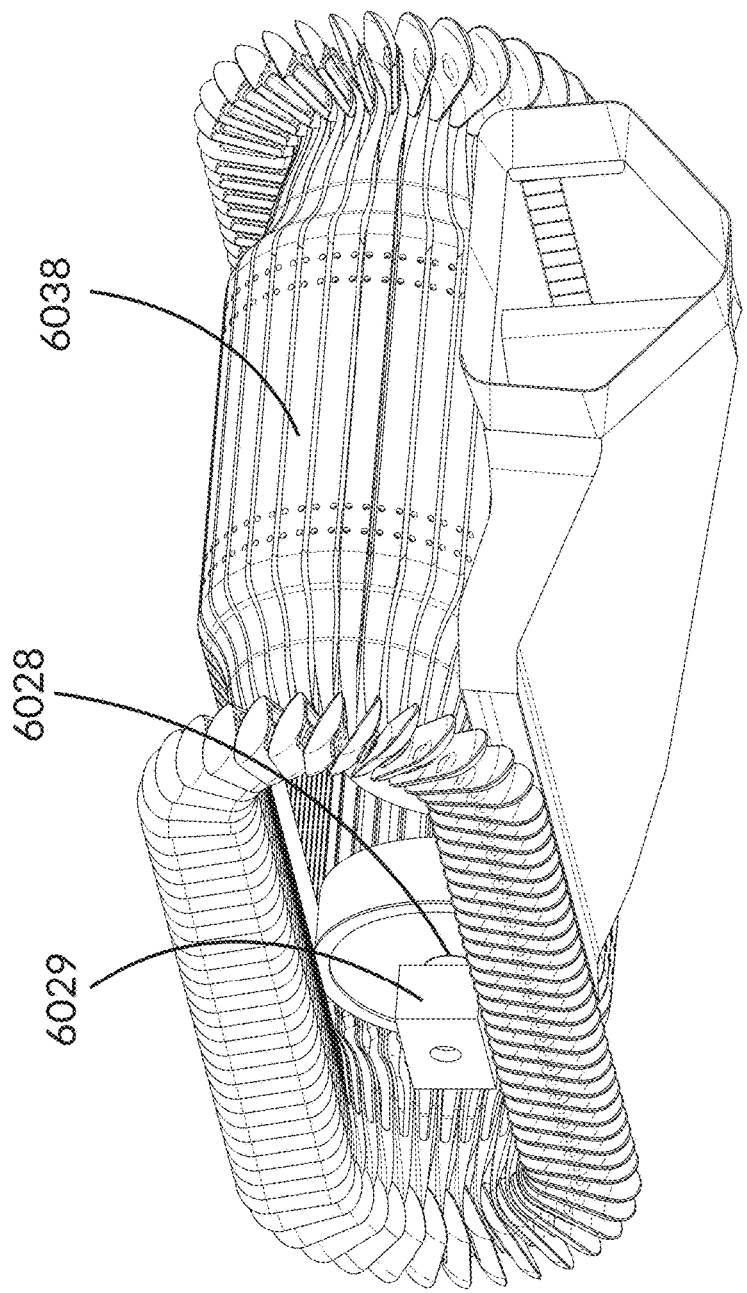
FIG. 62 is a perspective view of a linear turbine having a split-chassis arrangement.

FIG. 62 shows a linear turbine system having a split-chassis configuration, in that the shaft 6228 and generator 6229 may be doubled and split relative to the direction of crossbeam 6238.

Figure 63:
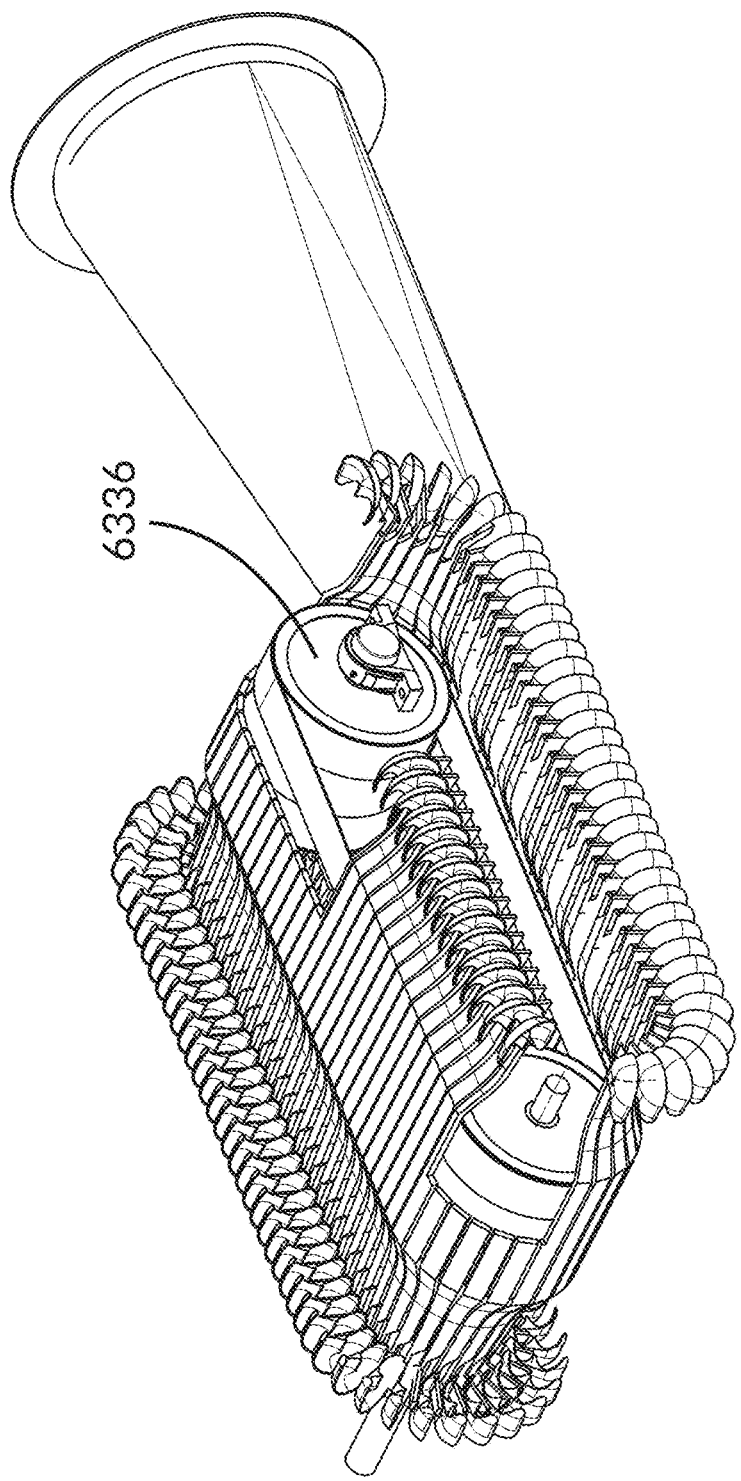
FIG. 63 is a perspective view of a linear turbine having a roller bearing arrangement.

FIG. 63 shows a linear turbine system having a roller bearing system, where one or more sprockets 6336 is disposed generally centrally to the linear direction of the linear turbine.

Figure 64:
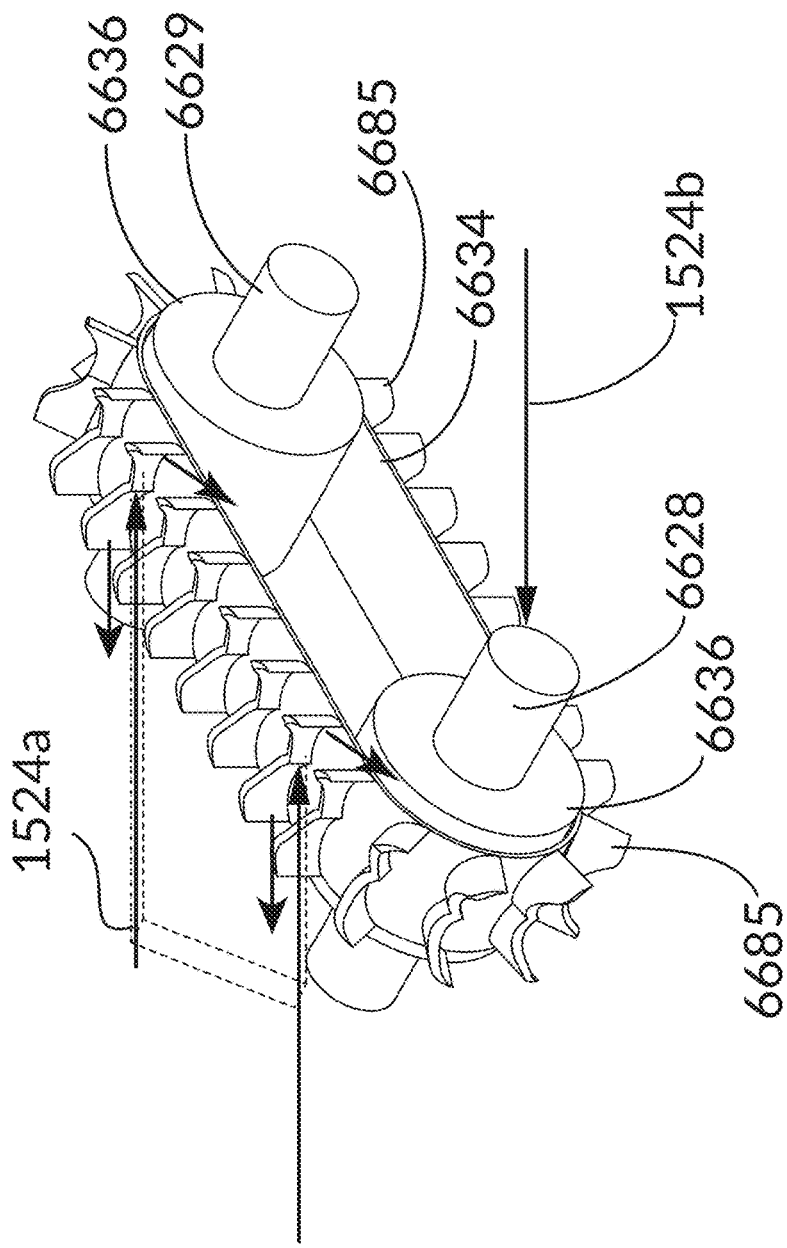
FIG. 64 is a perspective view of a linear turbine according to a linear Pelton embodiment.

FIG. 64 illustrates a linear turbine system 6600 according to an embodiment. This embodiment differs significantly from previous embodiments. Linear turbine system 6600 includes Pelton-type blades 6685 that are mounted directly to a belt 6634. Also, instead of providing a free jet at a non-zero angle α as with previous embodiment, a free jet is parallel to path of travel of blades 6685 (α=0). In this aspect, linear turbine system 6600 operates similar to a convention Pelton turbine as described with respect to FIG. 73. To make use of the linear nature of linear turbine system 6600, however, the rectilinear free jet angled with respect to a linear segment of the linear turbine as shown. Linear turbine system 6600 otherwise operates similar to the other embodiments described. A nozzle may be configured to form a rectilinear free jet incident on more than two blades 6685. Belt 6634 is arranged about sprockets 6636. Sprockets rotate about parallel shafts 6628, 6629.

Figure 65:
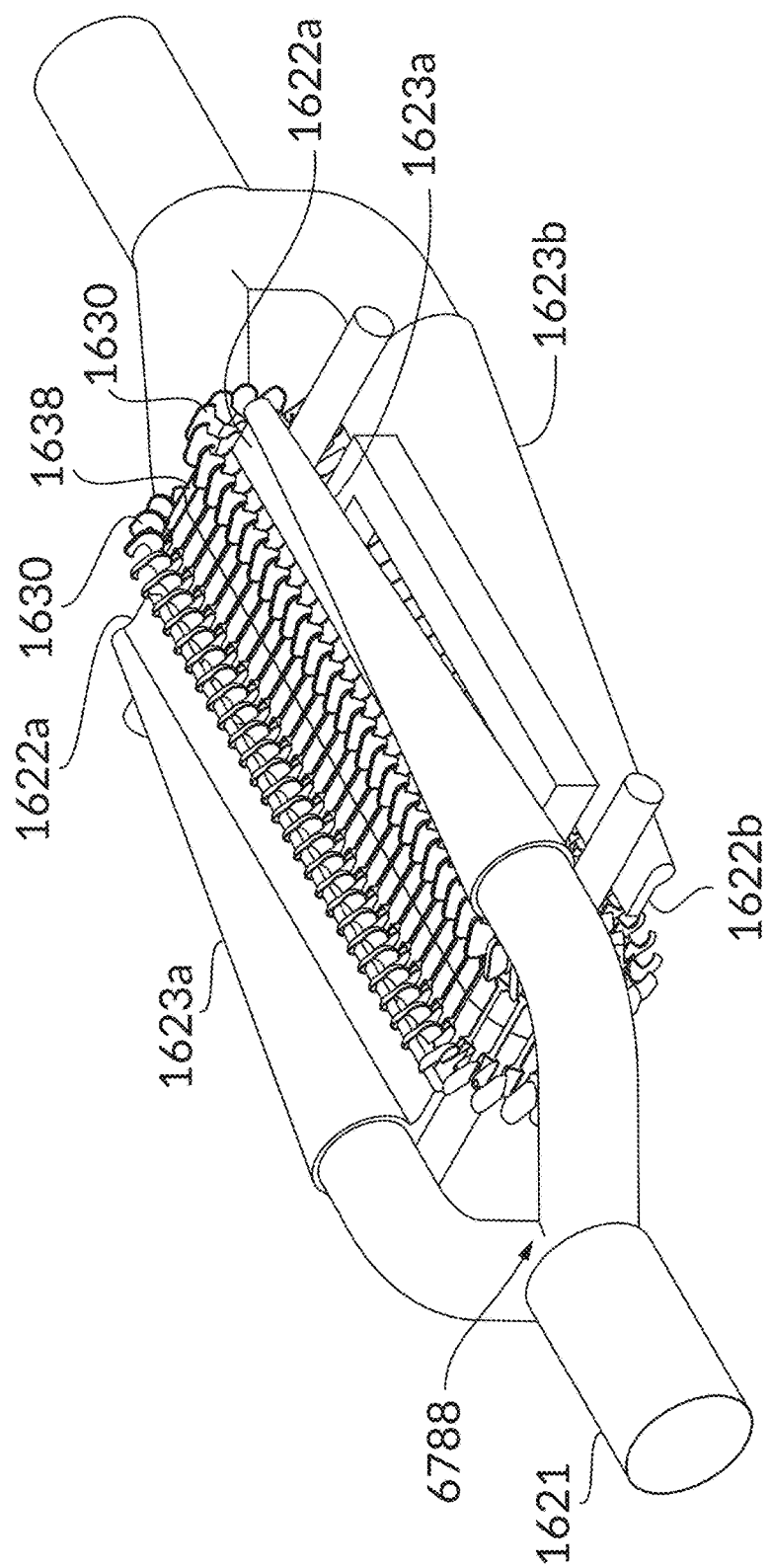
FIG. 65 is a perspective view of a linear turbine according to an inward-flow embodiment.
Figure 66:
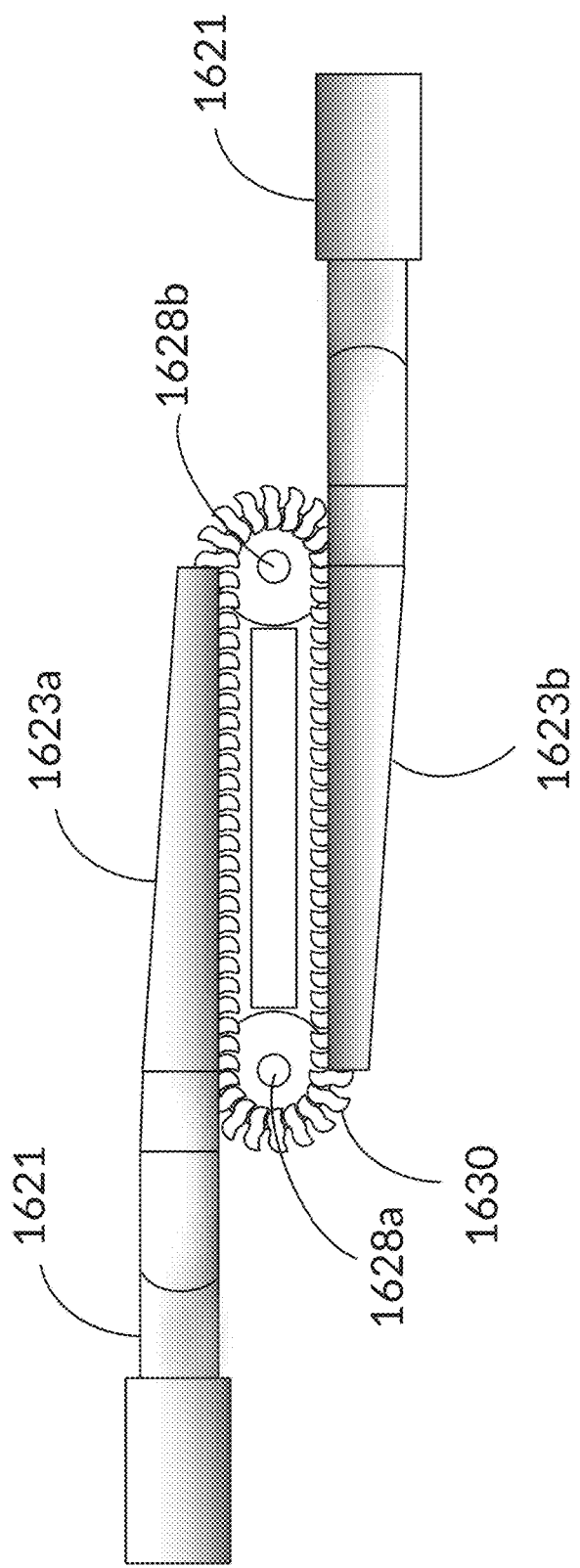
FIG. 66 shows a view of a linear turbine according to a bi-directional embodiment.
Figure 67:
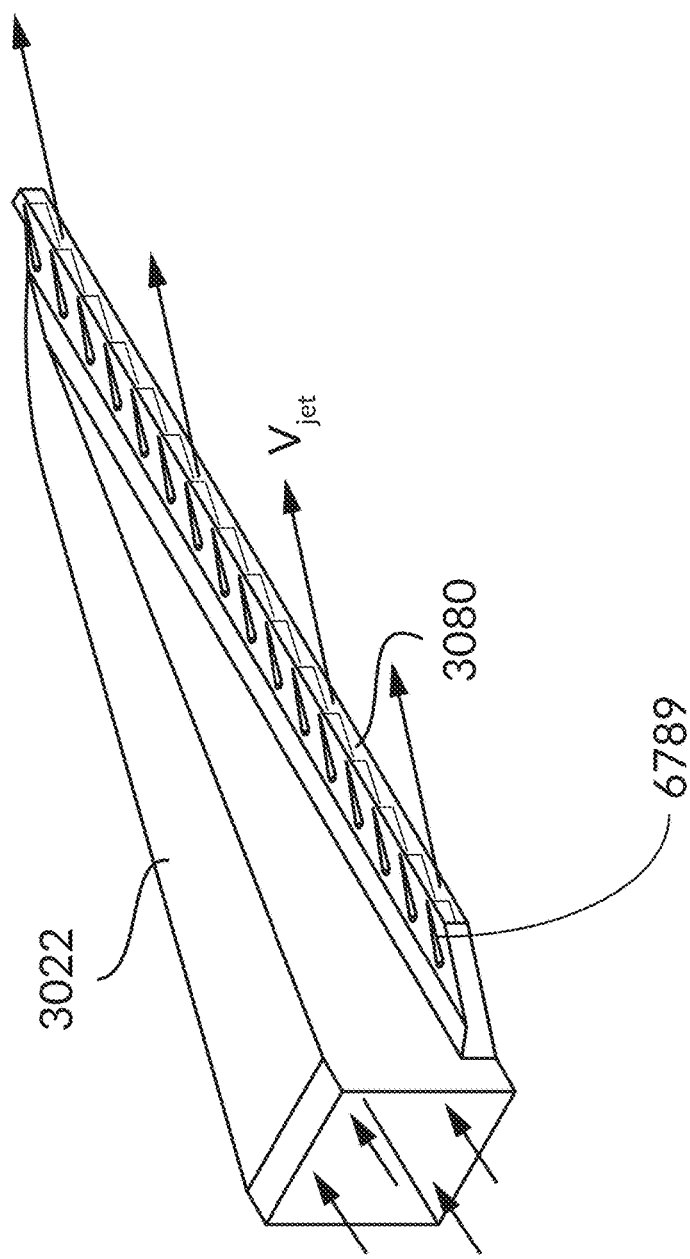
FIG. 67 is a schematic perspective view of a nozzle arrangement have a wicket gate according to an embodiment.
Figure 68:
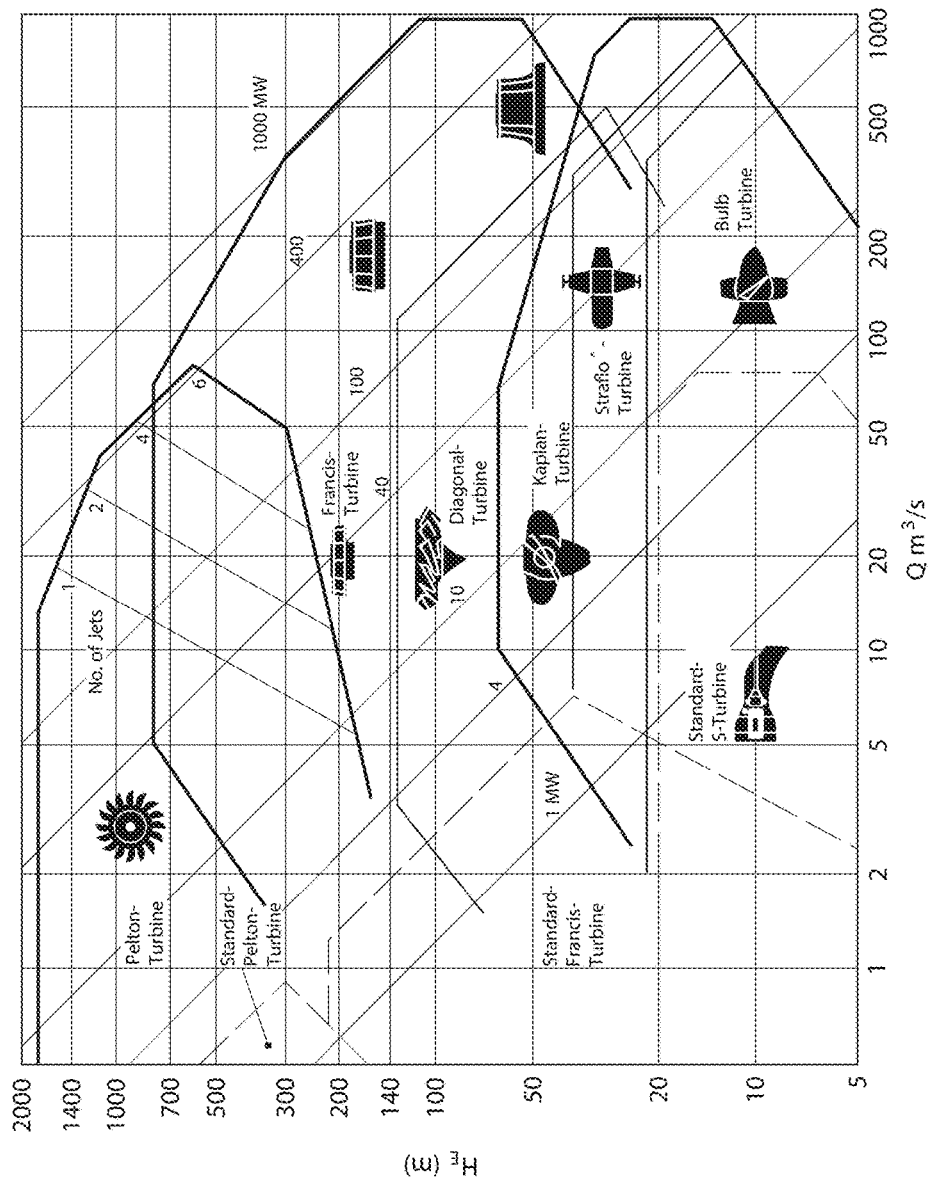
FIG. 68 depicts application ranges for various type of hydraulic turbomachines, a plot of as Q vs. H with lines of constant power determined assuming $\eta_0$=0.8.
Figure 69:
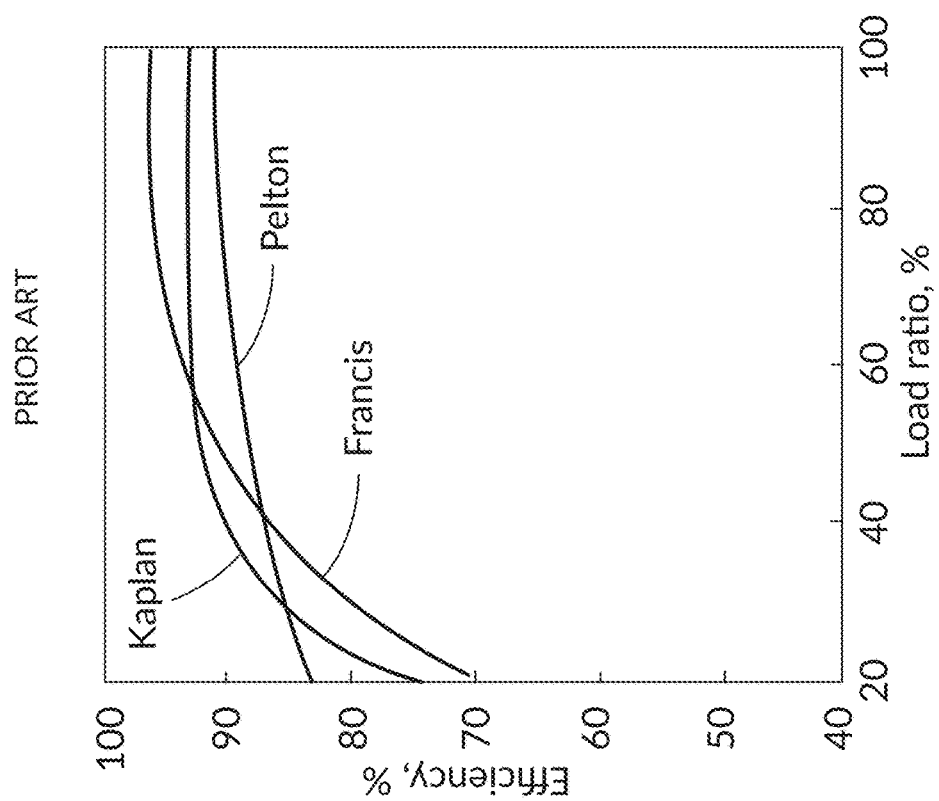
FIG. 69 is a plot of efficiency vs. $Q/Q_0$ for various types of turbines.

FIGS. 65-66 illustrates a linear turbine system 6700 utilizing variations of an inward-flow concept. Linear turbine system 6700 is similar to previously described outward-flow embodiments, but is configured to direct two rectilinear free jets toward a center axis of the turbine. Similar to the embodiment shown in FIGS. 1-4, a first plurality of buckets 6710 and second plurality of buckets 6711 may be mechanically linked so as to rotate together on first shaft 6728 second shaft 6729 respectively about first axis 6712 and second axis 6713. Linkages may be in the form of dually cantilevered crossbeams 6738, which couple one individual bucket from each of first plurality of buckets 6710 and second plurality of buckets 6711 by fixedly mounting a bucket on either end of the crossbeams 6738. Crossbeams 6738 are center mounted to a powertrain that is configured to constrain the crossbeam and bucket assemblies along endless continuous path. The buckets may travel along linear segments between parallel shafts 6728, 6729. A forked nozzle 6788 directs fluid flow 6724 from a penstock 6621 outboard of the turbine buckets and provides a rectilinear free jet impulse to first and second plurality of buckets 6710, 6711 at an angle α with respect to a plane that extends along a substantially rectilinear opening of forked nozzle 6788. Forked nozzle 6788 may include guide vanes or wicket gates 6789 (see FIG. 67) to assist in inducing the desired jet angle. Forked nozzle 6788 may be mounted underneath the turbine chassis. A separation of first and second plurality of buckets 6710, 6711 may be sufficient that fluid flow from each side of the turbine does not significantly interfere with jet exit from either side such that it lowers efficiency of the turbine.

As shown in FIG. 66, nozzles may be configured in opposite directions along the linear direction (including nozzles 1621, outlets 1623*a/b*, and parallel shafts 1628*a/b*).

The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Features of each embodiment disclosed may be used in each of the other embodiments disclosed.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A linear turbine system, the linear turbine system comprising: a linear turbine; and a nozzle configured to provide a fluid jet to the turbine, the nozzle comprising: an inlet portion for receiving a volume of fluid, the inlet portion having a cross-section; a first outlet portion terminating in a first substantially rectilinear opening to direct a first rectilinear jet of fluid outward to contact the linear turbine; a second outlet portion terminating in a second substantially rectilinear opening to direct a second rectilinear jet of fluid outward to contact the linear turbine; and a bifurcation positioned between the inlet portion and the first and second outlet portions to divide the volume of fluid into the first outlet portion and the second outlet portion, wherein the first outlet portion directs the first rectilinear jet of fluid into the linear turbine at an angle ranging from approximately 25° to approximately 50°.

2. A linear turbine system, the linear turbine system comprising:
   a single-stage linear turbine;
   a free jet nozzle to supply a fluid jet to the turbine; and
   a housing configured to isolate the linear turbine and nozzle from an external atmosphere, the housing comprising:
   a chamber enclosing the linear turbine and nozzle, the chamber having an outlet that is hydraulically sealed to an outlet fluid body, after the fluid jet contacts the turbine, fluid leaving the turbine exits the housing through the outlet, and
   a control valve configured to control an amount of air in the chamber to maintain a desired elevation of suction head inside the chamber without allowing the outlet fluid body to contact the turbine.

3. The turbine system of claim 2, further comprising:
a drive shaft driven by the linear turbine, the drive shaft extending through the housing and configured to drive an electric generator positioned exterior to the housing.

4. The turbine system of claim 2, wherein air from the enclosed atmosphere is entrained in the form of bubbles and momentum of the outflow evacuates the entrained bubbles of the enclosed atmosphere from the chamber.

5. The turbine system of claim 2, wherein the control valve is configured to automatically maintain a level of a fluid pool below the turbine.

6. The turbine system of claim 2, wherein the control valve is configured to automatically maintain a pressure inside the chamber below the external atmospheric pressure so as to increase a level of a fluid pool below the turbine.

7. The turbine system of claim 2, wherein the nozzle receives a fluid source at a nozzle inlet, a bottom portion of the nozzle inlet being positioned at a first elevation,
wherein the nozzle delivers the fluid jet to the turbine at a second elevation such that the first elevation is lower than the second elevation.

8. The turbine system of claim 7, wherein the fluid jet exits the turbine at a third elevation and falls to a fluid pool inside the chamber, a level of the fluid pool being at a fourth elevation such that the third elevation is higher than the fourth elevation.

9. The turbine system of claim 8, wherein an exterior fluid surrounding the chamber outlet outside the chamber has a level at a fifth elevation such that the fourth elevation is higher than the fifth elevation.

10. The turbine system of claim 2, the linear turbine comprising:
a first shaft extending along a first horizontal axis;
a second shaft extending along a second horizontal axis, the second axis being separated from and substantially parallel to the first horizontal axis; and
a first bucket to travel a first continuous path around the first shaft and the second shaft along a first plane, the first path including a first substantially linear path segment between the first axis and the second axis, a first substantially arc-shaped segment around the second axis, a second substantially linear path segment between the second axis and the first axis, and a second substantially arc-shaped segment around the first axis,
wherein the nozzle is configured to direct the fluid jet to contact the first bucket in the first substantially linear path segment such that the fluid jet does not contact the first bucket in the second substantially linear path segment.

11. The turbine system of claim 10, wherein the second substantially linear path segment is positioned above the first substantially linear path segment.

12. The turbine system of claim 10, further comprising:
a second bucket to travel a second continuous path around the first shaft and the second shaft along a second plane, the second path including a first substantially linear path segment between the first axis and the second axis, a first substantially arc-shaped segment around the second axis, a second substantially linear path segment between the second axis and the first axis, and a second substantially arc-shaped segment around the first axis,
wherein the nozzle is configured to direct the fluid jet to contact the second bucket in the first substantially linear path segment of the second path such that the second fluid jet does not contact the second bucket in the second substantially linear path segment of the second path.

13. The turbine system of claim 10, further comprising:
a turbine blade comprising the first and second buckets, the first bucket being connected to a first end of the turbine blade and the second bucket being connected to a second end of the turbine blade.

14. The turbine system of claim 13, wherein the first bucket and the second bucket are hydraulically self-centering.

15. The turbine system of claim 13, further comprising:
a moving structure, the turbine blade being connected to the moving structure.

16. The turbine system of claim 15, wherein the turbine blade is connected to the moving structure at its mid-span such that the first end of the turbine blade and the second end of the turbine blade are cantilevered.

17. The turbine system of claim 15, wherein the moving structure is a belt.

18. The turbine system of claim 10, wherein the nozzle is positioned below a horizontal plane extending between the first axis and the second axis.

19. The turbine system of claim 10, wherein the nozzle directs the fluid jet outward to contact the first bucket and the second bucket.

20. The turbine system of claim 19, wherein the nozzle directs the fluid jet outward to contact the first bucket at an angle with respect to the first substantially linear path segment, the angle having a range from approximately 25° to approximately 50°.

21. The turbine system of claim 10, wherein a speed of the fluid jet is greater than a speed of the bucket.

* * * * *